(12) United States Patent
Yamamoto et al.

(10) Patent No.: US 6,651,240 B1
(45) Date of Patent: Nov. 18, 2003

(54) OBJECT-ORIENTED SOFTWARE DEVELOPMENT SUPPORT APPARATUS AND DEVELOPMENT SUPPORT METHOD

(75) Inventors: Rieko Yamamoto, Kanagawa (JP); Yuko Nakayama, Kanagawa (JP); Tadahiro Uehara, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/472,896

(22) Filed: Dec. 28, 1999

(30) Foreign Application Priority Data

Feb. 17, 1999 (JP) .......................................... 11-038173
Jul. 21, 1999 (JP) .......................................... 11-206170

(51) Int. Cl.$^7$ ............................................... G06F 9/44
(52) U.S. Cl. ........................ 717/108; 717/104; 717/116
(58) Field of Search ................................. 717/104, 100, 717/106–109, 114–116, 120–123; 707/102, 103, 104.1

(56) References Cited

U.S. PATENT DOCUMENTS

| | | | |
|---|---|---|---|
| 6,112,024 A | * | 8/2000 | Almond et al. ............. 717/122 |
| 6,346,945 B1 | * | 2/2002 | Mansurov et al. .......... 717/146 |
| 6,370,681 B1 | * | 4/2002 | Dellarocas et al. ......... 717/110 |
| 6,499,137 B1 | * | 12/2002 | Hunt ........................ 717/164 |
| 6,502,236 B1 | * | 12/2002 | Allen et al. ................ 717/136 |

FOREIGN PATENT DOCUMENTS

| JP | 9-198242 | 7/1997 |
|---|---|---|
| JP | 9-237180 | 9/1997 |

OTHER PUBLICATIONS

Srinivasan et al. Design Patterns in Object–Oriented Frameworks. IEEE. 1999. pp. 24–32.*
Moss. Design of the Mneme Persistent Object Store. ACM. 1990. pp. 103–139.*
Noble. Towards a Pattern Languages for Object Oriented Design. IEEE. 1998. pp. 2–13.*
Rieko Yamamoto, et al., "Toward a New Reuse Framework: A Pattern System for Object Oriented Development", IPSJ SIG Notes, vol. 98, No. 64, 98–SE–120, Information Processing Society of Japan.

* cited by examiner

Primary Examiner—Wei Zhen
(74) Attorney, Agent, or Firm—Staas and Halsey LLP

(57) ABSTRACT

The object-oriented software development support apparatus according to the present invention includes: a pattern architecture storage unit for storing pattern information about a plurality of applicable patterns and inter-pattern relevant information for association among patterns having an antecedent/consequent relationship when the software is developed; and a pattern application unit for applying to a model to be developed a pattern whose application has been approved by the user among the patterns stored in the pattern architecture storage unit and detailing the model, and supporting the development of software corresponding to the model. The object-oriented software development support apparatus according to the present invention applies a pattern according to an entered pattern architecture, thereby enabling the pattern to be appropriately and efficiently reused, and efficiently supporting the development of software. In addition, various object-oriented patterns can be easily defined, and a model and a program desired by the developer can be automatically generated.

41 Claims, 85 Drawing Sheets

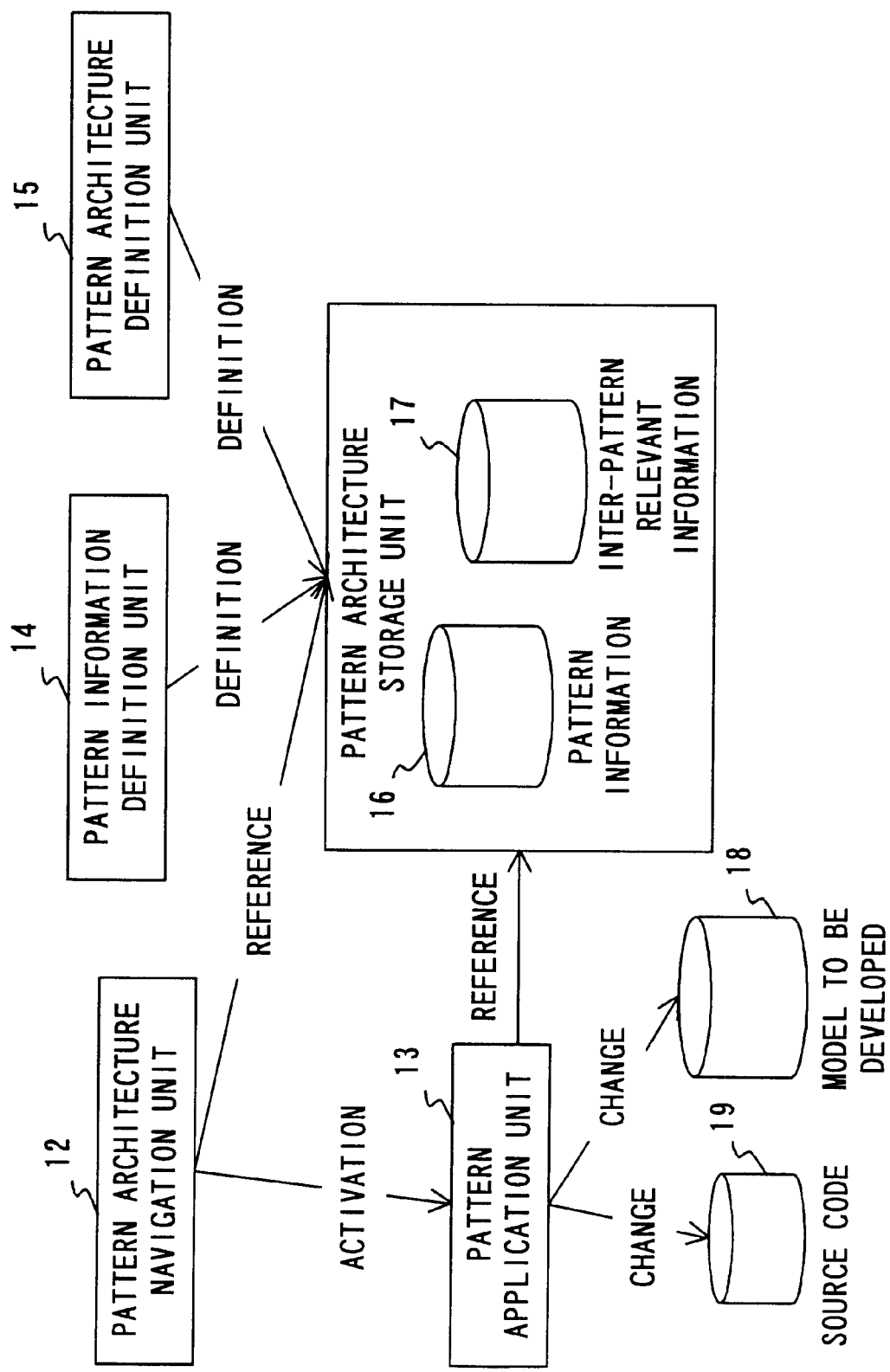
F I G. 2

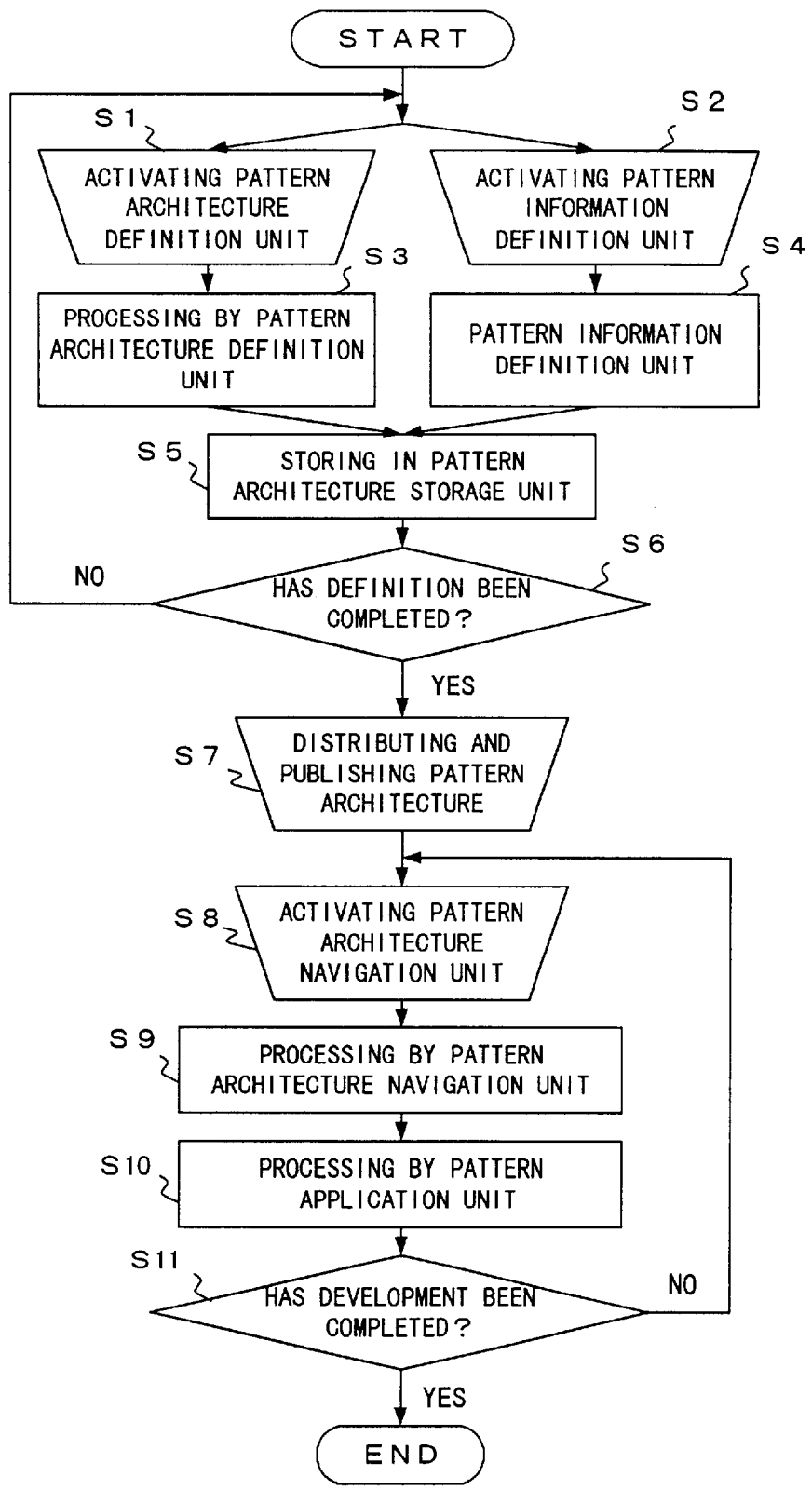
F I G. 5

CATEGORY : DESIGN PATTERN

NAME : UPDATING PLURAL DOMAIN OBJECTS D9

SUBJECT : WHEN LARGE NUMBER OF DOMAIN OBJECTS APPLICABLE TO CERTAIN CONDITION ARE OBTAINED, AND ARE COLLECTIVELY UPDATED WITHOUT INCONSISTENCY WITHIN SAME TRANSACTION, DOMAIN OBJECTS MUST BE MANAGED BY SAME MANAGEMENT OBJECT. SINCE LARGE NUMBER OF OBJECTS ARE PROCESSED USING LIMITED MEMORY SOURCES, ONLY ONE DOMAIN OBJECT IS PERMITTED TO CONSTANTLY RESIDE IN MEMORY. UNTIL OBJECTS IN DB ARE COLLECTIVELY UPDATED, DATA OF DOMAIN OBJECTS ARE CASHED ON AP SERVER SIDE.

EXPLANATION : WHEN LARGE NUMBER OF DOMAIN OBJECTS ARE SEQUENTIALLY OBTAINED AND CHANGED, AND THEN DB IS COLLECTIVELY UPDATED, ObjectManager WHICH MANAGES DOMAIN OBJECT IS ENTERED IN TransactionManager. ENTRY IS MADE BY CALLING setObjectManager, AND TRANSMITTING ObjectManager AS ARGUMENT. TransactionManager IS OBJECT FOR MANAGING TRANSACTION COVERING PLURAL ObjectManagers. HOWEVER, TO ALLOW CALLER TO CALL SAME METHOD REGARDLESS OF SINGLE ObjectManagers, ENTRY IS MADE IN TransactionManager EVEN FOR SINGLE ObjectManager. NEXT, CALLER CALLS APPROPRIATE SELECT METHOD OF DBServerInterface OBJECT TO OBTAIN DATA. {OMITTED}
DEFINITION

☆ CLASSES :

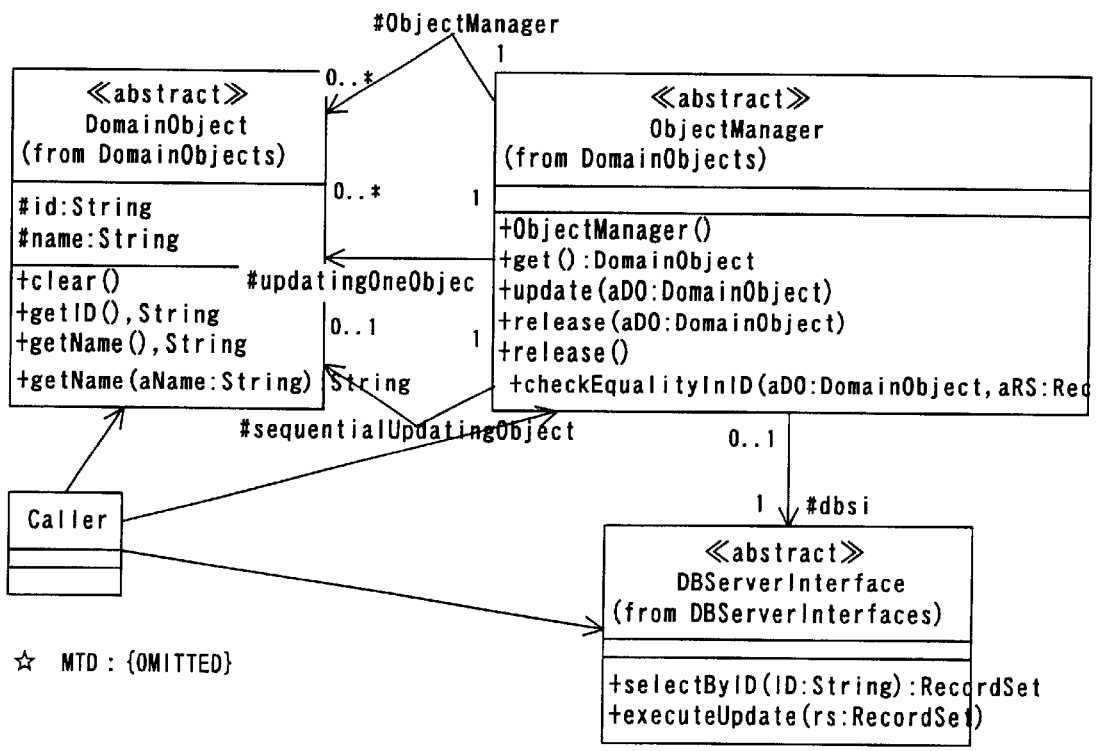

☆ MTD : {OMITTED}

F I G. 1 0

| | |
|---|---|
| PATTERN NUMBER | |
| CATEGORY | |
| NAME | |
| SUBJECT | |
| EXPLANATION | |
| DEFINITION | CLASS DIAGRAM |
| | SEQUENCE DIAGRAM |
| CASE | SCENARIO |
| | OBJECTS DIAGRAM |
| | SEQUENCE DIAGRAM |
| REMARKS | |

JUMP-TO PAGE 1   JUMP-TO PAGE 2   JUMP-TO PAGE 3

PATTERN MODEL FILE NAME [ ]

APPLICATION

|  |  |
|---|---|
| DEFINITION | SEQUENCE DIAGRAM |
| CASE | SCENARIO |
|  | OBJECT DIAGRAM |
|  | SEQUENCE DIAGRAM |
| REMARKS | |

1:getNew( )
←do-i
2:setATTRIBUTE(argtype)
3:set ROLE 1 (RELATED-TO DOMAIN OBJECT)
4:insert( )

TRANSMISSION AND RECEPTION OF RELATED-TO OBJECT

PATTERN MODEL FILE NAME    h:¥patternmodels¥Basic.mdl

APPLICATION

DOCUMENT CONPLETED

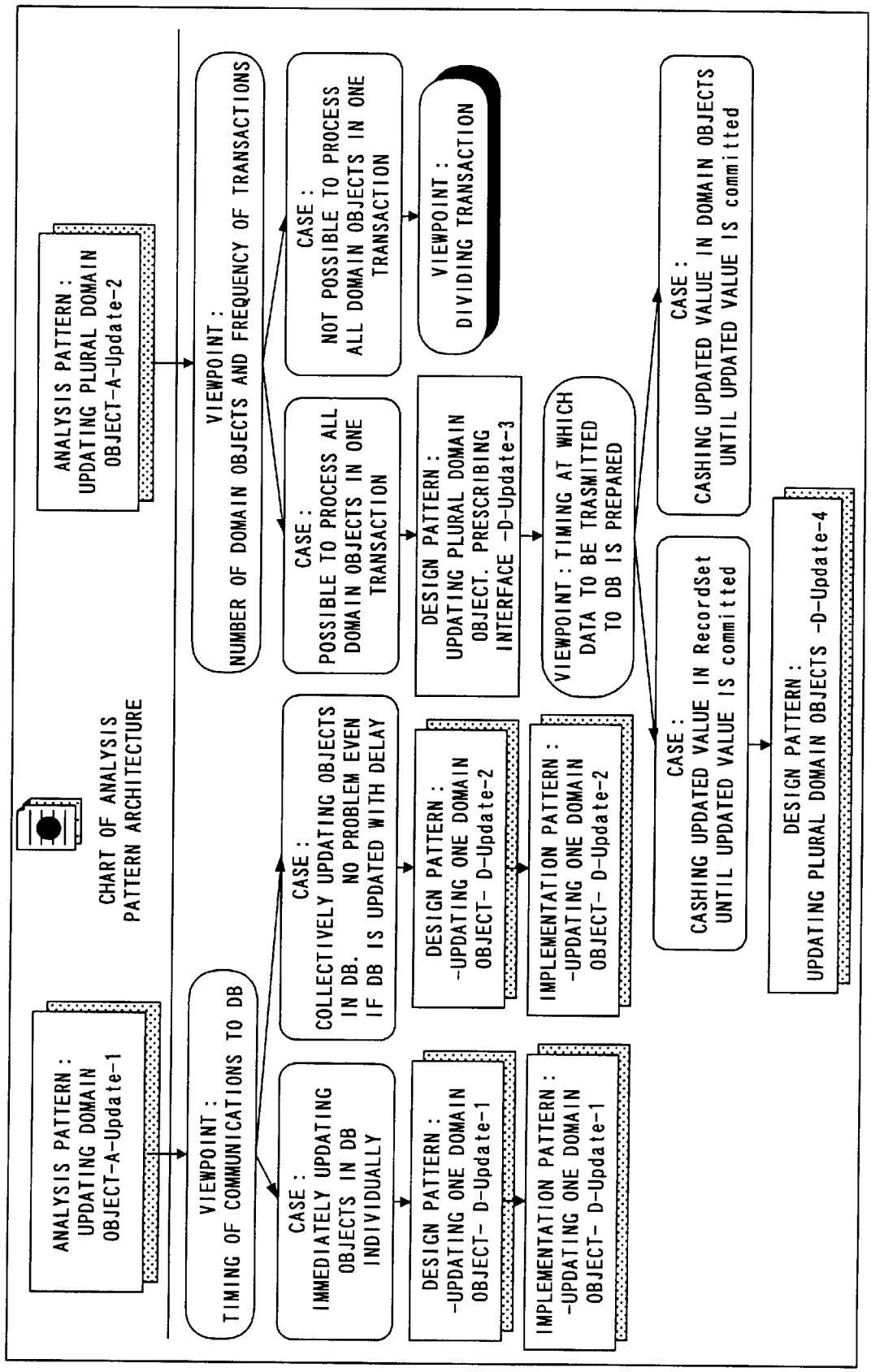
F I G. 1 8

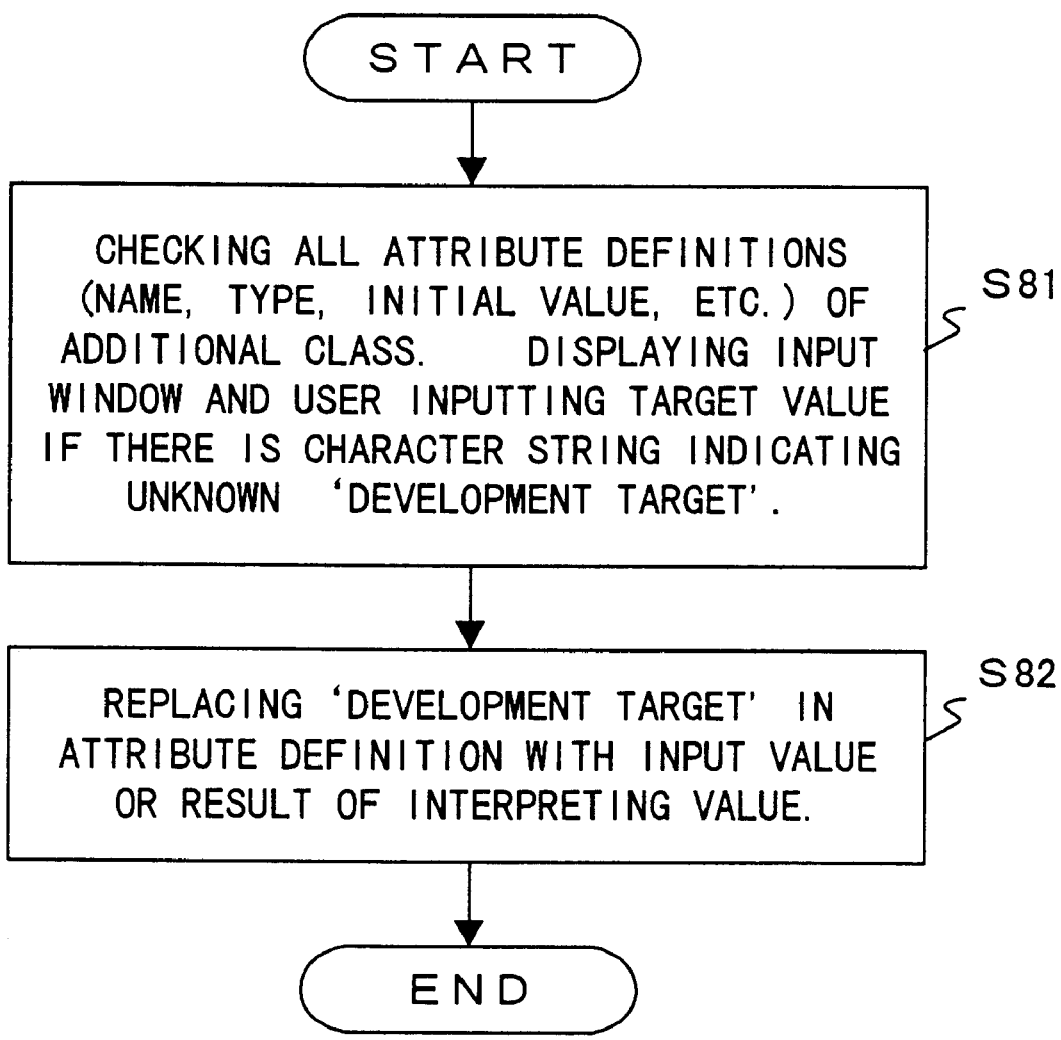
F I G. 2 1

```
┌─────────────────────────────────────────────┐
│  ┌───────────────────────────────────────┐  │
│  │            GASample                   │  │
│  ├───────────────────────────────────────┤  │
│  │ - c_code : GCGString = "C-CODE"       │  │
│  │ - c_name : GCGString = "C-NAME"       │  │
│  ├───────────────────────────────────────┤  │
│  │                                       │  │
│  │                                       │  │
│  │                                       │  │
│  │      ┌─────────────────────────────┐  │  │
│  │      │       GASampleDetail        │  │  │
│  │      ├─────────────────────────────┤  │  │
│  │      │ - d_code : GCGString = "D_CODE" │  │
│  │      │ - d_name : GCGString = "D_NAME" │  │
│  │      └─────────────────────────────┘  │  │
│  └───────────────────────────────────────┘  │
└─────────────────────────────────────────────┘
```

FIG. 24

$$Target$$Manager

+ $$Target$$Manager ()
+ $$Target$$Manager ()
+ GetNew () : $$Target$$*
+ InsertOne(mdl : $$Target$$*) : void
+ Insert(mdl : $$Target$$*) : void
+ GetOne(: $$firstattributes$$;doctype) : $$Target$$*
+ GetOne$$any$$(: $$Target$$::$$attributelist.select.static$$;doctype) : $$Target$$*
+ Get() : $$Target$$*
+ Get(: $$firstattributes$$;doctype) : $$Target$$*
+ Get$$any$$(: $$Target$$::$$attributelist.select.static$$;doctype) : $$Target$$*
+ UpdateOne(mdl : $$Target$$*) : void
+ Update(mdl : $$Target$$*) : void
+ Select$$any$$(: $$Target$$*) : void
+ Flush() : void
+ release_all() : void

FIG. 29

```
[OMITTED]
$$$$
GASample* GASampleManager::GetOne(GCGStringC_CODE)
{
        //J LISTING ARGUMENT OF GetOne
        GCGList arg_list=make_arg_list(
                &C_CODE
                );
        //J GENERATING PARAMETER OBJECT ACCORDING TO LIST
        GCDParamenter prm(arg_list.GetCount());
        make_paramenter_list,prm);
        //J GENERATING COMBINATIN KEY ACCORDING TO LIST
        GCGString key_sr=make_keystring(arg_list);
        //J WHEN INSTANCE HAVING SAME KEY IS OBTAINED AGAIN:
        GASample* const obj=model_set.Lookup(&key_str);
        if(obj)
        {
                ++obj->ref_counter;
                return obj;
        }
        //J PERFORMING ENTITY REFERENCE METHOD
        GCDResultset* rst_inst=entity_inst->SelectForGetOne(prm);
        //J NULL UNLESS MIS-HIT
        if(rst_inst->GetEOF()==1){
                rst_ainst->Destroy();
                return NULL;
        }else{
                //J OBTAINING MODEL INSTANCE
                GCDField* fid_inst=rst_inst->GetFIWLSA();
                //J GENERATION RELATION
                GASample* new¥obj=(GASample*)get_instance();
                //J INITIALIZING CORE RESOURCES
                setup_model_instance(new_obj,key_str,rst_inst,fld_inst);
                //J AGGREGATION RELATION
                model_set.SetAt(&key_str,new_obj);
                return new_obj;
}
$$$$
GASample* GASampleManager::Get(GCGString value)
        //J ERROR UNLESS IT IS Select MODE
        if(resultset_inst==NULL||current_field==0))
        {
                //J CASTING B.O.Exceptin
                BusinessObjectExcdption exp("GSDS70000E",NULL,_GLOVIA_ID,
                                        _PROTOCOL,17,1,_OBJECT_MGR);
                throw exp;
        }
        //J TWO OR MORE CONSECUTIVE INSTANCES CONNOT BE OBTAINED.
{COMITTED}
```

F I G. 30

```
// GAMDBObjectManager
#include "GAMDBObjectManager.h"

class GASample;
class GASampleEntity;

//# begin module.additionalDeclarations preserve=yes
//# end module.additionalDeclarations //# Class:GASampleManager
//          PRACTICAL EXAMPLE OF CONTINUATION OF OBJECT
//          AND OBJECT MANAGER USING DB
//## Category:<Top Level>
//## Subsystem:<Top Level>
class GASampleManager:public GAMDBObjectManager   //## Inherits:<unnamed>

{
 //## begin GASampleManager.initialDeclarations preserve=yes
 //## end GASampleManager.initialDeclarations public:
    //## Constructors (specified)
       //## Operation:GASampleManager%909060234
       //    begin-created by SimpleOM pattern
       //    end- created by SimpleOM pattern
       GASampleManager();

//## Destrudtor (generated)
[OMITTED]
    //## Operation:GetOne%909060239
    //   begin-created by SimpleOM pattern
    //   OBTAINING OBJECT FROM DB
    //   $$key$$:GetOne1
    //   end-created by SimpleOM pattern
    GASample* GetOne(GCGString C_CODE);

//## Operation:Get%909060241
    //   begin-created by SimpleOM pattern
    //   OBTAINING OBJECT FROM DB
    //
    //
    //   $$key$$:Get1
    //
    //   end-created by SimpleOM pattern
    GASample* Get(GCGString C_CODE);

//## Operation: UpdateOne%909060242
    //    begin-crated by SimpleOM pattern
 [OMITTED]
```

F I G. 3 3

```
{OMITED}
// Class GASampleManager
GASampleManager::GASampleManager()
    //## begin GASampleManager::GASampleManager%909060234.hasinit preserve=no
    //## end GASampleManager::GASampleManager%909060234.hasinit
    //## begin GASampleManager::GASampleManager%909060234.initialization preserve=yes
    //## end GASampleManager::GASampleManager%909060234.initialization
{
    //## begin GASampleManager::GASampleManager%909060234.body preserve=yes
    //## end GASampleManager::GASampleManager%909060234.body
}

{OMITED}
GASample* GASampleManager::GetOne(GCGString C_CODE)
{
    //## begin GASampleManager::GetOne%909060239.body preserve=yes
    //## end GASampleManager::GetOne%909060239.body
}

GASample* GASampleManager::Get()
{
    //## begin GASampleManager::Get%909060240.body preserve=yes
    //## end GASampleManager::Get%909060240.body
}

GASample* GASampleManager::Get(GCGString C_CODE)
{
    //## begin GASampleManager::Get%909060241.body preserve=yes
    //## end GASampleManager::Get%909060241.body
}

{OMITED}
```

FIG. 34

```
//GASample
[OMITTED]
GASample* GASampleManager::GetOne(GCGString C_CODE)
{
  //##begin GASampleManager::GetOne%90913061.body preserve=yes
       //$$begin:created by pattern applying tool.
       // LISTING ARGUMENT OF J GegOne
       GCGList arg_list=make_arg_list(
             &C_CODE
             );
       //J GENERATING PARAMETER OBJECT ACCORDING TO LIST
       GCDParamenter prm(arg_list.GetCount());
       make_paramenter_list(arg_list.prm);
       //J GENERATING COUPLING KEY ACCORDING TO LIST
       GCGString key_str=make_keystring(arg_list);
       //J WHEN INSTANCE HAVING SAME KEY IS OBTAINED AGAIN:
       GASample* const obj=model_set.Lookup(&key_str);
       if(obj)
       {
             ++obj->ref_counter;
             return obj;
       }
       //J EXECUTING REFERENCING METHOD FOR ENTITY
       GCDResultset* rst_inst=entity_inst->SelectForGetOne(prm);
       //J NULL VALUE WHEN MIS-HIT ARISES
       if(rst_inst->GetEOF()==1){
             rst_inst->Destroy();
             return NULL;
       }else{
             //J OBTAINING FIELD (LEADING LINE)
             GCDField* fid_inst=rst_inst->GetFields();
             //J GENERATING MODEL INSTANCE
             GASample* new_obj=(GASample*)get_instance();
             //J INITIALIZING CORE RESOURCES OF MODEL
             setup_model_instance(new_obj,key_str,rst_inst,fid_inst);
             //J ADDING COLLECTIVE CORRELATION
             model_set.SetAt(&key_str,new_obj);
             return new_obj;
       //$$ end:created by pattern applying tool.
  //## end GASampleManager::GetOne%909131061.body
}

GASample*GASampleManager::Get()
{
  //## begin GASampleManager::Get%909131602.body preerve=yes
       //$$ begin:created by pattern applying tool.
       //J ERROR UNLESS IT IS Select MODE
       if(current_fiel==0 || resultset_inst==NULL)
       {
             //J CASTING B.O.Exception .
{COMITTED}
```

| PATTERN NUMBER | |
|---|---|
| CATEGORY | |
| NAME | |
| SUBJECT | |
| EXPLANATION | |
| KEYWORD | |
| DEFINITION | CLASS DIAGRAM |
| | SEQUENCE DIAGRAM |
| CASE | SCENARIO |
| | OBJECT DIAGRAM |
| | SEQUENCE DIAGRAM |
| REMARKS | |

JUMPED-TO PAGE1 | JUMPED-TO PAGE2 | JUMPED-TO PAGE3

PATTERN MODEL FILE NAME

User: kiyoshiro
Date Time: 1998 Oct 2. 15:29:07
ModelFileName: sample.mdl
PatternFileName: SimpleOM.mdl
TargetClassName: GASample
TragetClassName2:

$$$$$
multi
GetOne  2
Get     1
Select  2
$$$$$
attributelist
GetOne1 C_CODE
GetOne2 C_NAME
Get1    C_CODE
$$$$$
argumentlist
Select1 (quantity/int)
Select2 (quantity/int, lll/long)
$$$$$
any
GetOne1 ""
GetOne2 ""
Get1    ""
Select1 "Large"
Select2 "2"

FIG. 41

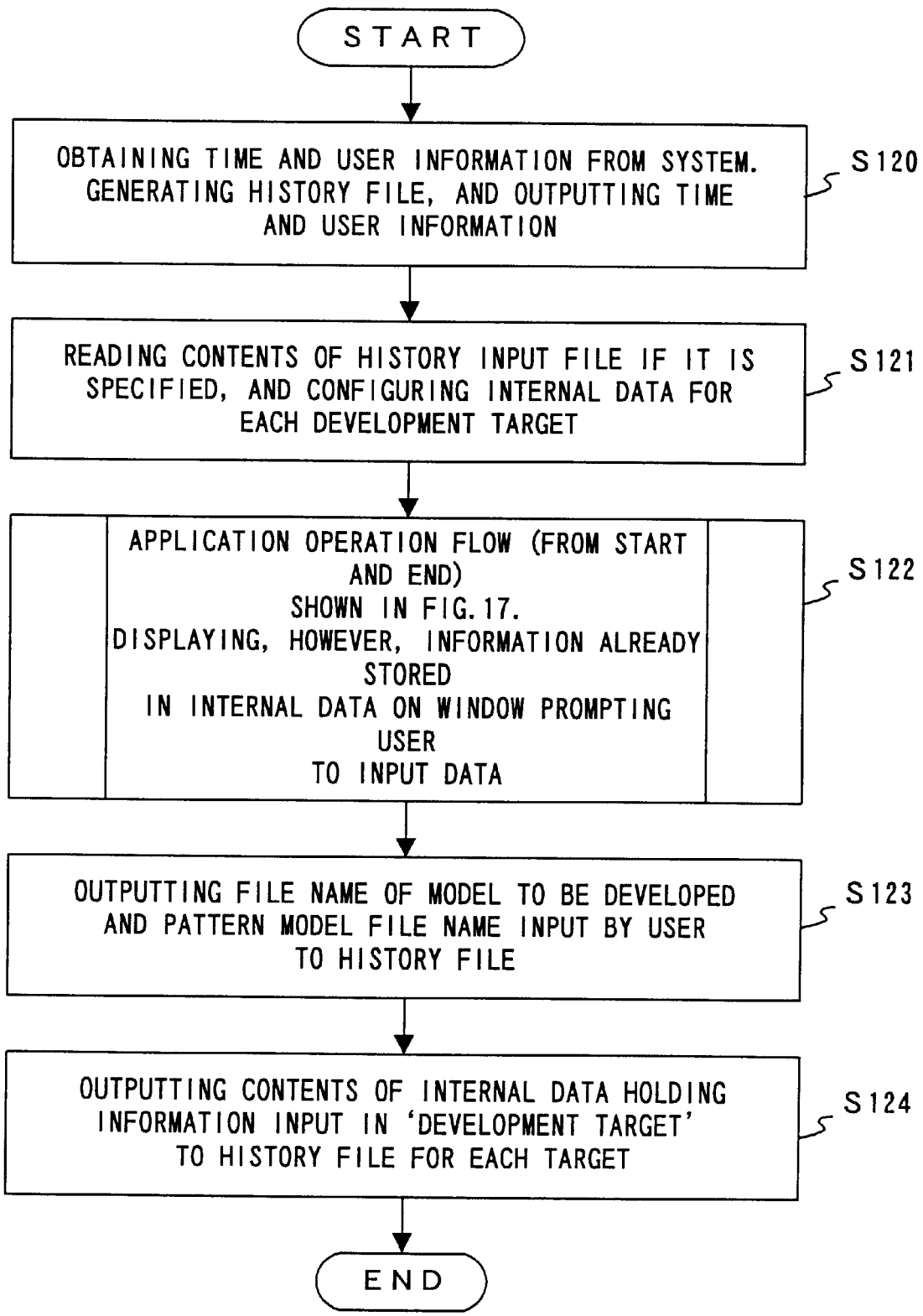
F I G. 4 2

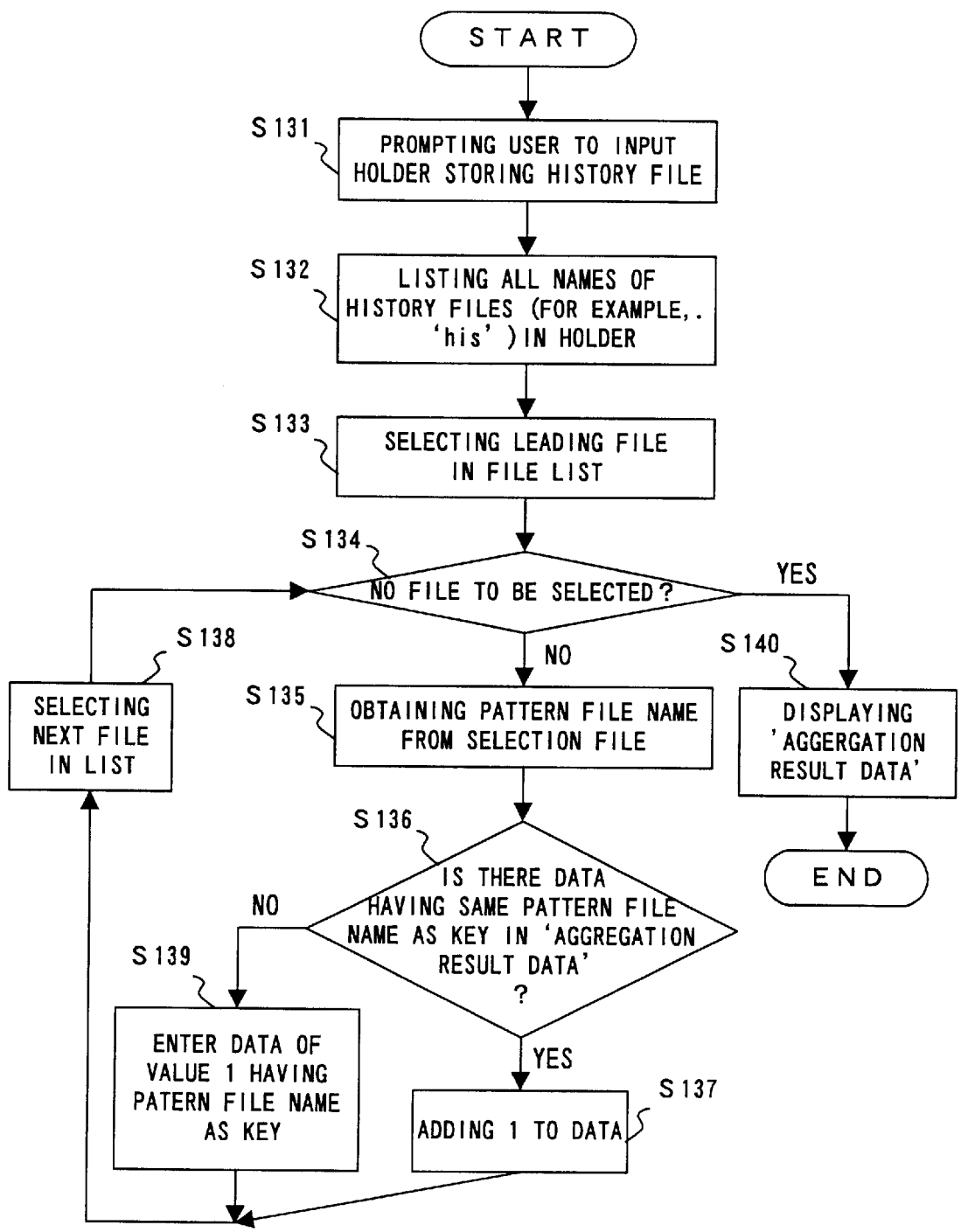
F I G. 4 4

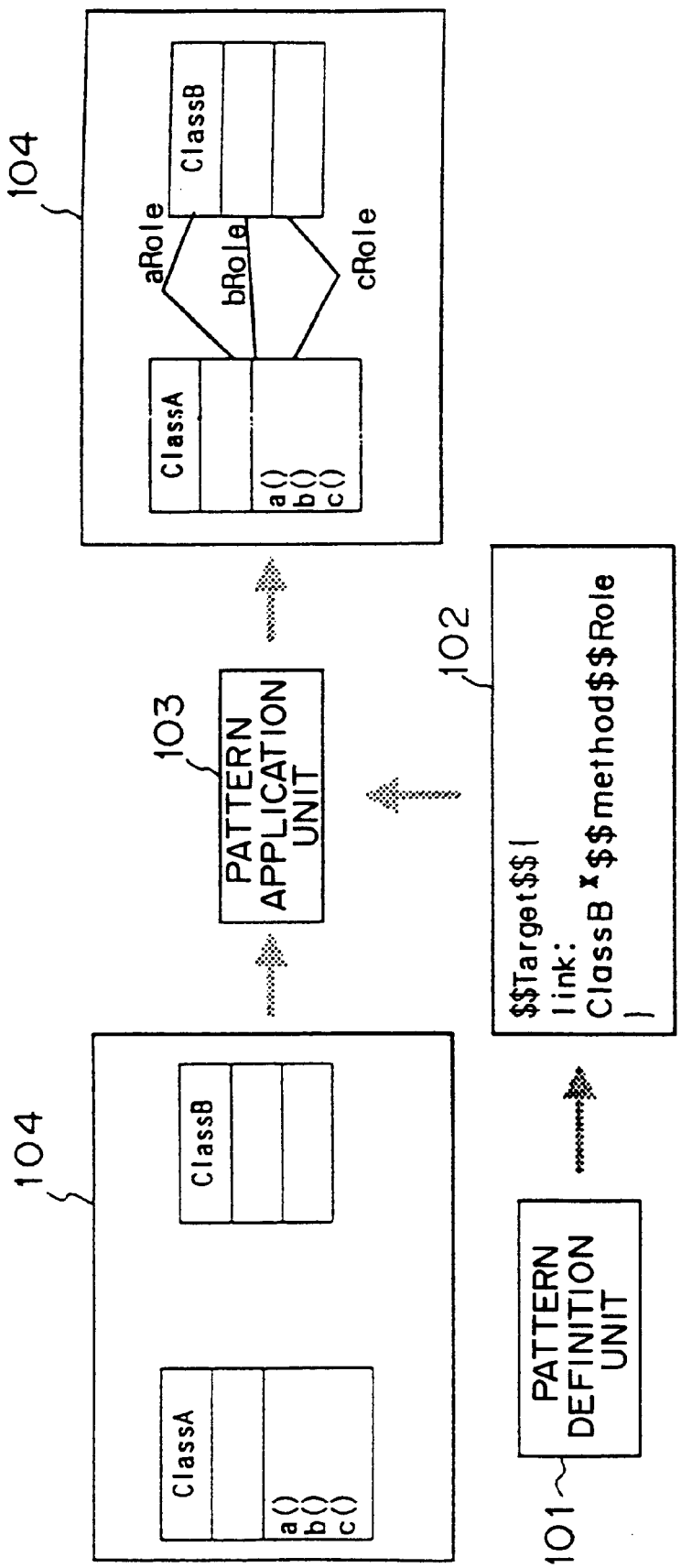
F I G. 56

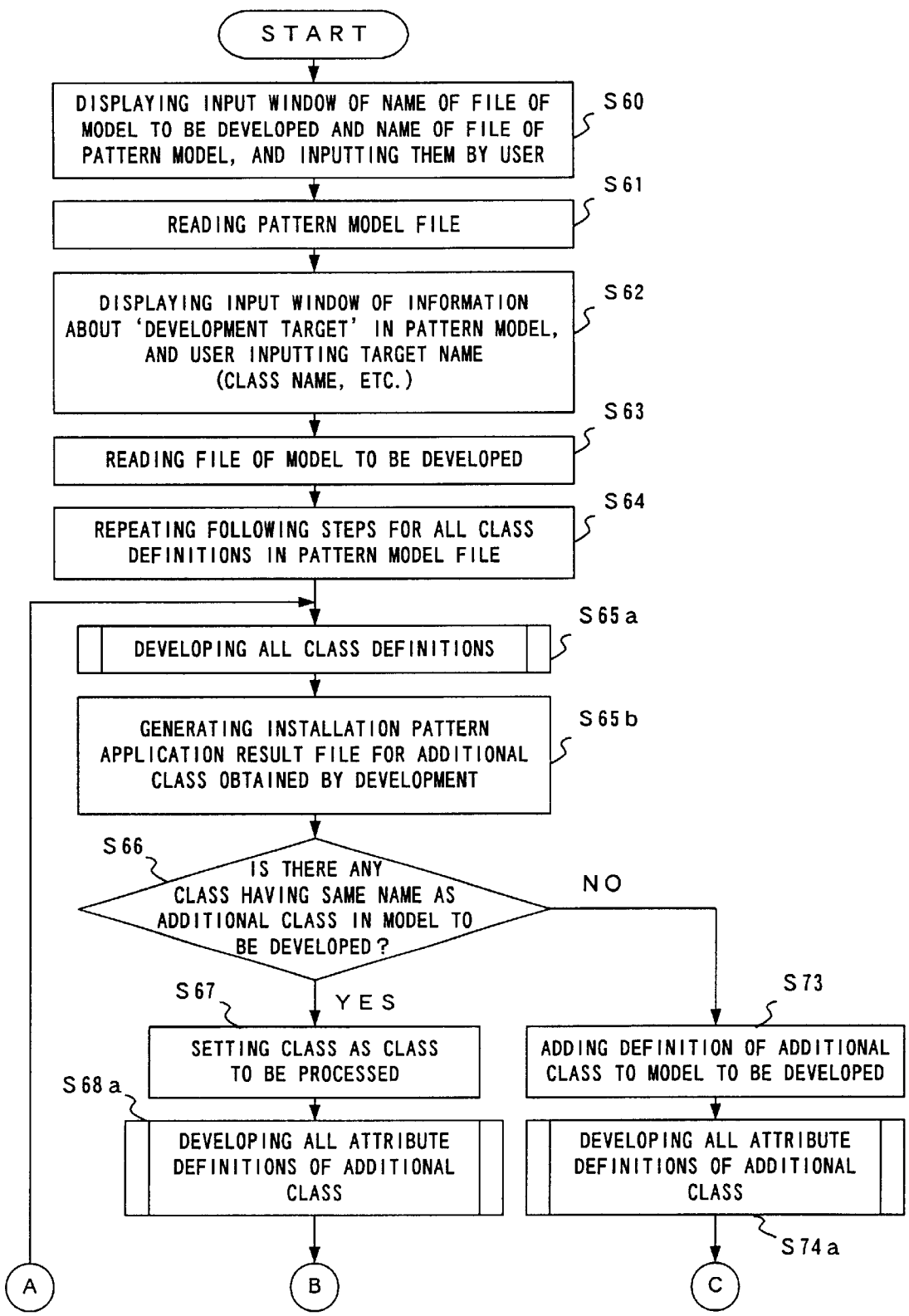
F I G. 6 2

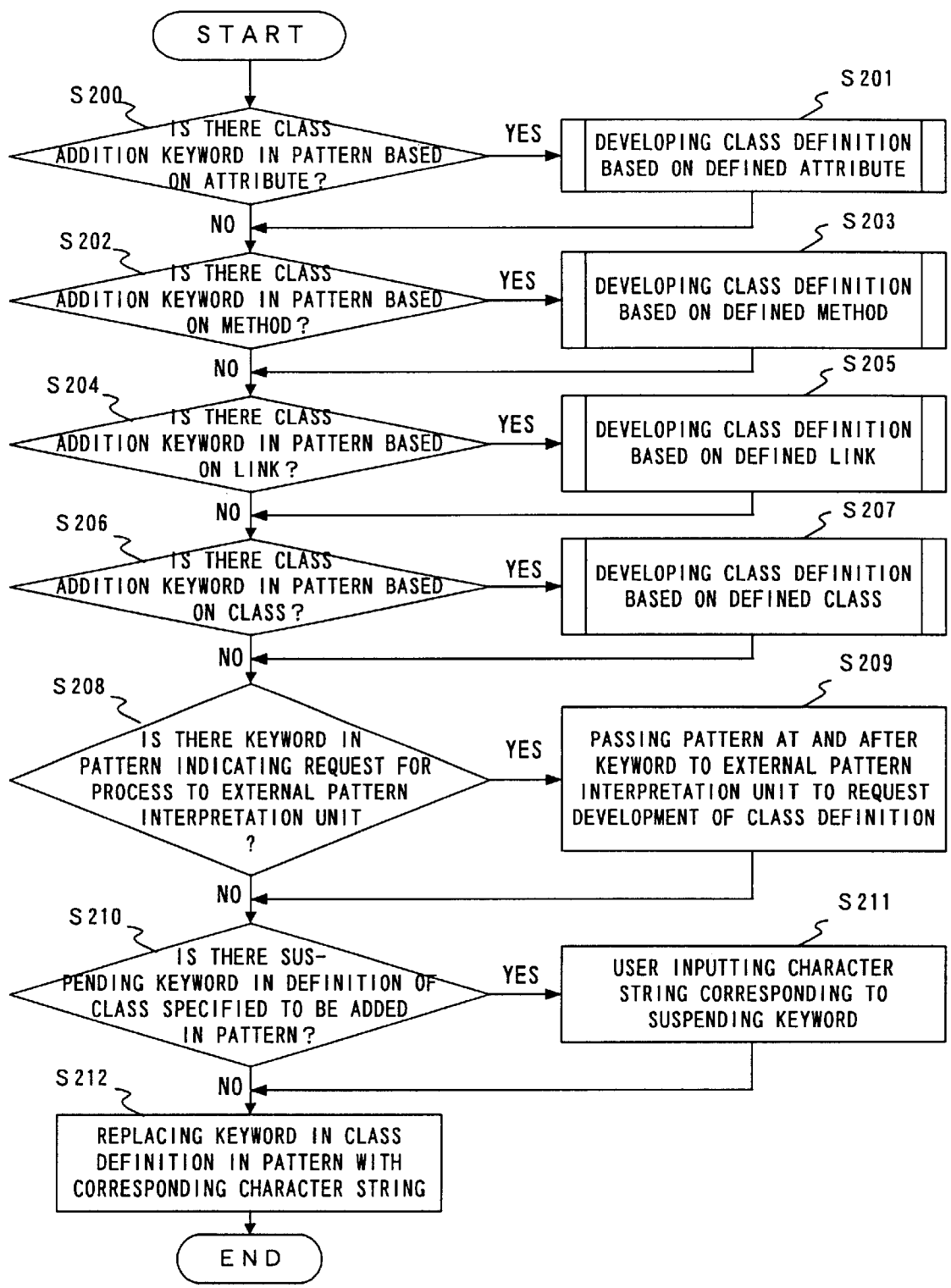
F I G. 6 4

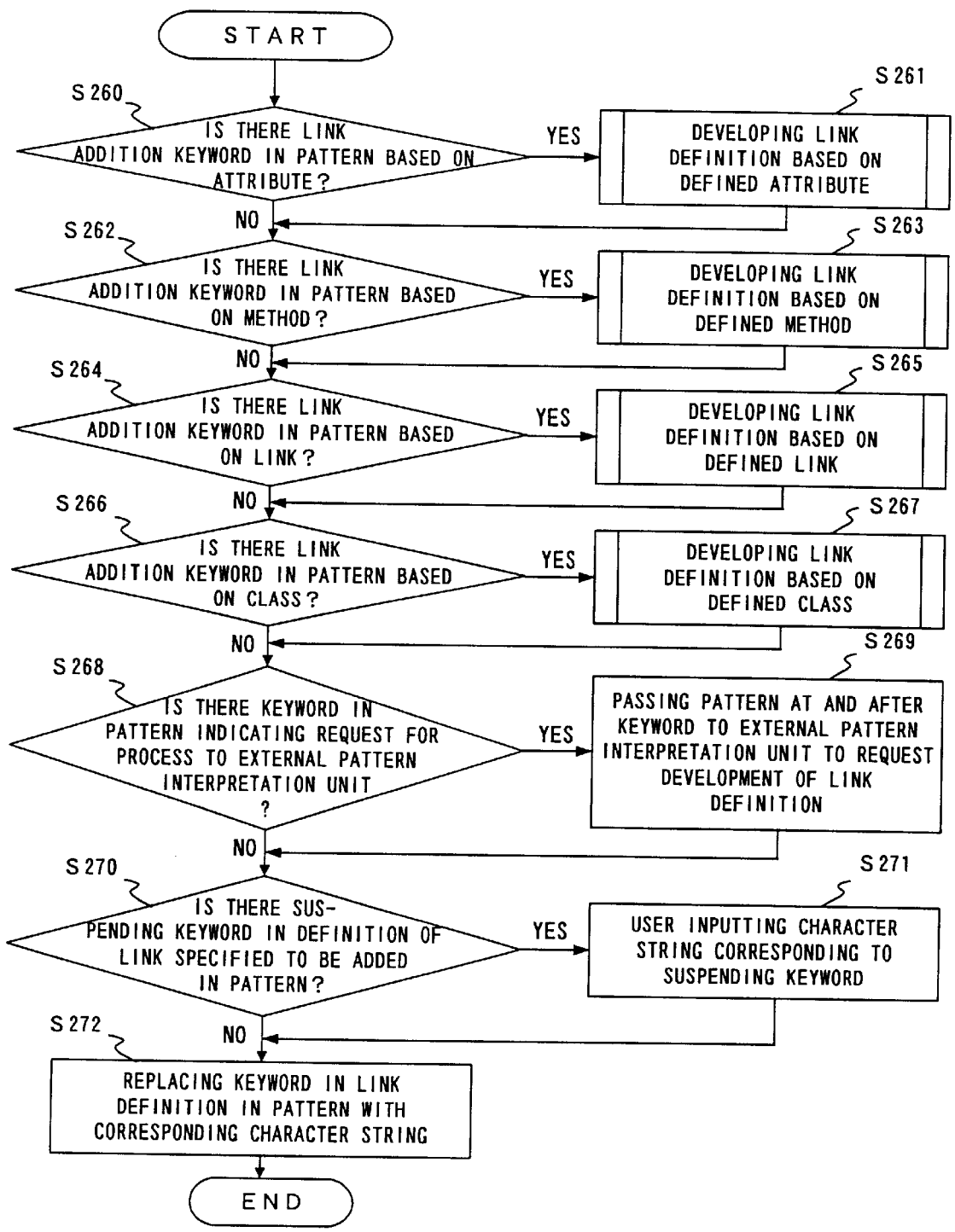
F I G. 6 7

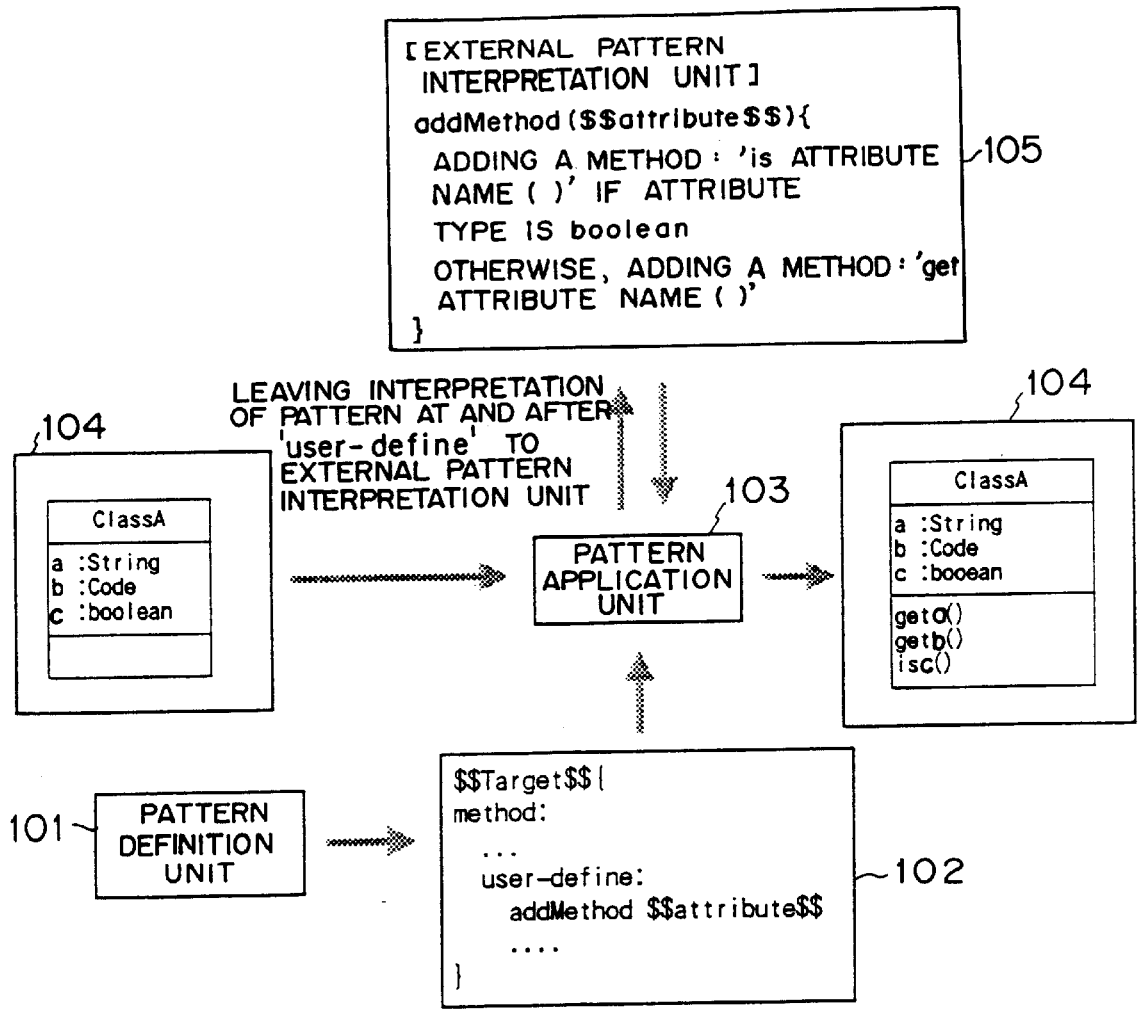
F I G. 84

OBJECT-ORIENTED SOFTWARE DEVELOPMENT SUPPORT APPARATUS AND DEVELOPMENT SUPPORT METHOD

BACKGROUND OF THE INVENTION

1. Field of the Invention

The present invention relates to an object-oriented software development support technology, and more specifically to an object-oriented software development support apparatus for systematically defining a pattern, for example, an analysis pattern, a design pattern, and an implementation pattern, with which the operations and the structure of an object-oriented model can be defined, automatically detailing a model by applying the above described patterns to a model to be developed, and automatically generating a source code applicable to the model.

2. Description of the Related Art

An object-oriented software technology refers to a technology of developing software using something in the present world (object) as a configuration unit. Recently, a number of object-oriented analysis and design techniques have been suggested.

In the object-oriented analysis and design techniques, a procedure of generating a specification to be described in analysis and design is determined. To generate the above described specifications, software analysis and design support apparatuses for supporting the specification generating operation have been used.

In these software analysis and design support apparatuses, for example, to obtain excellent design, the know-how of a previously generated design is represented as a pattern for good repeatability. The pattern can also be used to share the know-how in a developing project.

Relating to the above described pattern, there are design patterns describing the structure of a plurality of objects designed to solve a problem, for example, describing class groups and the behaviors of the class groups when a design is set. When an implementing process is performed, an implementation pattern is used as a coding know-how about source code. Similarly, when an analyzing process is performed, an analysis model can be used. A developer can reuse the development know-how by developing a software model and program based on the pattern, thereby improving the productivity of the software. and design patterns are summarized and published as a book (for example, 'DESIGN PATTERN FOR REUSE IN OBJECT-ORIENTED CONCEPT' by E. Gamma, et al. and published by SoftBank). However, a method of using the patterns has been followed to prepare a specification by applying individual analysis patterns and design patterns to a practical model to be developed. Since various patterns have been introduced by publications, there has been the problem that it is difficult to perform a series of operations of fully understanding the patterns, finding out an appropriate pattern as a model to be developed, determining a usage for an application to be developed, and actually applying the pattern. Although the pattern have been fully understood, there has been the problem that the ratio of a pattern applied to an application is low.

The conventional apparatuses for supporting the application of patterns have been an apparatus (Tokukaihei 9-237180) for preparing a specification by applying a pattern, and an apparatus (Tokukaihei 9-198242) for checking whether or not a pattern can be correctly applied to a model. However, with these apparatus, a user specifies, when a pattern is applied, the correspondence between the component of a pattern and the component of a model to be designed by a developer. Therefore, the efficiency of a pattern applying operation cannot be greatly improved.

On the other hand, an automatic program generating technique for automatically applying a pattern through a macro development has been used. However, in the conventional method (Tokukaihei 1-191233, Tokukaisho 61-72338), it is necessary to specify a value for replacing (developing) a macro to perform a macro (variable) development.

SUMMARY OF THE INVENTION

The present invention aims at providing an object-oriented software development support apparatus and method for attain the following five objects: 1) to systematically register patterns, apply the patterns based on the systematic architecture, appropriately and efficiently reuse the patterns, and efficiently support the development of software; 2) to obtain a higher ratio of the patterns applicable to a model to be developed as well as existing patterns by newly defining the patterns extracted for the application of a developer; 3) to automatically generate a source code applied to a specification as well as to generate a specification by applying a pattern; 4) to automatically generate a model and a program desired by a developer by easily defining various object-oriented patterns; 5) to efficiently and automatically generate software by reducing the necessity of specifying various items by the developer by only specifying the location of data for the development within the patterns themselves.

The object-oriented software development support apparatus according to the first aspect of the present invention includes: a pattern architecture storage unit for storing pattern information about a plurality of applicable patterns and inter-pattern relevant information for association among patterns having an antecedent/consequent relationship when the software is developed; and a pattern application unit for applying to a model to be developed a pattern whose application has been approved by the user among the patterns stored in the pattern architecture storage unit and detailing the model, and supporting the development of software corresponding to the model. Furthermore, the pattern application unit can be externally provided with a pattern application history information storage unit storing an application history of a pattern by recording and referring to the pattern applied by the pattern application unit; and a pattern application history interpretation unit for obtaining the reusability, for example, the number of applying processes, of each pattern and a pattern architecture by referring to the history information stored in the pattern application history information storage unit.

The object-oriented software development support apparatus according to the second aspect of the present invention includes: a pattern information definition unit for defining pattern information applicable, when an object-oriented software is developed, according to the externally obtained pattern definition information; a pattern storage unit for storing the defined pattern information; and a pattern application unit for detailing a model by applying the pattern information stored in the pattern storage unit to a model to be developed, and supporting the development of software corresponding to the model. In addition, the pattern application unit of the object-oriented software development support apparatus according to the second aspect of the present invention can be connected to an external pattern interpretation unit.

In addition, a computer-readable storage medium, for use in the object-oriented software development support apparatus according to the present invention, storing a program to direct a computer to perform the Steps of: storing pattern information about a plurality of patterns applicable when the object-oriented software is developed, and inter-pattern relevant information for association among patterns having an antecedent/consequence relationship among the plurality of patterns when the software is developed; and applying to a model to be developed a pattern whose application has been approved by the user among the stored patterns, detailing the model, and supporting the development of the software corresponding to the model.

BRIEF DESCRIPTION OF THE DRAWINGS

FIG. 2 is a block diagram of the basic configuration of the object-oriented software development support apparatus according to the present invention;

FIG. 5 is a flowchart of the entire software developing process according to the first embodiment of the present invention;

FIG. 10 shows an example of defining pattern information;

FIG. 13 shows an example of a template as a pattern information definition format;

FIG. 17 shows an example (2) of a pattern information display screen;

FIG. 18 is an example of a pattern architecture display screen;

FIG. 21 is a flowchart of the process of developing all attribute definitions of an added class;

FIG. 24 shows an example of a development model of a pattern to be applied;

FIG. 29 shows an example of defining a target manager class in the pattern model file;

FIG. 30 shows an example of outputting an implementation pattern application result file;

FIG. 33 shows an example of a source code (header file) output by a CASE tool;

FIG. 34 is an example of a source code (body file) output by a CASE tool;

FIG. 36 shows an example of a body file into which an operating body is inserted;

FIG. 39 shows an example of a pattern information definition format template fur use in adding a keyword to pattern information;

FIG. 41 shows an example of pattern application history information;

FIG. 42 is a flowchart of the process of the pattern application unit using pattern application history information;

FIG. 44 is a flowchart of the process of the pattern application history interpretation unit;

FIG. 56 shows an example of applying a pattern for adding a link based on the data of an already defined method;

FIG. 62 is an entire flowchart showing the pattern applying process in which an element of a new object is added.

FIG. 64 is a detailed flowchart of the process of developing all class definitions;

FIG. 67 is a detailed flowchart of the process of developing all link definitions (relationship definitions) of an added class;

FIG. 84 shows an example of applying a pattern containing the process of the external pattern interpretation unit.

DESCRIPTION OF THE PREFERRED EMBODIMENTS

The embodiments of the present invention are explained below in detail by referring to the attached drawings.

Figure 1:
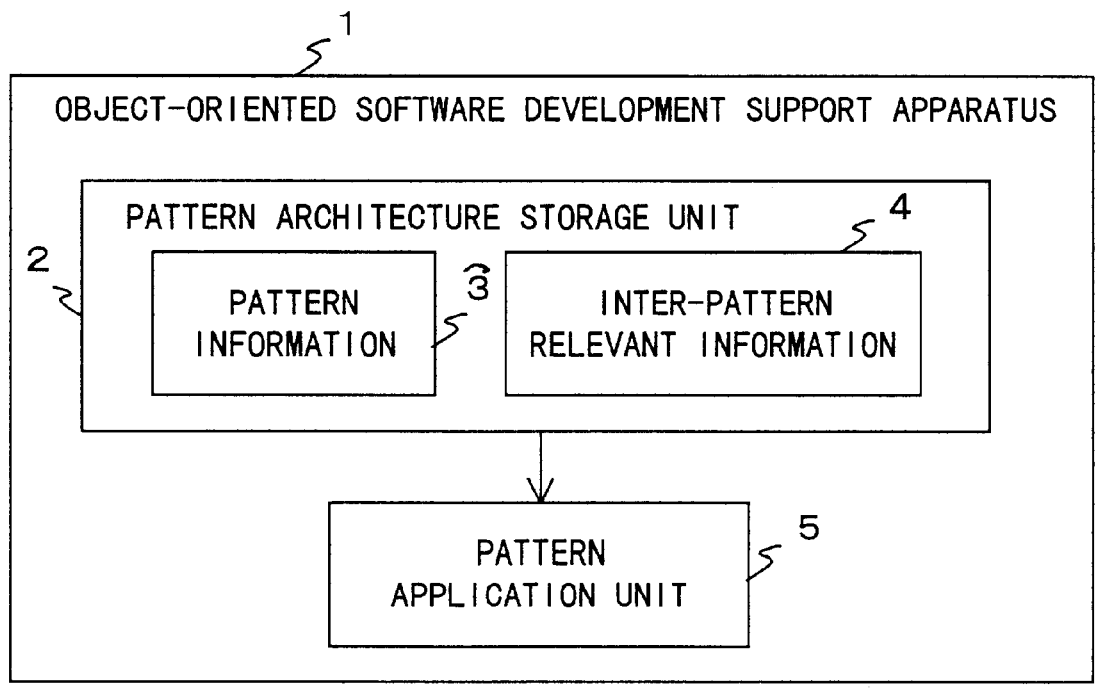
FIG. 1 is a block diagram of the configuration showing the principle of the present invention.

FIG. 1 is a block diagram of the configuration showing the principle of the present invention. FIG. 1 is a block diagram of the configuration of an object-oriented softwate development support apparatus 1 for supporting an object-oriented software design.

In FIG. 1, a pattern architecture storage unit 2 stores pattern information 3 about a plurality of applicable patterns when object-oriented software is developed, and inter-pattern relevant information 4 for association among patterns having an antecedent/consequent relationship in the plurality of patterns when the software is developed.

A pattern application unit 5 applies to a model to be developed a pattern whose application has been externally approved, for example, by the user, among the patterns stored in the pattern architecture storage unit 2, details the model, and support the development of the software corresponding to the model.

According to an embodiment according to the present invention, the pattern architecture storage unit 2 can store as the inter-pattern relevant information 4 a viewpoint for use in developing software and selection items corresponding to the viewpoint. The pattern application unit 5 can automatically select a pattern corresponding to the viewpoint and the selection items, for example, according to an instruction from a user, and apply the selected pattern to a model to be developed.

According to an embodiment of the present invention, the pattern architecture storage unit 2 can furthermore stores a retrieval key for each of plural pieces of pattern information, and the pattern application unit 5 can apply an externally specified pattern to a model to be developed among the patterns to be retrieved using an externally input retrieval key.

According to an embodiment of the present invention, the apparatus can further comprise a pattern information definition unit and a pattern architecture definition unit. The pattern information definition unit can also define pattern information according to the pattern definition information externally input in the format of a pattern template. The pattern architecture definition unit can also define inter-pattern relevant information for association among patterns having an antecedent/consequent relationship according to externally input information.

According to an embodiment of the present invention, the software development support apparatus can further comprise: a pattern architecture display unit for collectively displaying a pattern architecture corresponding to the plural pieces of pattern information 3 and inter-pattern relevant information 4 stored in the pattern architecture storage unit 2; and a pattern information display unit for displaying the pattern information 3 according to the format of the template corresponding to the pattern information.

According to an embodiment of the present invention, the apparatus can further comprise a pattern architecture navigation unit for interpreting the pattern architecture corresponding to the plural pieces of pattern information 3 and the inter-pattern relevant information 4 stored in the pattern architecture storage unit 2, and can apply to a model to be developed a pattern whose application is approved by the user among the patterns presented by the pattern application unit 5.

For example, the above described plurality of patterns can be analysis patterns, design patterns corresponding to a model to be developed, and implementation patterns as a sample of a source code corresponding to the operation definition of a class contained in analysis and design patterns. In addition, the pattern architecture storage unit 2 can also store the relevant information between analysis and design patterns and implementation patterns as the inter-pattern relevant information 4, and the pattern application unit 5 can apply to a model to be developed the analysis and design patterns selected by, for example, a user, and automatically generate based on the implementation pattern a source code corresponding to the portion to which analysis and design patterns are applied among the model to be developed.

According to an embodiment of the present invention, the object-oriented software development support apparatus can also comprise; a pattern application history information storage unit for holding application history information about a pattern applied to a model to be developed by the pattern application unit 5; and a pattern application history interpretation unit for interpreting the stored application history information and obtaining the reusability, for example, the number of applications of each pattern, plural pieces of pattern information, and the pattern architecture corresponding to inter-pattern relevant information.

In this case, the pattern application unit 5 can interpret the application history information stored in the pattern application history information storage unit, and preliminarily set the data to be externally input when a pattern is applied to improve the efficiency of the pattern applying process.

In addition, the object-oriented software development support apparatus according to the present invention can furthermore comprise a pattern information definition unit, a pattern storage unit, and a pattern application unit. The pattern information definition unit defines pattern information about an available pattern when object-oriented software is developed according to externally provided pattern definition information, and provides the pattern information for the pattern storage unit. The pattern application unit applies the pattern information stored in the pattern storage unit to a model to be developed, details the model, and supports the development of the software corresponding to the model.

In this case, the pattern information definition unit defines pattern information for use in adding a new attribute, method, link, or class according to the data having an attribute of an already defined class in a model to be developed, and the pattern application unit can apply the pattern information to a model to be developed so that a new attribute, method, link or class can be added.

Furthermore, the pattern information definition unit defines pattern information for use in adding a new link, attribute, method, or class based on the data of a link of a class already defined in a model to be developed, and the pattern application unit can apply the pattern information and add the new link, attribute, method, or class.

Otherwise, the pattern information definition unit defines pattern information for use in adding a new method, attribute, link, or class based on the data of a method of a class already defined in a model to be developed, and the pattern application unit can apply the pattern information and add the method, attribute, link, or class.

Furthermore, the pattern information definition unit defines pattern information for use in adding a new class, attribute, link, or method based on the data of a method of a class already defined in a model to be developed, and the pattern application unit can apply the pattern information to a model to be developed and add a new class, attribute, link, or method.

According to an embodiment of the present invention, the pattern information definition unit can define pattern information using, as data about an attribute, method, link, or class to be added, an already defined class, or data about an attribute, a method or a link of the class, define pattern information by representing using a specified processing method a character string expressing data about an attribute, a method, a link, or a class to be added, and define pattern information for use in adding a new attribute, link, method, or a class based on the data satisfying a specified condition among a defined class or the attribute, method, or link of the class.

According to an embodiment of the present invention, the pattern information definition unit defines pattern information containing data indicating that a part of a class already defined in a model to be developed, or an attribute, a method, or a link of the class should be externally specified, for example, by a user, and the pattern application unit can request the user to specify the class, or the attribute, method, or link of the user, and apply the pattern information to a model to be developed depending on the result of the specification.

The object-oriented software development support apparatus according to the present invention can further comprise an external pattern interpretation unit. The external pattern interpretation unit holds, for example, a pattern interpretation rule uniquely regulated by a user, and interprets the pattern information according to the pattern interpretation rule.

In this case, the pattern information definition unit defines the pattern information containing a portion indicating that the pattern information should be interpreted based on the pattern interpretation rule, and the pattern application unit uses the interpretation result obtained from the external pattern interpretation unit when the pattern information is applied, and applies the pattern.

In the object-oriented software development support apparatus according to the present invention, the pattern information definition unit defines pattern information containing a portion indicating that a character string externally input, for example, by a user should be incorporated into a model to be developed while the pattern application unit is applying the pattern, and the pattern application unit incorporates the externally input character string into a model to be developed when the pattern information is applied, and applies the pattern.

The object-oriented software development supporting method according to the present invention comprises the steps of: storing pattern information about a plurality of applicable patterns when object-oriented software is developed, and inter-pattern relevant information for association among patterns having an antecedent/consequent relationship in the plurality of patterns when the software is developed; and applying to a model to be developed a pattern whose application has been externally approved, for example, by the user, among the stored patterns, detailing the model, and supporting the development of the software corresponding to the model.

The computer-readable storage medium storing a program have the functions of: storing pattern information about a plurality of applicable patterns when object-oriented software is developed, and inter-pattern relevant information for association among patterns having an antecedent/ consequent relationship in the plurality of patterns when the software is developed; and applying to a model to be developed a pattern whose application has been approved, for example, by the user, among the stored patterns, detailing the model, and supporting the development of the software corresponding to the model.

According to the present invention as described above, software corresponding to a model can be efficiently supported by, for example, systematically applying to a model to be developed an analysis and design pattern applicable to the model to be developed and an implementation pattern relevant to the analysis and design pattern.

FIG. 2 is a block diagram of the basic configuration of the object-oriented software development support apparatus according to the present invention. In FIG. 2, the development support apparatus comprises as basic components: a pattern architecture storage unit 11, a pattern architecture navigation unit 12, a pattern application unit 13, a pattern information definition unit 14, and a pattern architecture definition unit 15.

The pattern architecture storage unit 11 systematically arranges various patterns such as an analysis pattern, a design pattern, etc., and stores pattern information 16 about each pattern, and inter-pattern relevant information 17 among patterns.

The pattern architecture navigation unit 12 interprets a pattern architecture corresponding to the pattern information 16 and the inter-pattern relevant information 17 stored in the pattern architecture storage unit 11, and presents the user as, for example, a person in charge of the development, with a pattern suitable for a model to be developed.

The pattern application unit 13 is activated by, for example, the pattern architecture navigation unit 12, applies the pattern information 16 and the inter-pattern relevant information 17 stored in the pattern architecture storage unit 11 to a model to be developed, details the model, and automatically generates a source code applicable to an applied pattern. The effect is obtained by changing a model 18 to be developed and a source code 19 in association with the application of the pattern.

The pattern information definition unit 14 defines the pattern information 16 to be stored in the pattern architecture storage unit 11, and the pattern architecture definition unit 15 defines a pattern architecture by defining the inter-pattern relevant information 17 stored in the pattern architecture storage unit 11.

Figure 3:
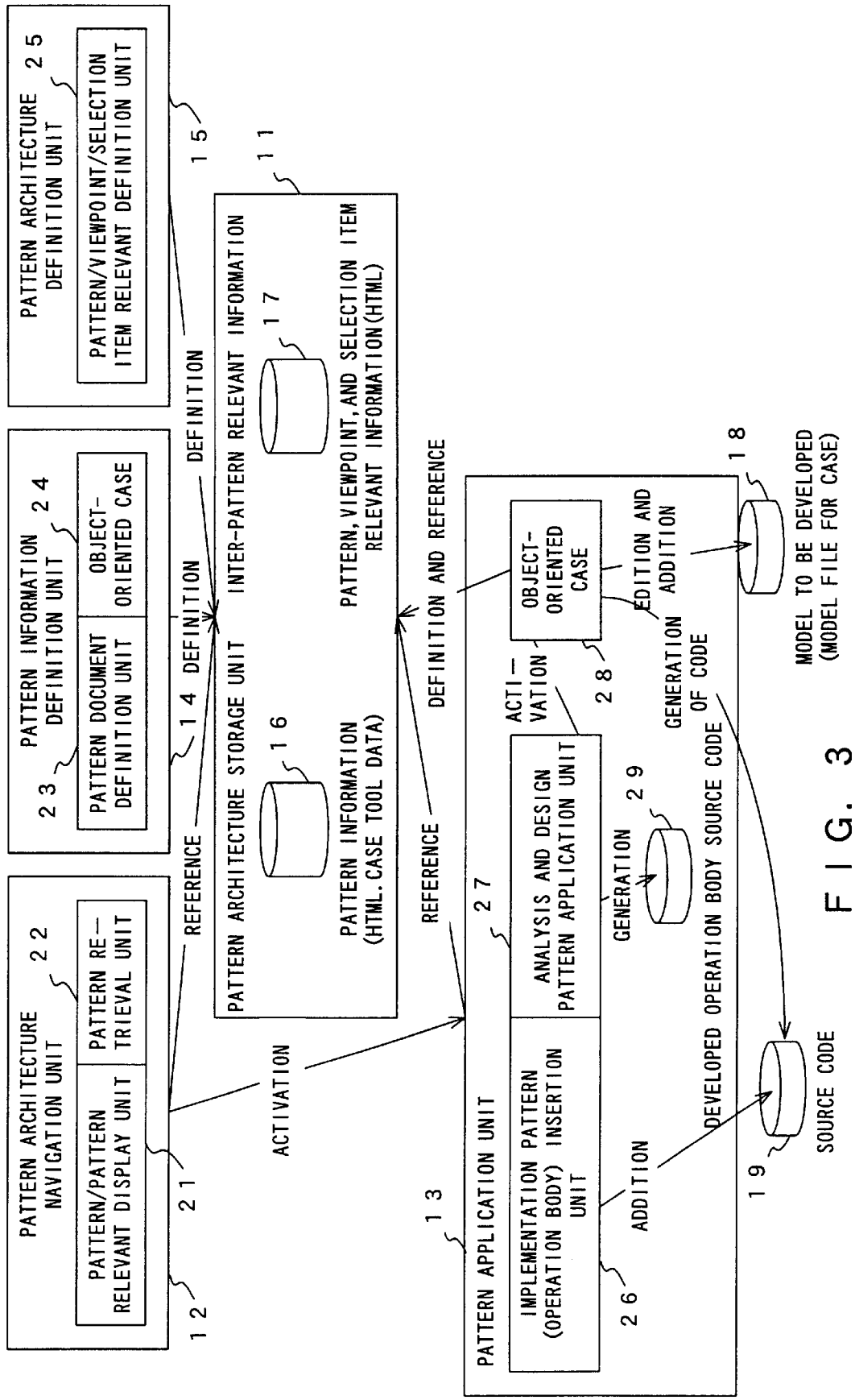
FIG. 3 is a block diagram of the configuration according to the first embodiment of the object-oriented software development support apparatus of the present invention.

FIG. 3 is a block diagram of the configuration according to the first embodiment of the object-oriented software development support apparatus of the present invention. FIG. 3 has a configuration similar to that shown in FIG. 2. FIG. 3 shows the detailed configuration of the pattern architecture storage unit 11 through the pattern architecture definition unit 15.

First, the pattern information 16 stored in the pattern architecture storage unit 11 is described, for example, in the HTML (hyper-text mark-up language) format, and the data is described in the format available by a CASE (computer-aided software engineering) tool. In addition, the inter-pattern relevant information 17 contains information about the components of the pattern architecture described later, for example, a pattern, a viewpoint, and a selection item in, for example, an HTML format.

The pattern architecture navigation unit 12 comprises a pattern/pattern relevant display unit 21 for displaying the entire pattern architecture as necessary, that is, a pattern and inter-pattern relevant information, and a pattern retrieval unit 22 for retrieving a pattern using, for example, a keyword described later. The pattern/pattern relevant display unit 21 and the pattern retrieval unit 22 can be WWW client software, for example, Netscape, Internet Explorer, etc. for use in displaying a pattern architecture and retrieving a pattern.

The pattern application unit 13 comprises an implementation pattern insertion unit 26, an analysis and design pattern application unit 27, and an object-oriented CASE 28. The analysis and design pattern application unit 27 activates the object-oriented CASE 28 to refer to the pattern information 16 and the inter-pattern relevant information 17 stored in the pattern architecture storage unit 11, and edit and add data to the model 18 to be developed, and generates a developed operation body source code 29 described later using an implementation pattern as a sample of a source code corresponding to the operation definition of the class of an object contained in an applied analysis and design pattern. Then, the implementation pattern insertion unit 26 adds the operation body source code 29 to the source code 19 corresponding to the model 18 to be developed, thereby automatically generating a source code.

The pattern information definition unit 14 comprises a pattern document definition unit 23 for defining a pattern document in pattern information; and an object-oriented CASE 24 having a drawing editor for input of drawings in the pattern information. The pattern architecture definition unit 15 comprises a pattern/viewpoint/selection item relevant definition unit 25.

Figure 4:
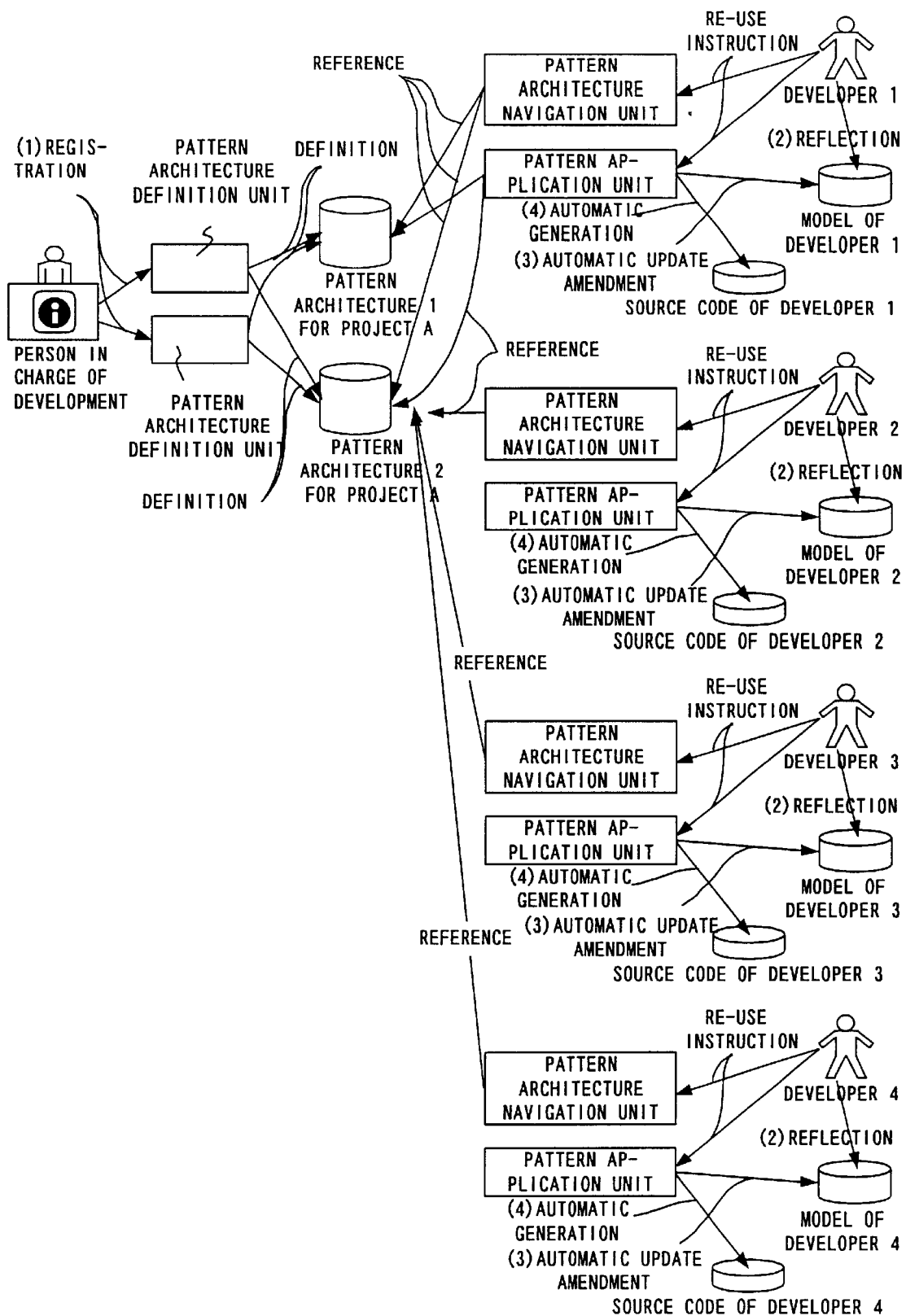
FIG. 4 shows the method of applying the pattern defined as a pattern architecture according to the first embodiment of the present invention.

FIG. 4 shows the definition of a pattern architecture according to the first embodiment of the present invention, and the method for applying a defined pattern. In FIG. 4, a pattern architecture is defined (registered) by a person in charge of the development, that is, in charge of the entire system, and a pattern is applied to a practical model to be developed by a developer of each model.

In FIG. 4, a pattern architecture is defined by a person in charge of the development using the pattern architecture definition unit 15 when a pattern is entered in (1) shown in FIG. 4. That is, the person in charge of the development, as a pattern architecture definer, inputs information in a question and guess amendment system using, for example, a question and guess amendment system information edition device. Thus, the pattern architecture definition unit 15 defines a pattern architecture 1 and a pattern architecture 2 for a project, for example, a project A. The pattern architecture 1 is used for access to a database, and the pattern architecture 2 is used for communications between a client and an application server. The defined pattern architecture is operated as restrictions to be observed in the entire project when software is developed.

Each developer refers to the pattern architecture defined in (2) shown in FIG. 4, confirms the definition, that is, the restrictions, of the structure and the behavior of a model to be observed in analyzing, designing, and implementing the model to be developed, and makes the model to be developed, which is being edited by the developer using the CASE, reflect the definition. Normally, an analysis pattern is confirmed as a document, and is added by the developer to a model after the classes and the communications of the message between them have been interpreted for the model to be developed.

Each developer applies a pattern to a model to be developed in (3) shown in FIG. 4, and automatically updates (amends) the model according to the restrictions. A design pattern is normally applied to a design model. When a design pattern is applied, a source code designed for a development application, that is, the developed operation body source code 29 described above by referring to FIG. 3, is automatically generated by the pattern application unit 13.

In (4) shown in FIG. 4, each developer generates a source code (A.hpp, B.hpp if C++) corresponding to the specification unit of a class using the automatic source code generating function of the CASE tool based on the design model. If the implementation pattern insertion unit 26 shown in FIG. 3 is activated, and a source code to be applied, for example, the source code 19 shown in FIG. 3 is specified, then the operation body source code 29 developed as a source code for a model to be developed is automatically inserted into an appropriate position. The word 'operation body' is used to describe the embodiment of the present invention using C++ as a practical example of the software language. In C++, the operation definition is described as being divided into an operation specification (written to \*\*.hpp) and an operation body (written to \*\*.cpp).

FIG. 5 is a flowchart of the entire process of developing software from the definition of a pattern architecture to the completion of a development according to the first embodiment of the present invention. When the process is started as shown in FIG. 5, the pattern architecture definition unit 15 and the pattern information definition unit 14 are simultaneously activated in steps S1 and S2, and the process of the pattern architecture definition unit 15 in step S3 and the process of the pattern information definition unit 14 in step S4 are concurrently performed. When these processes are completed, the pattern architecture storage unit 11 stores the pattern information 16 and the inter-pattern relevant information 17 in step S5. Then, it is determined in step S6 whether or not the definition of a pattern architecture has been completed. If it has not been completed, then the processes in and after steps S1 and S2 are repeated.

If it is determined in step S6 that the definition of the pattern architecture has been completed, then the pattern architecture is distributed and published to each developer in step S7, the pattern architecture navigation unit 12 is activated in step S8, the process is performed by the pattern architecture navigation unit 12 in step S9, the process is performed by the pattern application unit 13 in step S10, and it is determined in step S11 whether or not the development has been completed. If the development has not been completed, then the processes in and after step S8 are repeated, and the entire process terminates when it is determined that the development has been completed.

Figure 6:
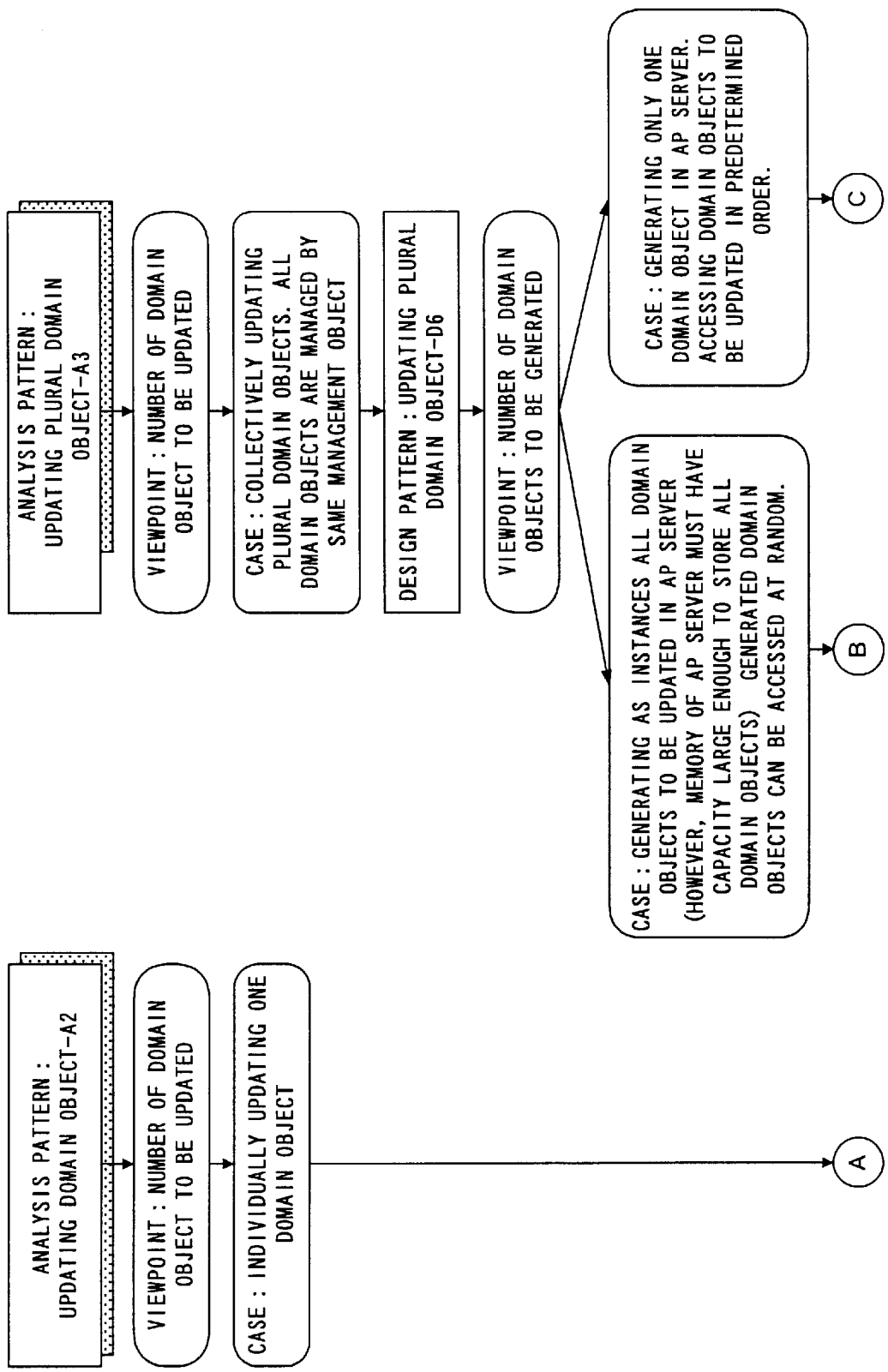
FIG. 6 shows an example of a pattern architecture.
Figure 7:
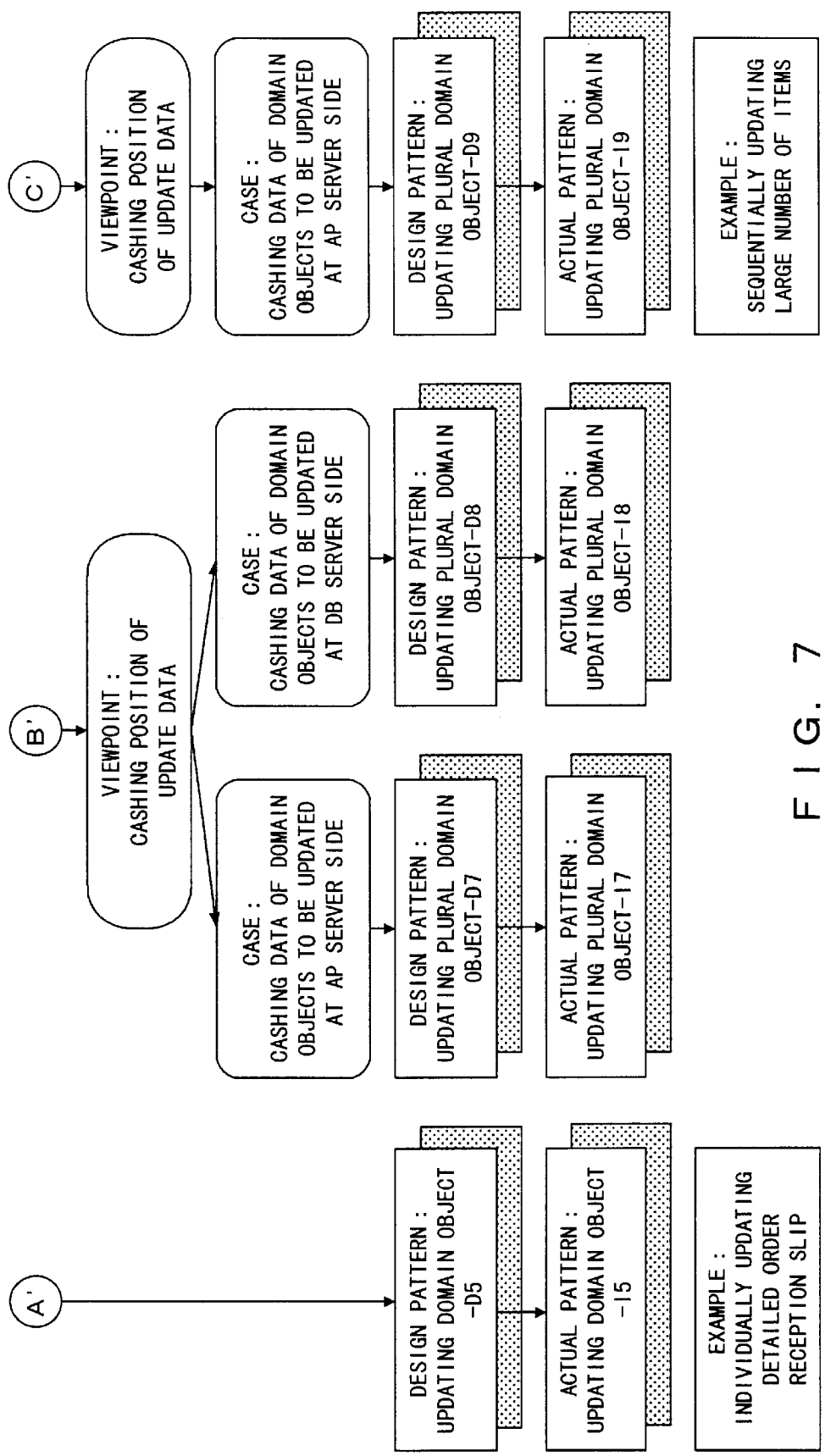
FIG. 7 continues from FIG. 6.

FIGS. 6 and 7 show an example of a defined pattern architecture. In FIGS. 6 and 7, the pattern architecture is obtained by combining using arrows a rectangle indicating a pattern, a viewpoint in the development of software, and a case as a selection item relating to the viewpoint.

The left in FIGS. 6 and 7 is the case in which one domain object is individually updated, for example, a pattern architecture when a detailed order reception slip is individually updated. The right in FIGS. 6 and 7 is an example of a pattern architecture when a plurality of domain objects are updated, for example, when a large number of items are sequentially updated. In the left pattern architecture, the pattern architecture starts with the analysis pattern whose identifier (ID) of the analysis pattern is A2, when an object having one case, that is, one selection item, is individually updated from the viewpoint of the number of domain objects to be updated, and when the design pattern D5 and the implementation pattern I5 are applied.

The pattern architecture in which a plurality of domain objects are updated as described on the right in FIGS. 6 and 7 refers to a case (selection item) in which a plurality of domain objects are collectively updated. Accordingly, the design pattern D6 is applied, and two cases can be assumed depending on whether all domain objects to be updated are generated on the application (AP) server side, or only one object is to be generated. If all domain objects are generated on the memory of the AP server, two cases can be furthermore assumed depending on whether the data for use in updating the domain objects is cashed on the AP server side or on the DB (database) server side. In each of the cases, a corresponding design pattern and a corresponding implementation pattern are applied.

In the design pattern D6, the structure and the behavior of the class of the object sharable among the above described processes are defined. For example, if three classes A, B, and C are required, then their structures and the communications among the classes are defined. That is, an external specification is defined. In this definition, an installation code is not associated because a furthermore detailed design is required to generate an actually operated source code.

For example, in the design pattern D9, the design is furthermore detailed. For example, an attribute indicating a cashing operation is assigned to the class C, or the method for installing the cash is added. That is, the internal specification is defined, and the installation code can be associated. However, the external specification (operation interface definition, etc.) of the class C is the same as that defined in the design pattern D6.

When the number of domain objects generated on the AP server is limited to one, the selection item (case) for the viewpoint of the cashing position of update data is limited to the case where the update data is cashed on the AP server in order to prevent the reduction of performance in communications. That is, the time required to apply a pattern architecture can be shorten when the frequency of communications between the AP server and the DB server is lower. Therefore, a patter is generated such that the frequency of communications can be as lowest as possible.

When the number of objects generated on the memory of the AP server is limited to one, the data transmitted from the DB server to the AP server is held as is, and the data for the object is read or written as necessary. If the update data for a domain object is cashed on the DB server side, the memory of the AP server can be saved, but communications are required each time data is read or written, thereby reducing the performance.

Figure 8:
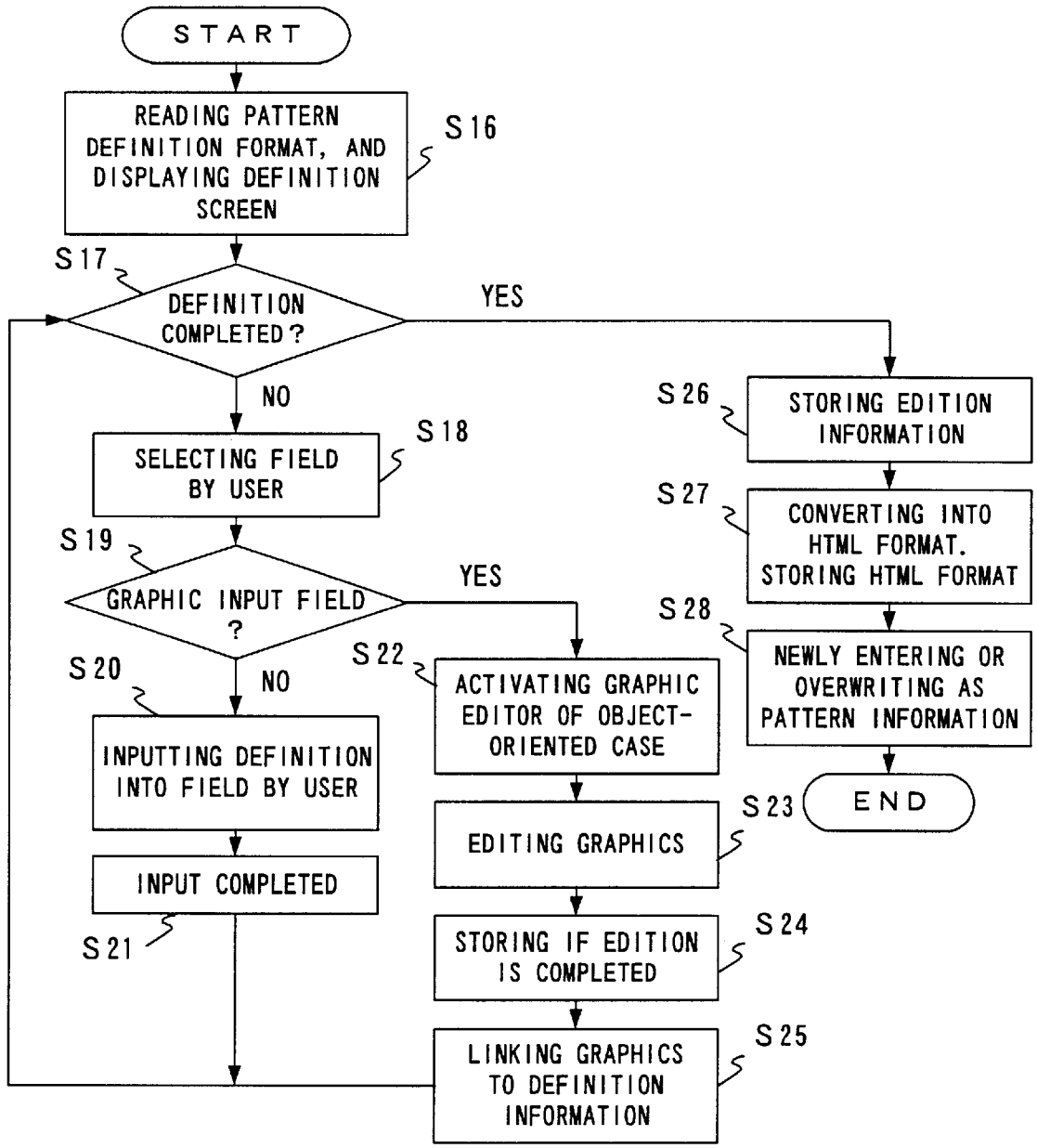
FIG. 8 is a flowchart of the process of the pattern information definition unit.

FIG. 8 is a flowchart of the process of the pattern information definition unit 14. As shown in FIG. 8, when the process is started, a pattern definition format, for example, the pattern information format described later, is read, and the definition screen is displayed in step S16. In step S17, it is determined whether or not the definition is completed. If the definition has not been completed, then the user, that is, each developer, selects a field to which definition information is input. In step S19, it is determined whether or not drawings are to be input to the field.

If no drawings are to be input to the field, the user inputs the definition of the field, for example, a pattern document as pattern information in step S20. When the input is completed in step S21, then the processes in and after step S17 are repeated.

If it is determined in step S19 that drawings are to be input to the field selected, then a drawing editor of the object-oriented CASE is activated in step S22, the drawings are edited in step S23, the edited drawings are stored in step S24, the edited drawings are linked to definition information in step S25, thereby repeating the processes in and after step S17.

If it is determined in step S17 that the definition has been completed, then the edited information is stored in step S26, the information is converted into the HTML format in step S27, the formatted data is stored, and the data is newly registered or overwritten in the memory of the pattern architecture storage unit 11 as pattern information, thereby terminating the process.

Figure 9:
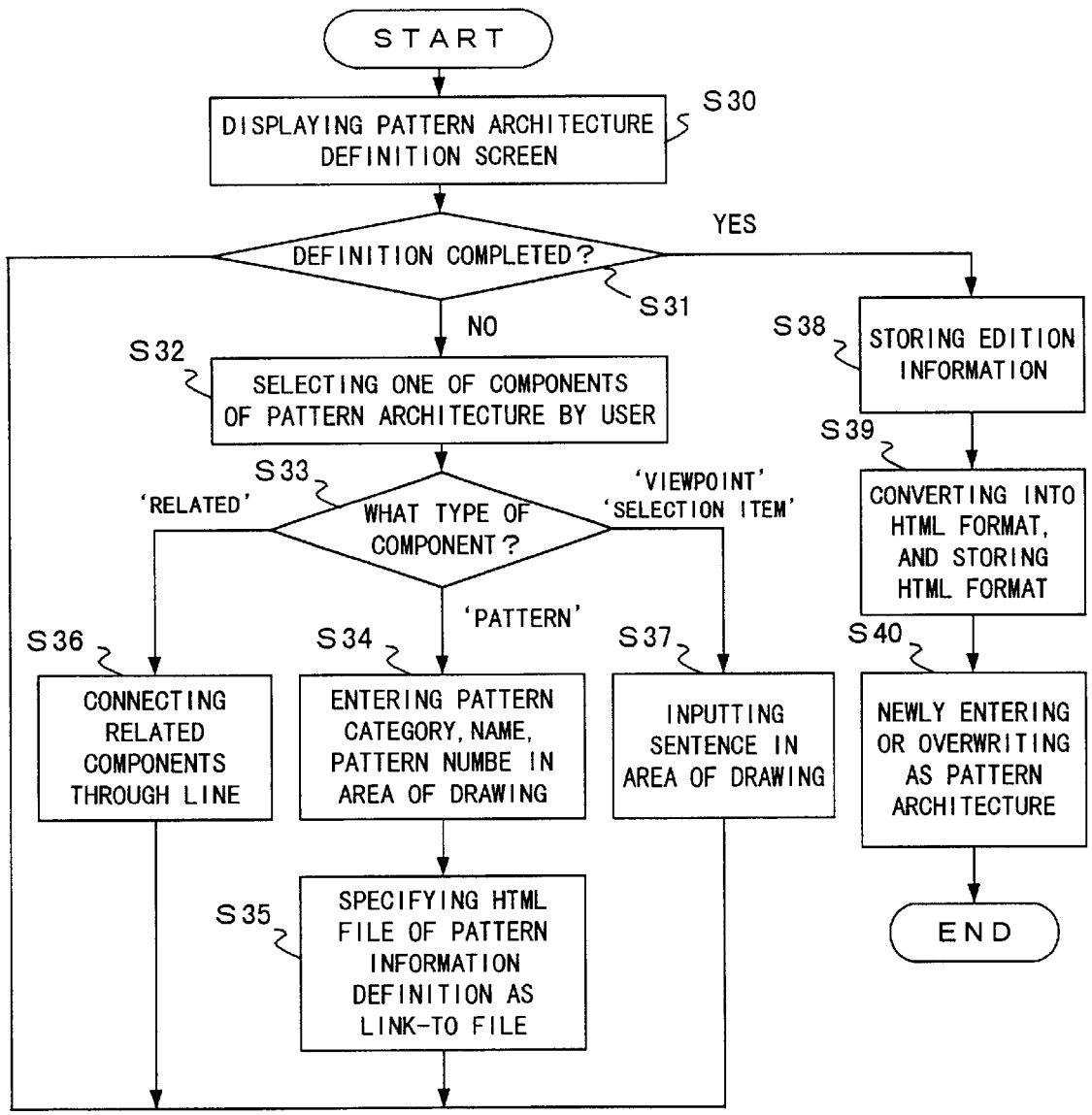
FIG. 9 is a flowchart of the process of the pattern architecture definition unit.

FIG. 9 is a flowchart of the process of the pattern architecture definition unit 15. In FIG. 9, when the process is started, a pattern architecture definition screen, for example, the screen on which the pattern architecture shown in FIGS. 6 and 7 is defined is displayed in step S30. In step S31, it is determined whether or not the definition has been completed. If not, the user, that is, the developer, selects one of the components of the pattern architecture in step S32. A component of a pattern architecture refers to either an arrow indicating the relation between patterns, or a pattern, that is, a rectangle, a viewpoint, or a selection item (case).

It is determined in step S33 what the type of a component is. If it is a pattern, then a pattern category, a name, a pattern number, etc. are written to the area of the drawing, for example, a rectangle, in step S34. After a pattern-information-defined HTML file has been specified as a linked-to file of the pattern in step S35, the processes in and after step S31 are repeated.

When it is determined in step S33 that the type of component is a relation, that is, an arrow, the processes in and after step S31 are repeated after the related components are connected through a line in step S36. When it is determined in step S33 that the type of component is a viewpoint or a selection item, the processes in and after step S31 are repeated after a sentence indicating a viewpoint or a selection item has been input in the area of the drawing in step S37.

If it is determined in step S31 that the definition has been completed, then edition information is stored in step S38, the information is converted into the HTML format and the formatted information is stored in step S39, and the information is newly registered or overwritten as a pattern architecture (inter-pattern relevant information) in the pattern architecture storage unit 11 in step S40, thereby terminating the process.

Figure 11:
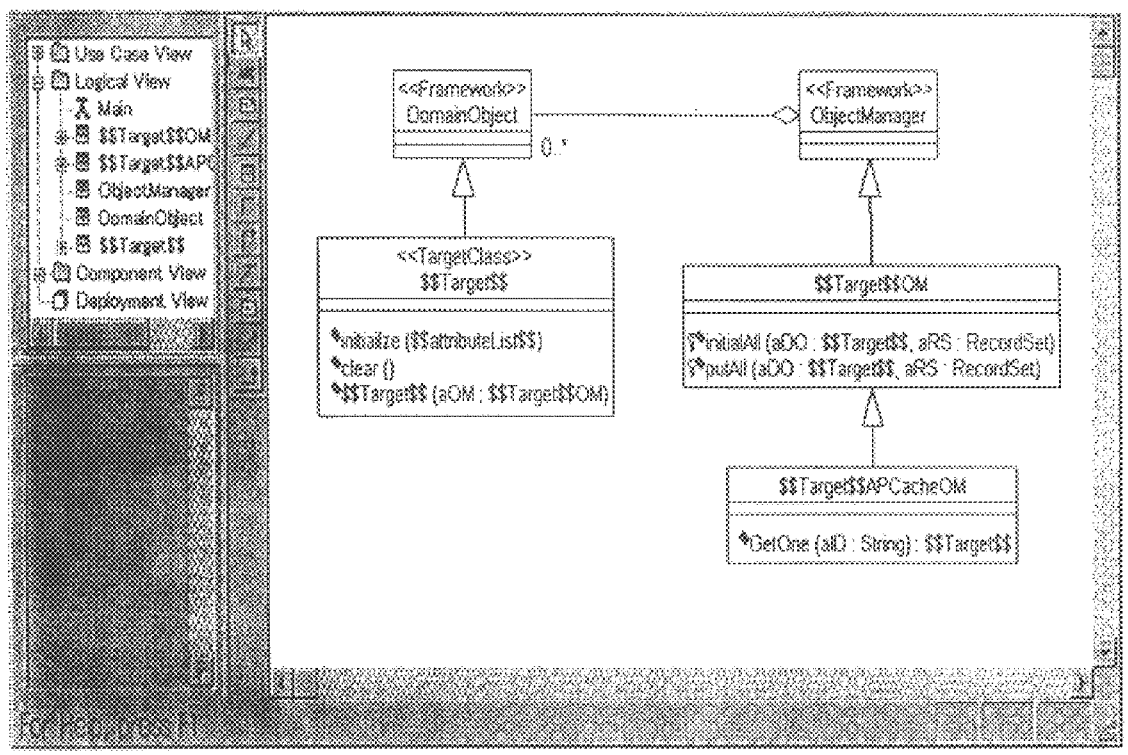
FIG. 11 shows an example of defining pattern information (CASE format)

FIGS. 10 and 11 show pattern information definition examples. Two types of information are provided as pattern information. That is, human-readable information such as a document, a class chart, a sequence chart, etc., and information interpreted by object-oriented CASE tool can be the two types of information.

FIG. 10 shows an example of human-readable information and also shows a pattern information definition example of a design pattern D9 in the pattern architecture shown in FIGS. 6 and 7. The contents are the name, subject, and description of a pattern as a document, a class chart, a sequence chart (MTD) not shown in the drawings, etc. corresponding to a design pattern.

FIG. 11 shows an example of a pattern information definition defined in the format of a pattern model using an object-oriented CASE tool. Normally, in the object-oriented technology, the concept of a pattern can be defined as a combination of a repeatedly appearing problem and a method for solving the problem. In the present invention, a pattern is stored as a pattern document, that is, a document indicating the contents of a pattern, and a pattern model, that is, information for use in automatically generating a source code. Another component is a model which can be interpreted by a CASE tool. The word 'model' in 'pattern model' is different in meaning from the word 'model' in a 'model to be developed'.

Figure 12:
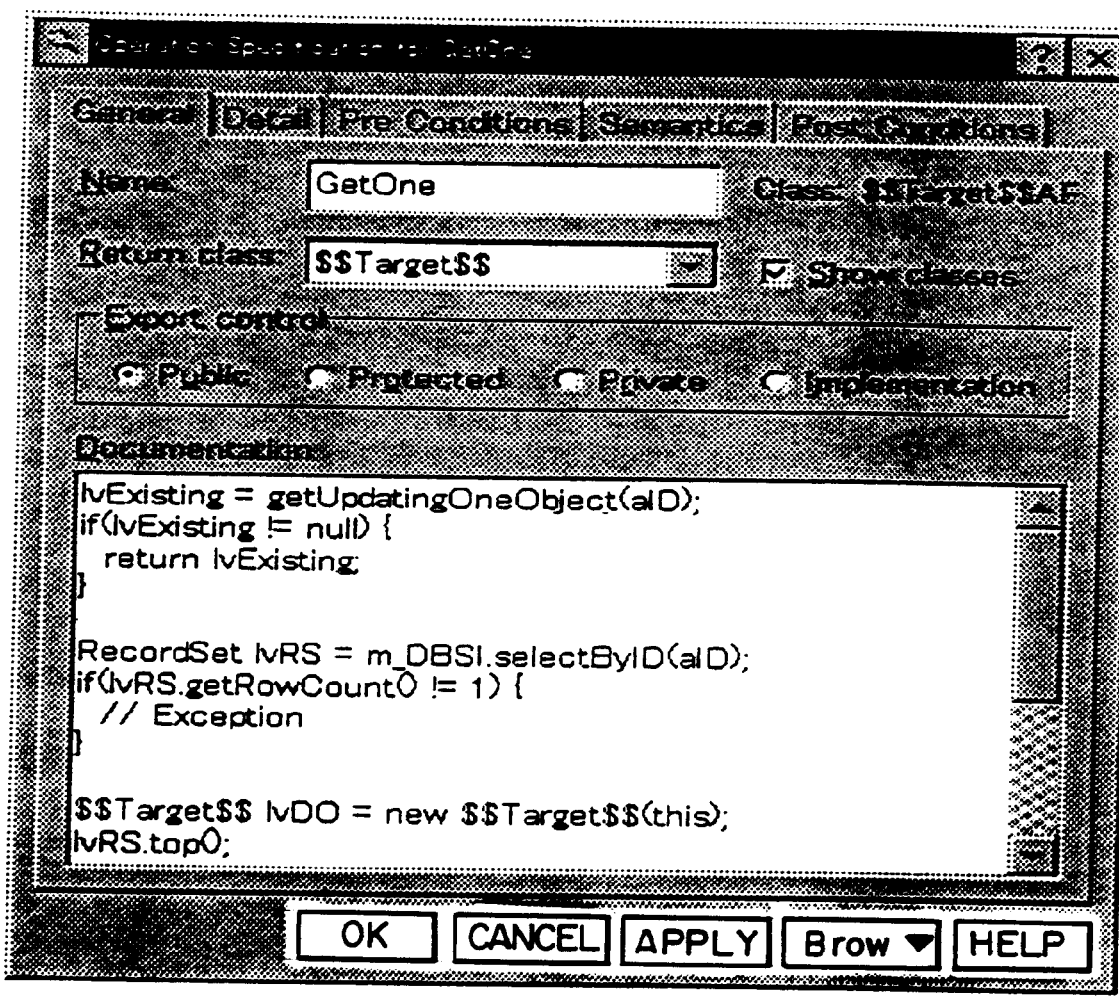
FIG. 12 shows an example of defining a implementation pattern.

FIG. 12 shows an example of the implementation pattern definition screen as a pattern information definition example.

FIG. 13 shows an example of a template as, for example, a pattern information definition format used in step S16 shown in FIG. 18. Using the template, pattern definition information can be easily input. In the template, a scenario explains a practical example, an object drawing shows the structure of an instance, and a sequence drawing shows an interaction between instances.

Figure 14:
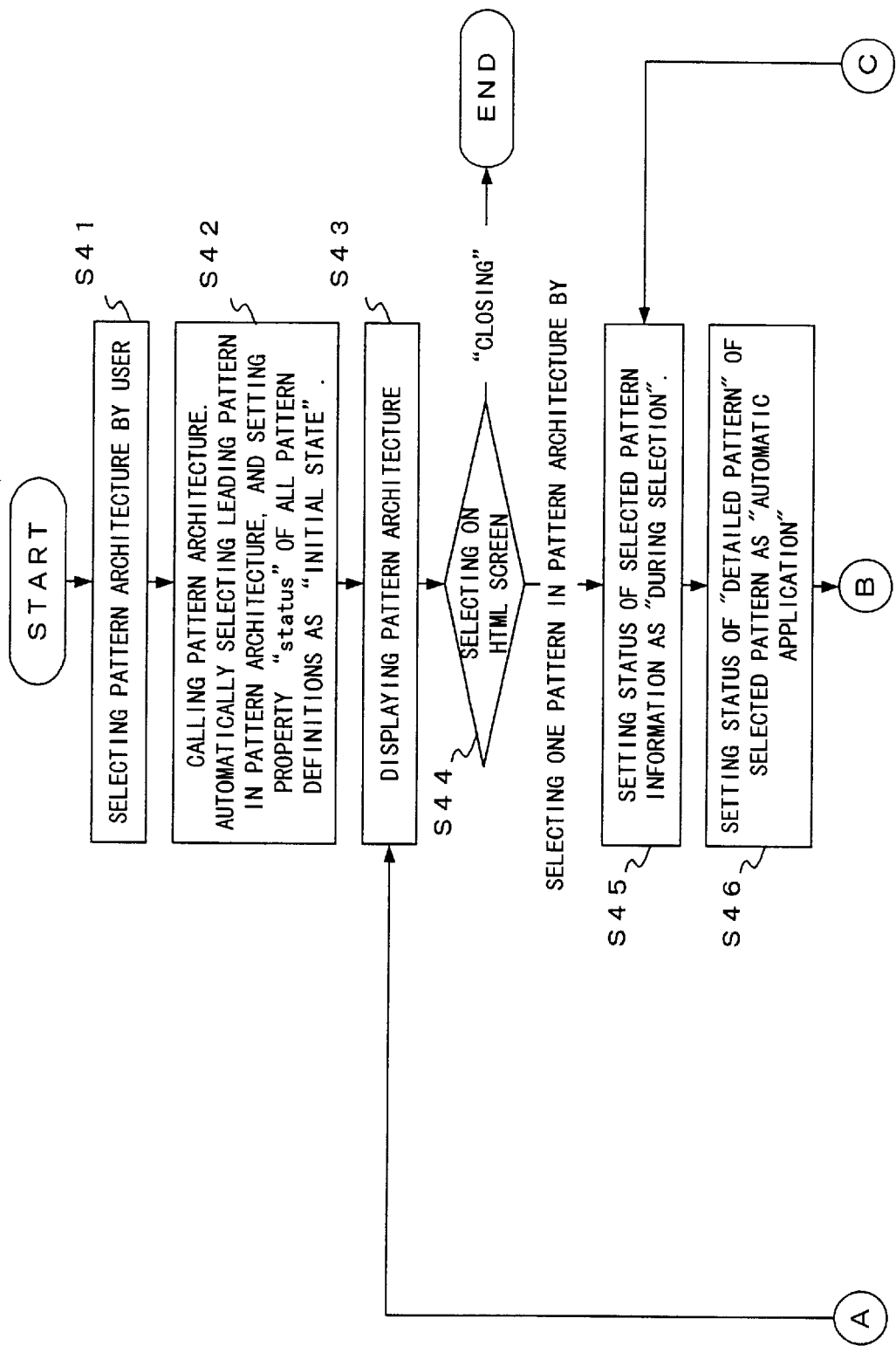
FIG. 14 is a flowchart of the process of the pattern architecture navigation unit.
Figure 15:
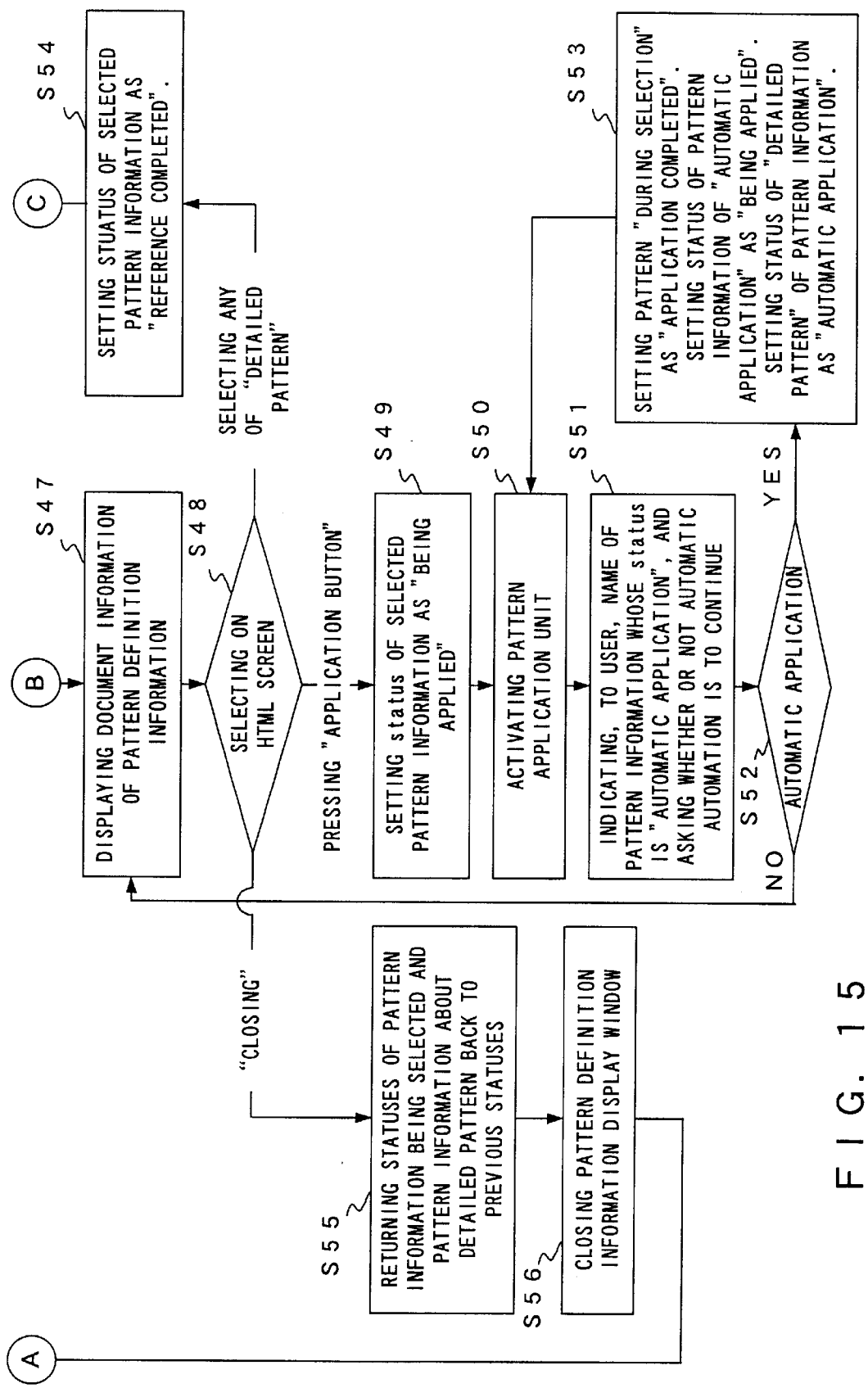
FIG. 15 continues from FIG. 14.

FIGS. 14 and 15 show a flowchart of the process of the pattern architecture navigation unit 12. When the process is started as shown in FIG. 13, the user first selects a pattern architecture in step S41, the pattern architecture is read in step S42, the initial pattern of the pattern architecture is automatically selected, and the property 'status' is set as the 'initial state'. The initial pattern refers to patterns A2 and A3 not indicated by the arrow as shown in FIGS. 6 and 7. In step S42, the property 'status' of these patterns is set as the 'initial state'.

Then, in step S43, the pattern architecture is displayed, and the user selects a pattern on the HTML screen in step S44. If the user selects one pattern in the pattern architecture, that is, one of the initial patterns A2 and A3 in this example, then the status of the pattern information selected in step S45 is changed from 'initial state' to 'during selection'.

Then, the status of the detailed pattern of the pattern selected in step S46 is set as 'automatic application'. The detailed pattern refers to a pattern for which furthermore detailed information is defined after the pattern has been selected. For example, if A2 is selected, D5 is the detailed pattern. If A3 is selected, D6 is the detailed pattern.

Document information as pattern definition information about the selected pattern is displayed in step S47, and the user performs a selecting process on the HTML screen in step S48.

When the user presses the application button, then the selected pattern information, for example, the status of A2 becomes 'being applied' in step S49, and the pattern application unit is activated in step S50 and the pattern A2 is applied.

Then, the name of the pattern information whose status is 'automatic application' to the user, for example, D5, is indicated. An inquiry is issued as to whether or not the automatic application continues. If the automatic application is to continue, the status of the pattern indicated as 'being selected', for example, A2, is set as 'application completed', the status of the pattern indicated as 'automatic application', for example, D5, is set as 'being applied', and the status of the detailed pattern of the pattern indicated as 'automatic application', for example, the pattern I5, is set as 'automatic application' in step S53. Then, the pattern application unit 13 is activated in step S50 the pattern whose state has become 'being applied', that is, D5 in this example, is applied. Thus, the patterns correlated by an arrow are sequentially applied.

If it is determined in step S52 that automatic application is not adopted, then the document information about the pattern information whose status is 'automatic application' is displayed in step S47 so that the user can be urged to make a determination by displaying the document information when the user cannot easily determine whether or not the pattern should be automatically applied continuously. When the application button is pressed again as a result of the selection on the HTML screen in step S48, the processes in and after step S49 are repeated.

If any of the detailed patterns, that is, any of the patterns forward the pattern selected in step S44, is selected in step S48, then the status of the pattern indicated as 'being selected', that is, the selected pattern, is set as 'completely referred to' in step S54. Then, the status of the selected pattern, that is, the detailed pattern, is set as 'being selected' in step S45. These processes are repeated.

Furthermore, if the user selects 'close' on the HTML screen in step S48, then the status of the pattern 'being selected' and the detailed pattern is returned to the previous status value, for example, 'initial state' in step S55. Then, in step S56, the pattern definition information display window is closed. After the pattern architecture is displayed in step S43, for example, the 'closing' is selected on the HTML screen in step S44, thereby terminating the process.

Figure 16:
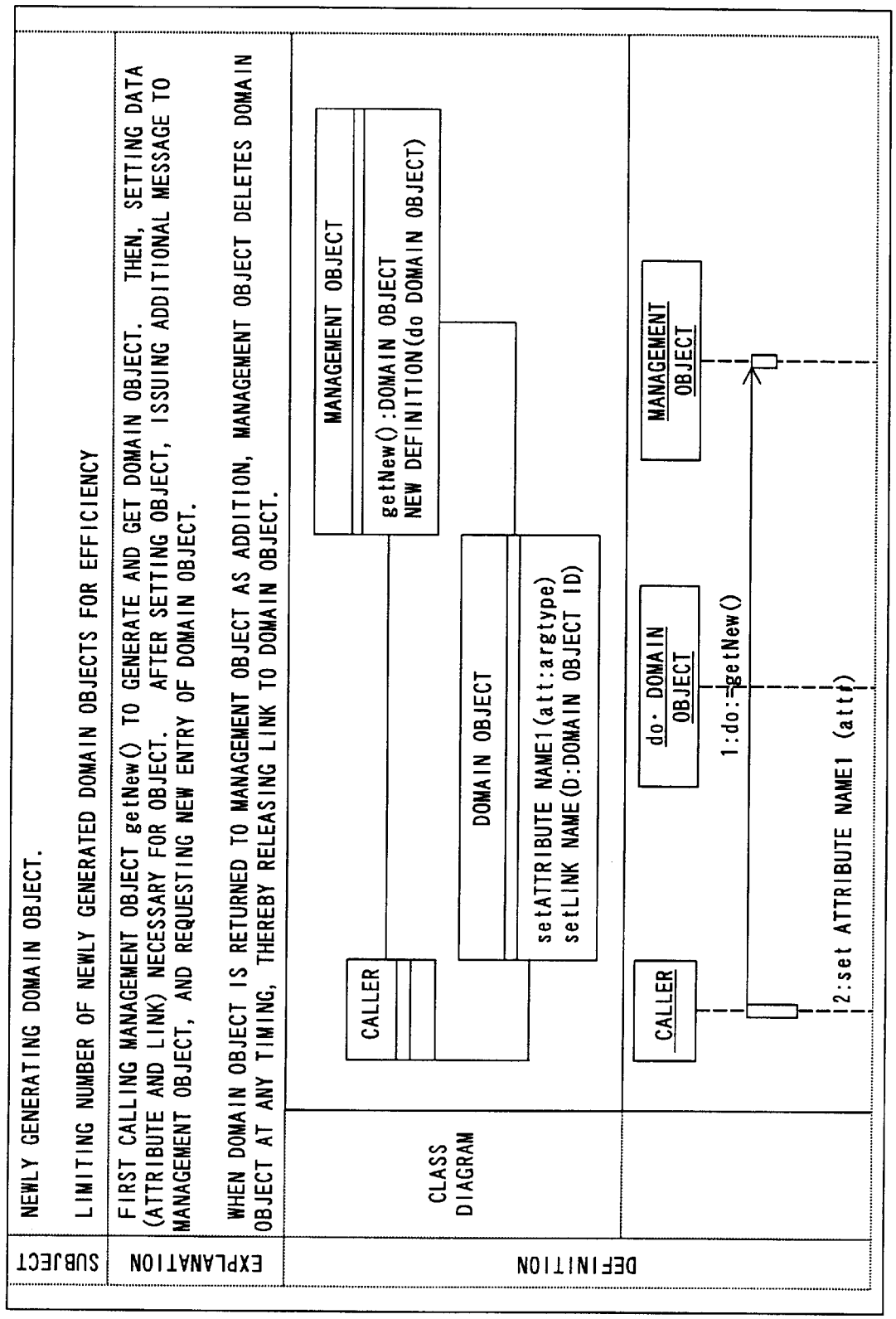
FIG. 16 shows an example (1) of a pattern information display screen.

FIGS. 16 and 17 show examples of the pattern information display screens. The screen shown in FIG. 17 is displayed by scrolling the screen shown in FIG. 16. Pressing the application button at a lower portion in FIG. 17 corresponds to pressing the application button on the HTML screen in step S48 shown in FIGS. 14 and 15.

FIG. 18 shows an example of the pattern architecture display screen. These screens can be displayed by using, for example, Netscape as well as the pattern information display screen shown in FIGS. 16 and 17.

FIGS. 19 through 23 are flowcharts of the process of the pattern application unit 13. According to the embodiments of the present invention, a variable in a format interpreted by the pattern application unit 13, for example, $$Target$$ is used to process unique information provided for each development application to handle an actual model to be developed. Various types of variables are prepared in this format by the system in which the macro development system, a wellknown technology, is used as a basic technology. The pattern application unit 13 interprets the variable in this format, displays an input screen of the information required for each development application, receives an input from the user, that is, the developer, and develops, for example, substitutes the value.

Figure 19:
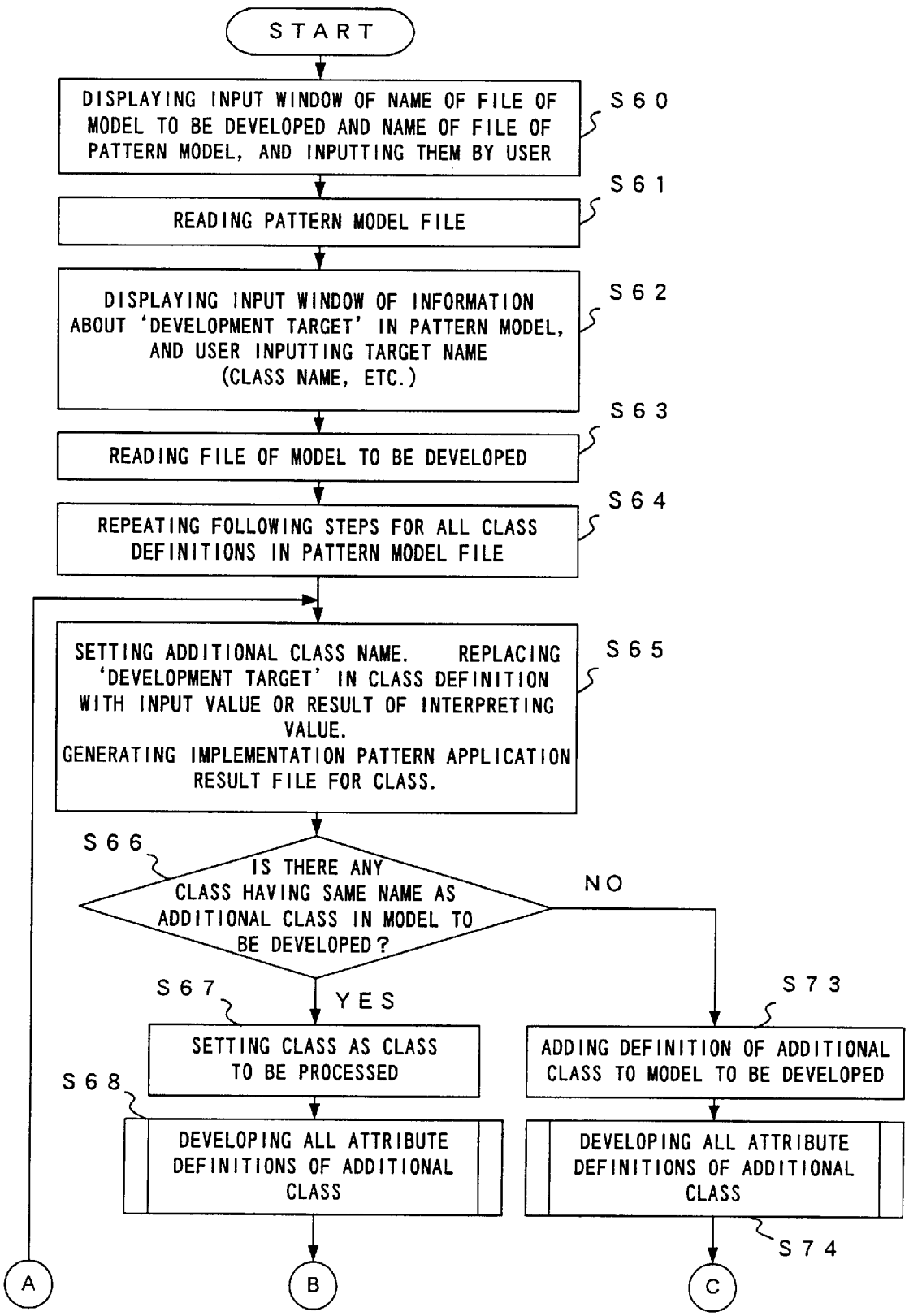
FIG. 19 is an entire flowchart of the process of the pattern application unit.
Figure 20:
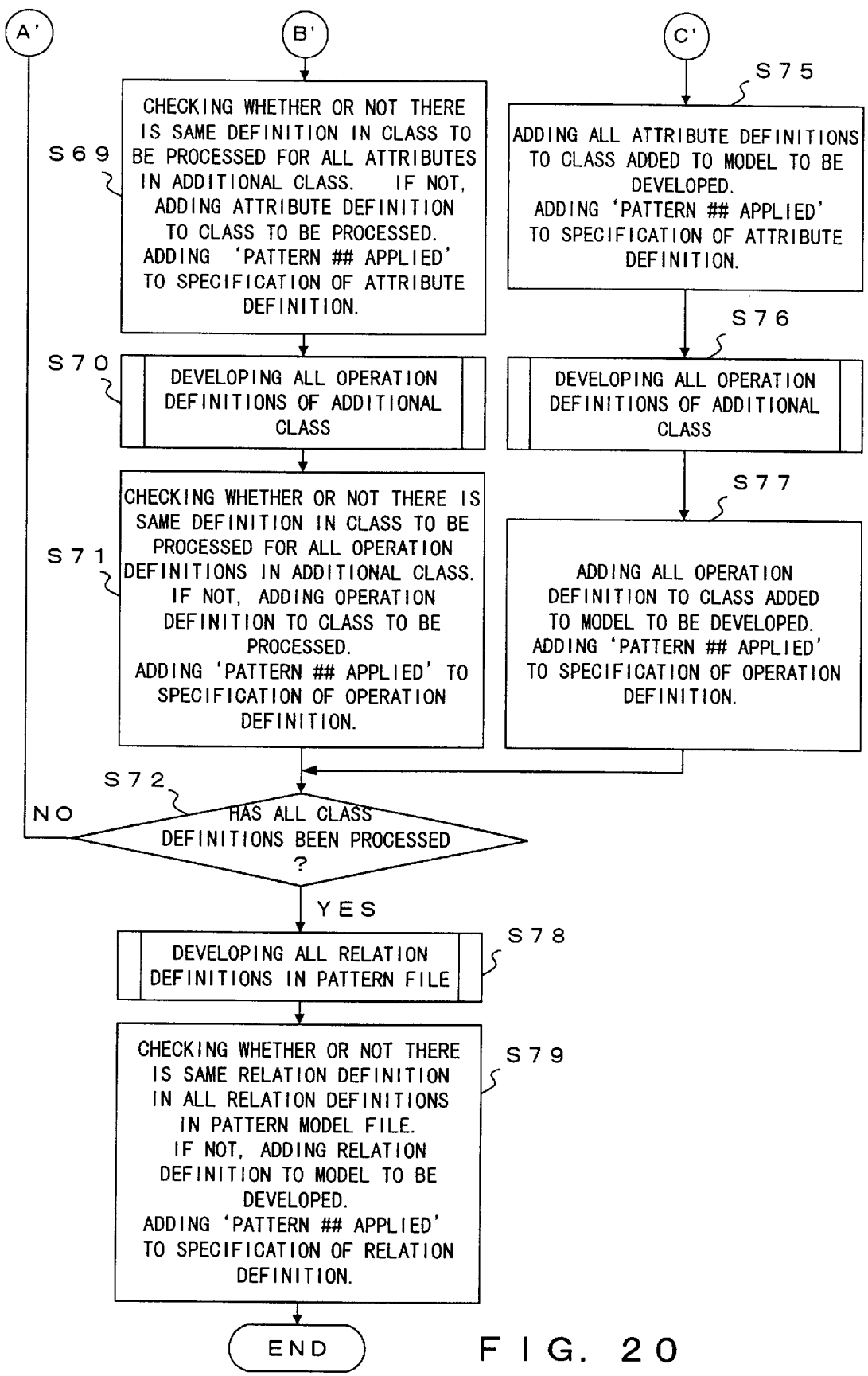
FIG. 20 continues from FIG. 19.

FIGS. 19 and 20 show a flowchart of the entire process of the pattern application unit 13. In FIGS. 19 and 20, when the process is started, the input window of the file name of a model to be developed and the file name of a pattern model is displayed in step S60, and these names are input by the user. Then, the pattern model file is read in step S61, the input window of the information about the development target ($$Target$$) in the pattern model is displayed, and the name of a target (a class name, etc.) is input by the user. The model to be developed is read in step S63, and the processes in step S65 through S77 are repeated for all class definitions in the pattern model file in step S64.

First, in step S65, one class in the pattern model file is set as an additional class name, and the development target in the class definition is replaced with a value input by the user, or the result of the interpretation of the value. Then, the implementation pattern application result file for the class is generated, that is, prepared. In step S66, it is determined whether or not there is a class having the same name as the additional class in the model to be developed. If yes, it is determined in step S67 that the class is to be processed, and the definitions of all attributes are developed for the additional class. The process of the step is described later by referring to FIG. 21.

Then, in step S69, it is checked whether or not the same attribute definition exists in the class to be processed relating to all attributes of the additional class. If not, the attribute definition is added to the class to be processed, and 'the pattern## has been applied' is added to the specification of the attribute definition. In step S70, all operation definitions for the additional class are developed. The process in this step is described by referring to FIG. 22. The pattern## is the file name of, for example, a pattern model file.

In step S71, it is checked whether or not the same operation definition exists in the class to be processed relating to all operation definitions of the additional class. If not, the operation definition is added to the class to be processed, and 'the pattern## has been applied' is added to the specification of the operation definition. In step S72, it is determined whether or not all class definitions have been processed. If not, the processes in and after step S65 are repeated.

In step S66, if there are no classes having the same name as the additional class in the model to be developed, then it is necessary to add an additional class as a related class to the model to be developed. Then, in step S73, the definition of the additional class is added to the model to be developed, and the definitions of all attributes are developed in step S74. The process of this step is shown in FIG. 21.

Figure 22:
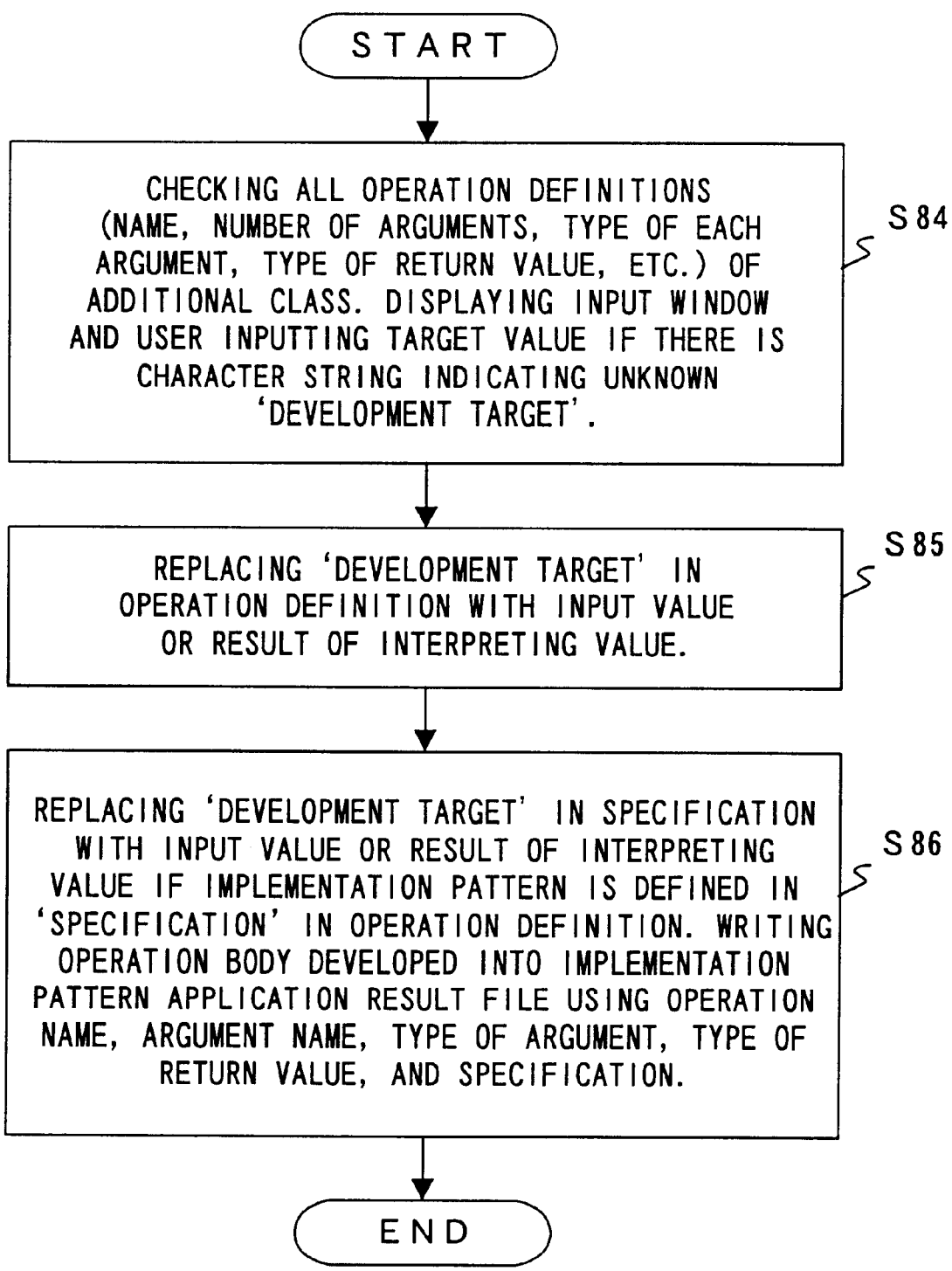
FIG. 22 is a flowchart of the process of developing all operation definitions of an added class.

Then, in step S75, the definitions of all attributes are added to the class added to the model to be developed in step S75, and 'the pattern## has been applied' is added to the specification of the attribute definition. In step S76, all operation definitions for the additional class are developed. The process in this step is shown in FIG. 22.

In step S77, the definitions of all operations are added to the class added to the model to be developed, and 'the pattern## has been applied' is added to the specification of the operation definition, and control is passed to the process in step S72.

If it is determined in step S72 that all class definitions have been processed, then all relation definitions in the pattern model file are developed. This process is described in FIG. 23. Then, in step S79, it is checked whether or not there are the same relation definitions in the model to be developed relating to all relation definitions in the pattern model file. If not, then the relation definition is added to the model to be developed, 'the pattern## has been applied' is added to the specification of the relation definition, thereby terminating the process.

FIG. 21 is a detailed flowchart of the processes in steps S68 and S74 shown in FIGS. 19 and 20. In FIG. 21, the definitions of all attributes (name, type, initial value, etc.) of the additional class are ,checked in step S81 as a process of developing the definitions of all attributes of an additional class. When there is a character string indicating an unknown 'development target', an input window is displayed to request a user to input a value. Then, the value of a target is input by the user. In step S82, the 'development target' in the attribute definition is replaced with the input value or the result of the interpretation of the value, thereby terminating the process.

FIG. 22 is a detailed flowchart of the processes in steps S70 and S76 shown in FIGS. 19 and 20. In FIG. 22, to develop the definitions of all operations of the additional class, the definitions of all operations (name, number of arguments, type of each argument, type of return value, etc.) of the additional class are checked in step S84. If there is a character string indicating an unknown 'development target', then an input window is displayed to request a user to input a value. Then, the value of a target is input by the user. In step S85, the 'development target' in the operation definition is replaced with the input value or the result of the interpretation of the value. When an implementation pattern is defined in the specification of the operation definition in step S86, the 'development target' in the operation definition is replaced with the input value or the result of the interpretation of the value. The developed operation body (original contents of the operations) is written to an implementation pattern application result file using the name of an operation, name of argument, type of argument, type of return value, and the specification, thereby terminating the process.

Figure 23:
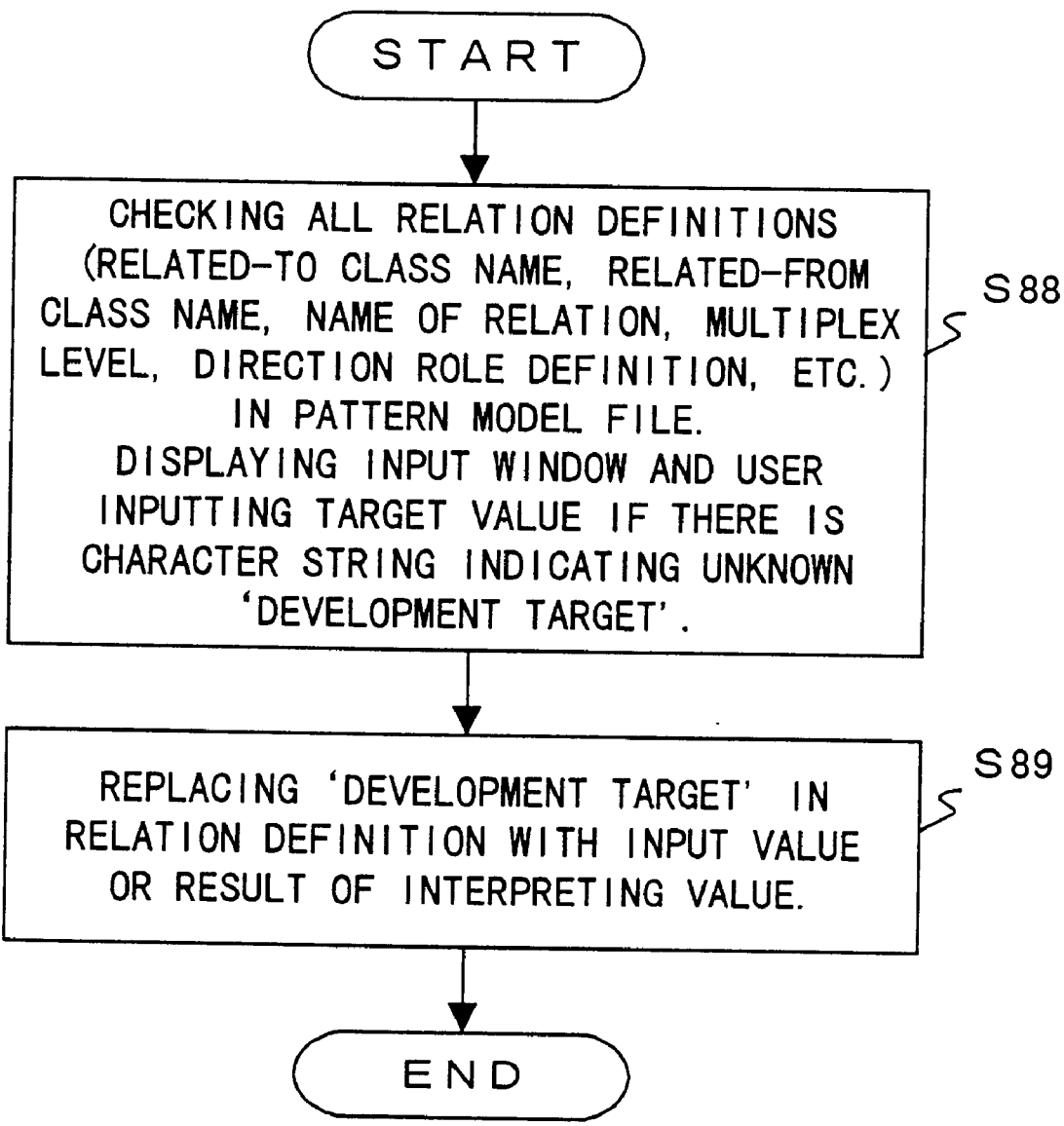
FIG. 23 is a flowchart of the process of developing all relationship definitions of an added class.

FIG. 23 is a detailed flowchart of the process in step S78 shown in FIGS. 19 and 20, that is, the process of developing the definitions of all relations in the pattern model file. In FIG. 23, the definitions of all relations (related-to class name, related-from class name, etc.) in the pattern model file are checked in step S88. When there is a character string indicating an unknown 'development target', an input window is displayed to request a user to input a value. Then, the value of a target is input by the user. In step S89, the 'development target' in the relation definition is replaced with the input value or the result of the interpretation of the value, thereby terminating the process.

FIG. 24 shows an example of a development model to which a pattern can be applied. For example, 'GASample' is the name of a class of an object, and the pattern application unit 13 is activated for such a development model.

Figure 25:
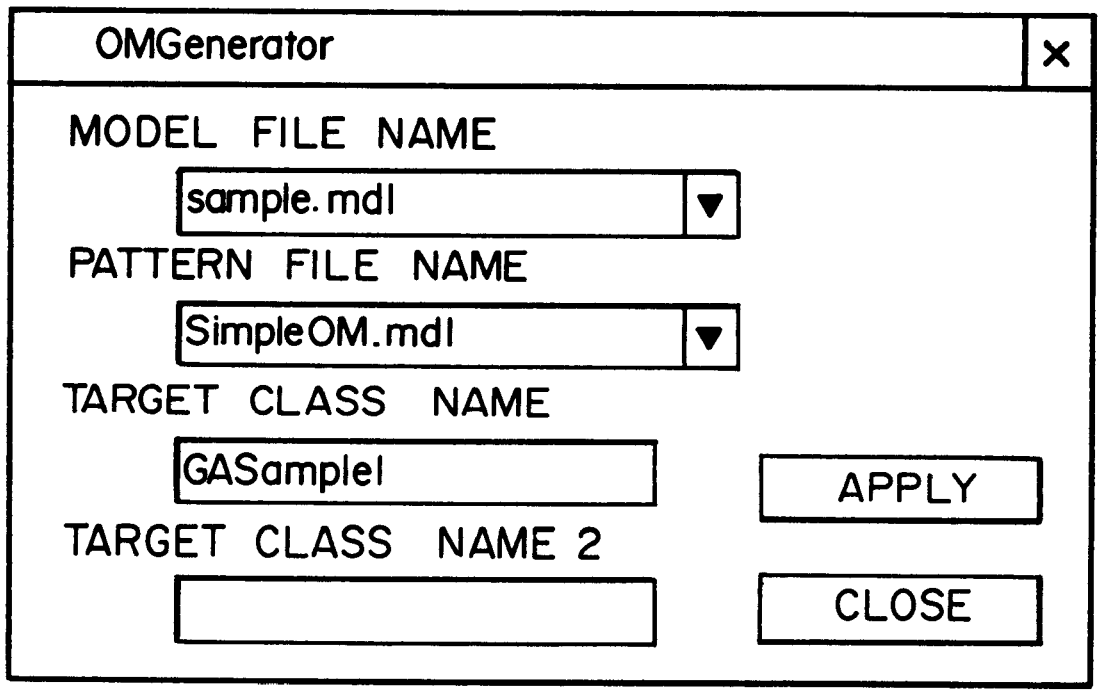
FIG. 25 shows an example of a user input screen displayed by the pattern application unit.

FIG. 25 shows an example of a user input screen displayed by the pattern application unit 13 in steps S60, S62, etc. shown in FIGS. 19 and 20. In this example, the user inputs that the development model file name, the pattern model file name, and the above described variable $$Target$$ are the character string 'GASample'.

Figure 26:
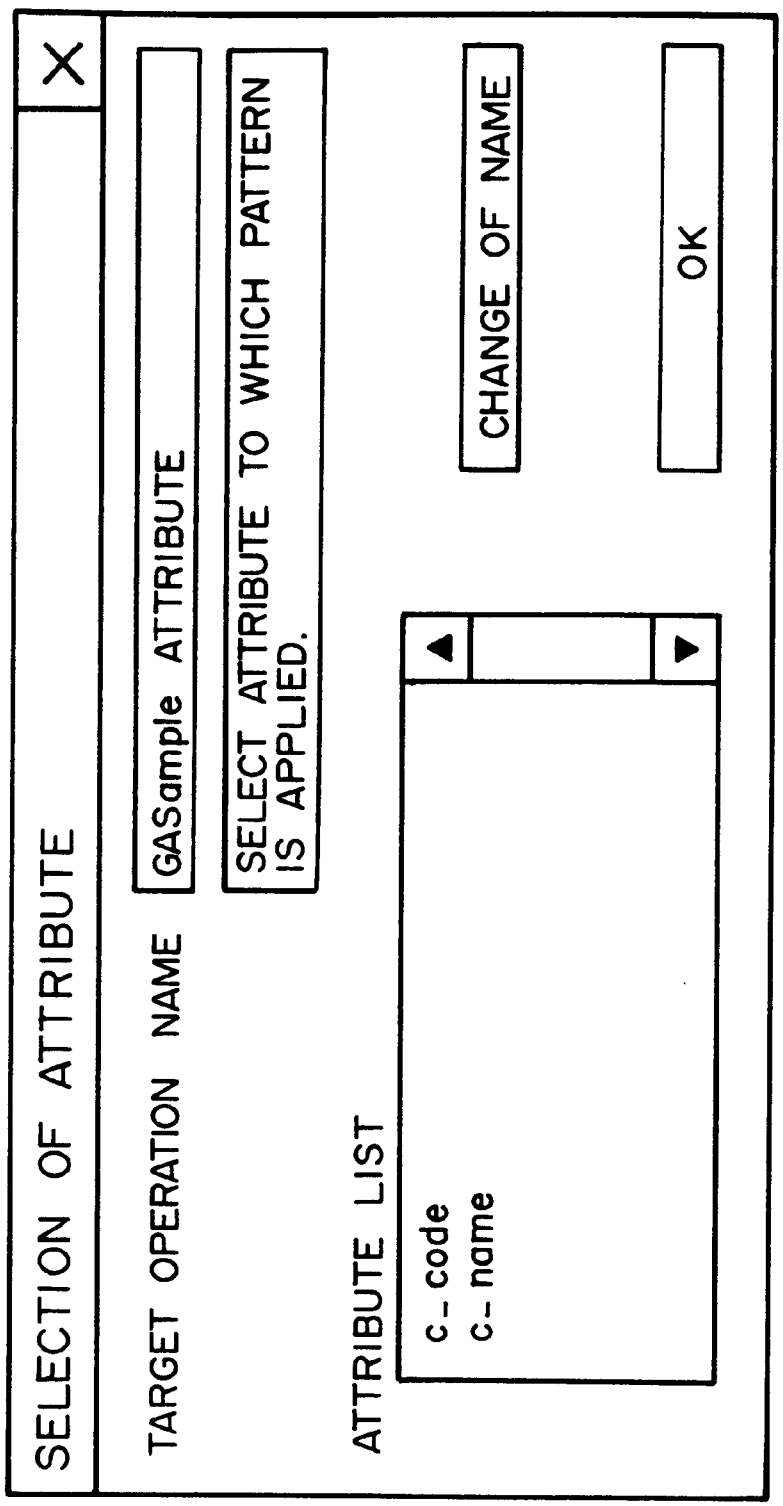
FIG. 26 shows an example of a user input screen displayed in the process of developing the attribute definition of an added class.
Figure 27:
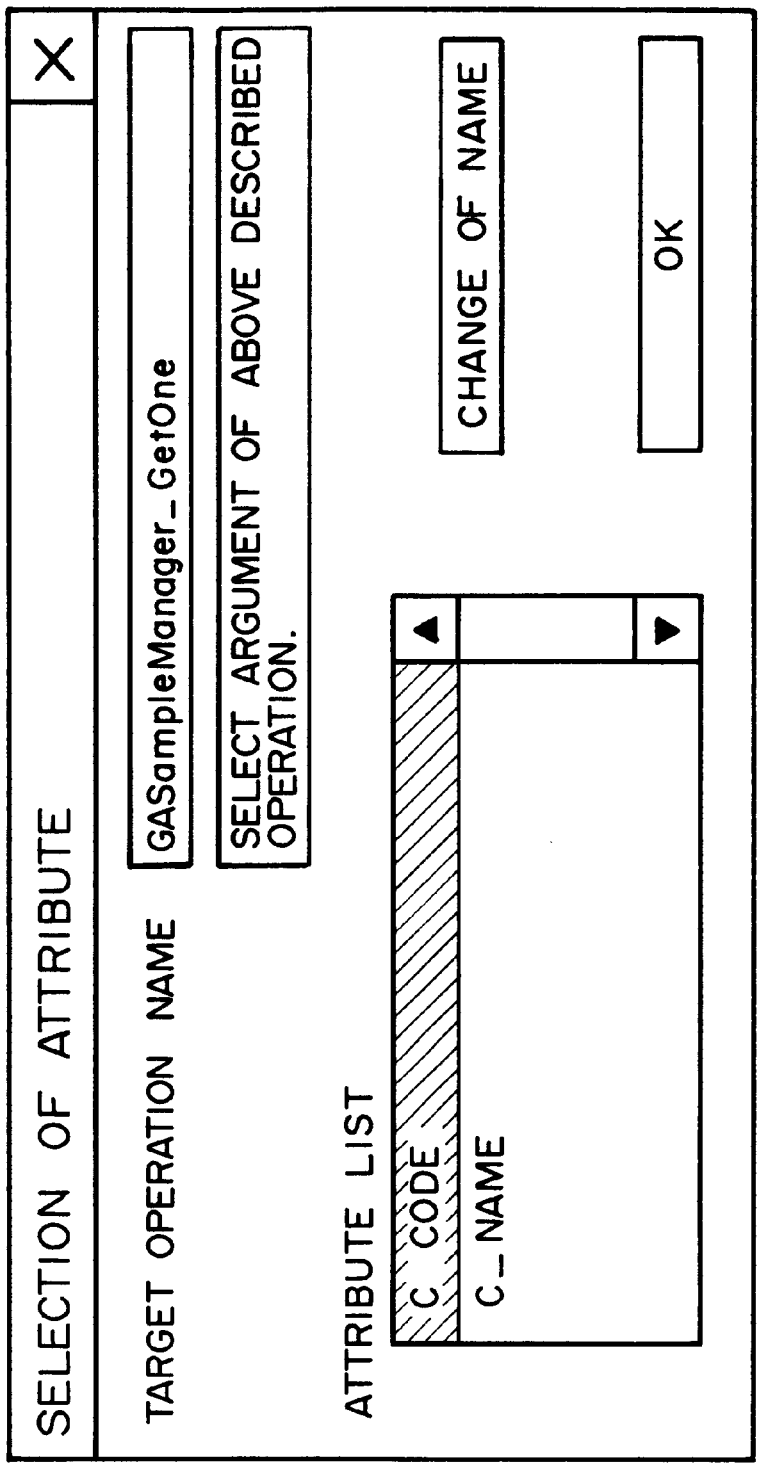
FIG. 27 is an example of a user input screen displayed in the process of developing the operation definition of an added class.

FIG. 26 shows an example of an input screen displayed in step S81 shown in, for example, FIG. 21. FIG. 27 shows an example of a user input screen displayed in step S84 shown in, for example, FIG. 22. Thus, the pattern application unit 13 prompts the user to input data required in the process of applying a pattern, and performs a character string converting process, etc. using the result of a user input.

Figure 28:
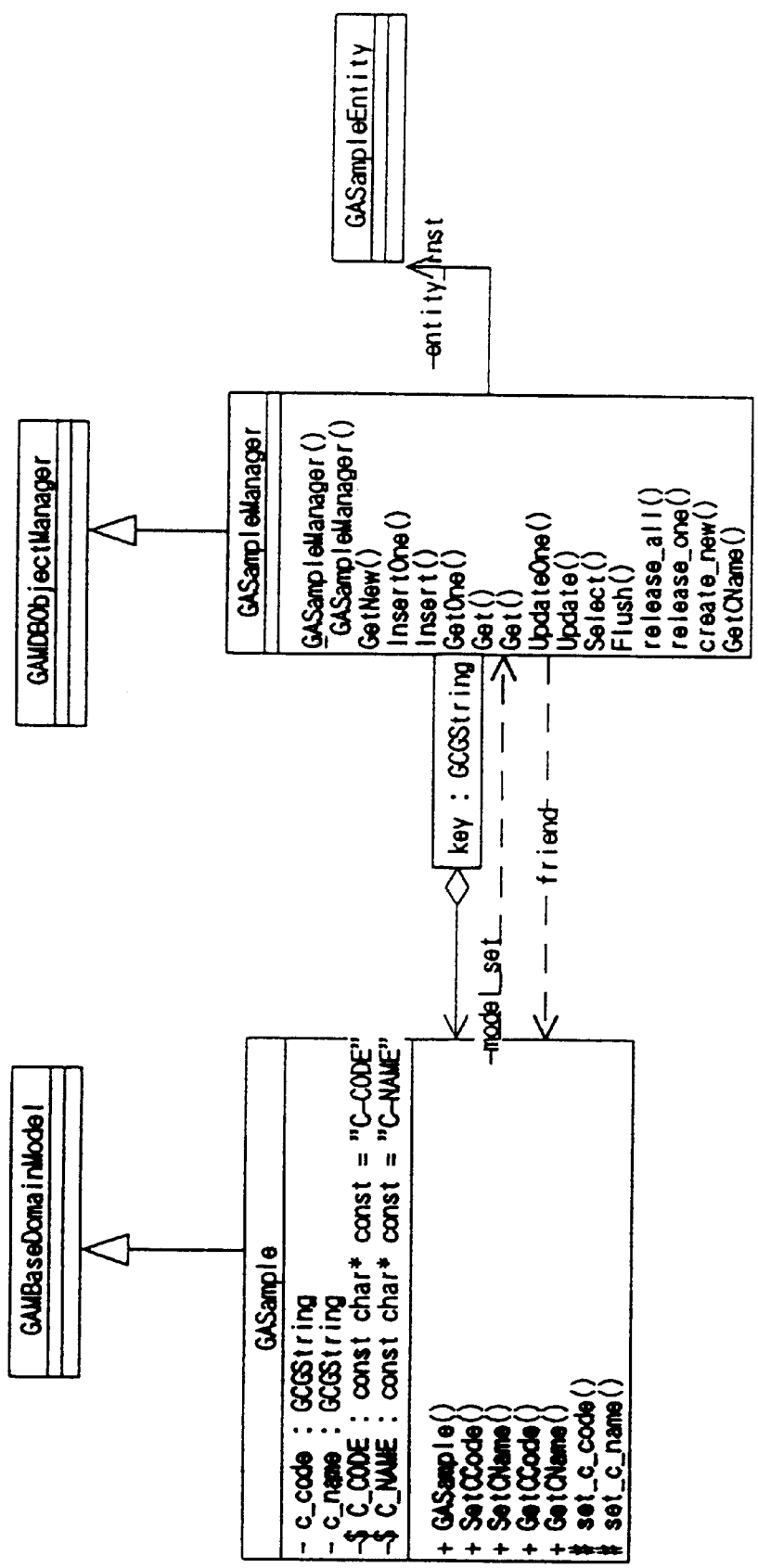
FIG. 28 shows an example of a development model generated after completely applying a pattern.

FIG. 28 is a part of an example of a development model obtained as a result of automatically changing a model after completing a pattern application. In FIG. 24, necessary classes, inheriting relations, relevant definitions, etc. are added to a model, for which only the GASample is defined, by applying a pattern, thereby adding attributes and operations to the GASample itself. For example, the display is omitted for the GASample Entity, but all definitions of attributes, operations, etc. are set.

FIG. 29 shows an example of a definition of a target manager class in the pattern model file. The definition is developed into the GASample Manager class, and added to the model to be developed.

FIG. 30 shows an example of an output from the implementation pattern application result file. An implementation pattern as a sample of a source code is preliminarily defined as an operation definition of a target manager class. In the definition, a variable such as $$Target$$ is developed into a value, for example, GASample, thereby outputting the implementation pattern application result file shown in FIG. 30, that is, an operation body is output.

Figure 31:
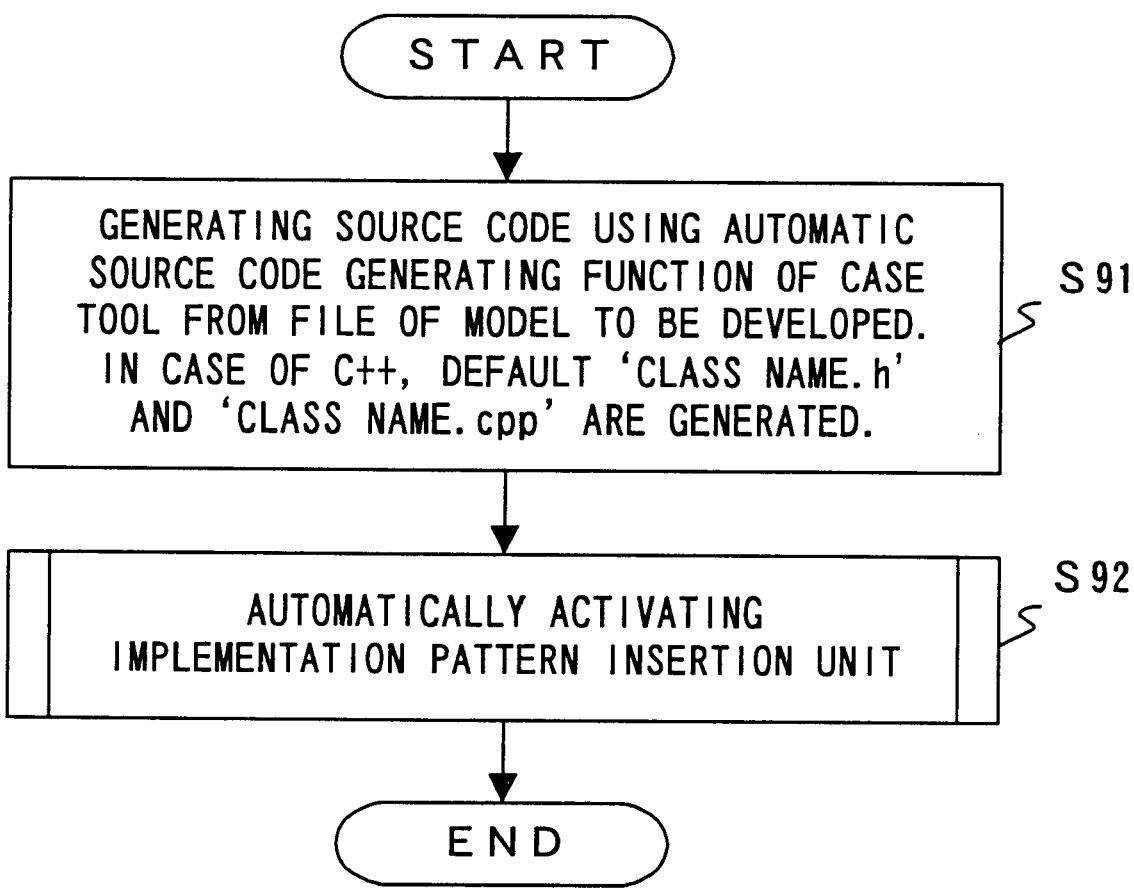
FIG. 31 is a flowchart of an operation (implementation pattern insertion unit activating process) performed when a source code is generated by a user.

FIG. 31 shows the operations performed when a source code is generated by a user, that is, FIG. 31 is a flowchart of the activating process of the implementation pattern insertion unit 26. In FIG. 31, a source code is generated from a file of a model to be developed using the automatic source code generating function of the CASE tool in step S91. In the case of C++, 'class name.h' and 'classname.cpp' are generated as default values. In step S92, the implementation pattern insertion unit 26 is automatically activated, thereby terminating the process.

Figure 32:
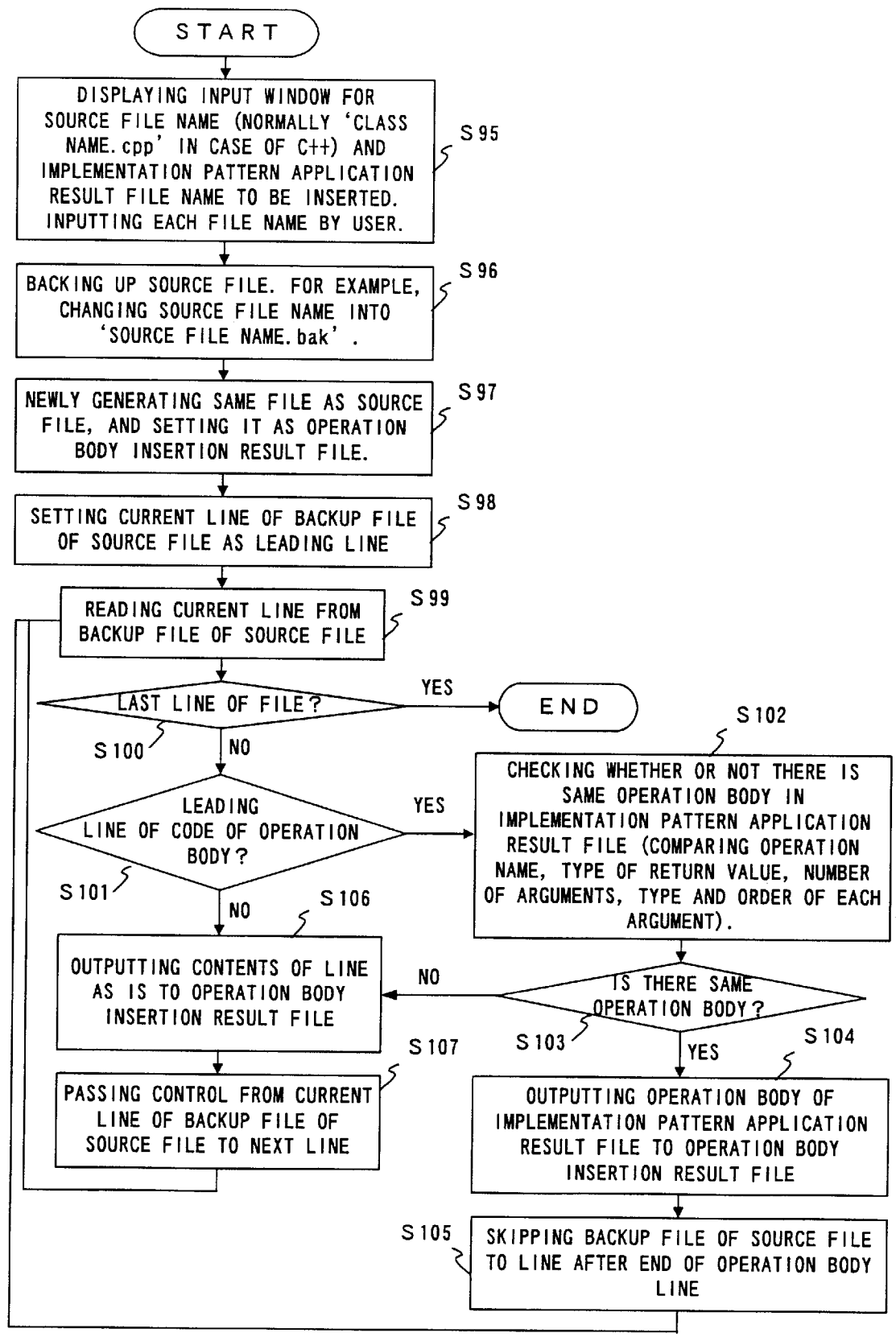
FIG. 32 is a flowchart of the process of the implementation pattern insertion unit.

FIG. 32 is a flowchart of the process of the implementation pattern insertion unit 26. When the process of the implementation pattern insertion unit 26 automatically activated in step S92 shown in FIG. 31 is started, a window is displayed to prompt the user to input a source file name to which an implementation pattern is to be inserted, and an implementation pattern application result file name, the user inputs the file names, the source file is backed up in step S96, the source file name is changed into, for example, 'source file name.bak', a file having the same name as the source file is newly generated in step S97, an operation body insertion result file is prepared, the current line of the backup file of the source file is set as a leading line in step S98, the current line is read from the backup file of the source file in step S99, it is determined in step S100 whether or not the current line is the last line of the file, and the process immediately terminates if it is the last line.

If the current line is not the last line, then it is determined in step S101 whether or not it is the leading line of the operation body, that is, the source code to be inserted. If yes, it is checked in step S102 whether or not there is the operation body in the implementation pattern application result file. That is, operation names, types of return values, number of arguments, type and order of each argument are compared. In step S103, it is determined whether or not there is the operation body. If yes, the operation body of the implementation pattern application result file is output to the operation body insertion result file in step S104. In step S105, the backup file of the source file is skipped to the line after the last line of the operation body, and then the processes in and after step S99 are repeated.

When it is determined in step S101 that the current line is not the leading line of the operation body code, and when it is determined in step S103 that there is not the operation body, the contents of the current line are output as is to the operation body insertion result file in step S106. After control is passed from the current line to the next line in the backup file of the source file in step S107, the processes in and after step S99 are repeated.

FIGS. 33 and 34 show examples of the source code output by the object-oriented CASE tool in step S91 shown in FIG. 31. They are the source codes of GASample Manager. Although the header file shown in FIG. 33 can be used as is, the contents of the operation corresponding to the original program are not generated in the body file shown in FIG. 34.

Figure 35:
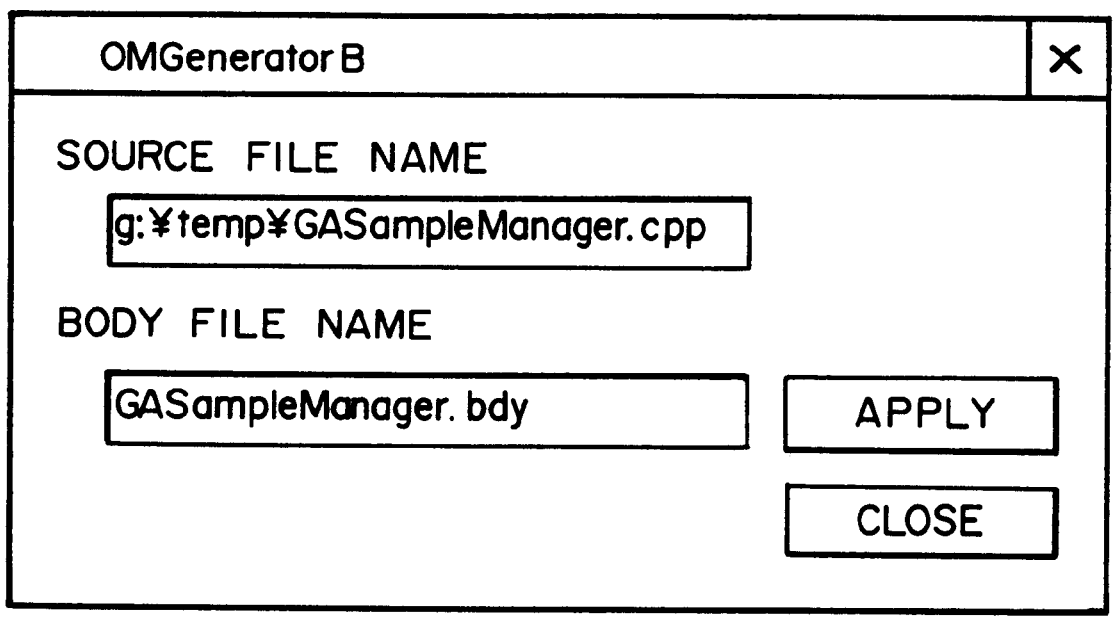
FIG. 35 shows an example of a user input screen displayed in the process of the implementation pattern insertion unit.

FIG. 35 shows an example of a user input screen displayed to the user in step S95 shown in FIG. 32. For example, a file name normally guessed from the class name based on which a source code is generated is preliminarily displayed in each input field shown in FIG. 35. By pressing the application button, input information is passed to the implementation pattern insertion unit 26, and the process of the implementation pattern insertion unit 26 is practically started.

FIG. 36 shows an example of the body file of the GASample Manager to which an operation body is inserted. To the body file having no contents as shown in FIG. 34, the operation body code shown in FIG. 30 in which an implementation pattern defined based on a design pattern is developed is inserted at an appropriate position. Thus, the design model according to the design pattern, and the source code to which the implementation pattern corresponding to the design model is applied are automatically generated.

Figure 37:
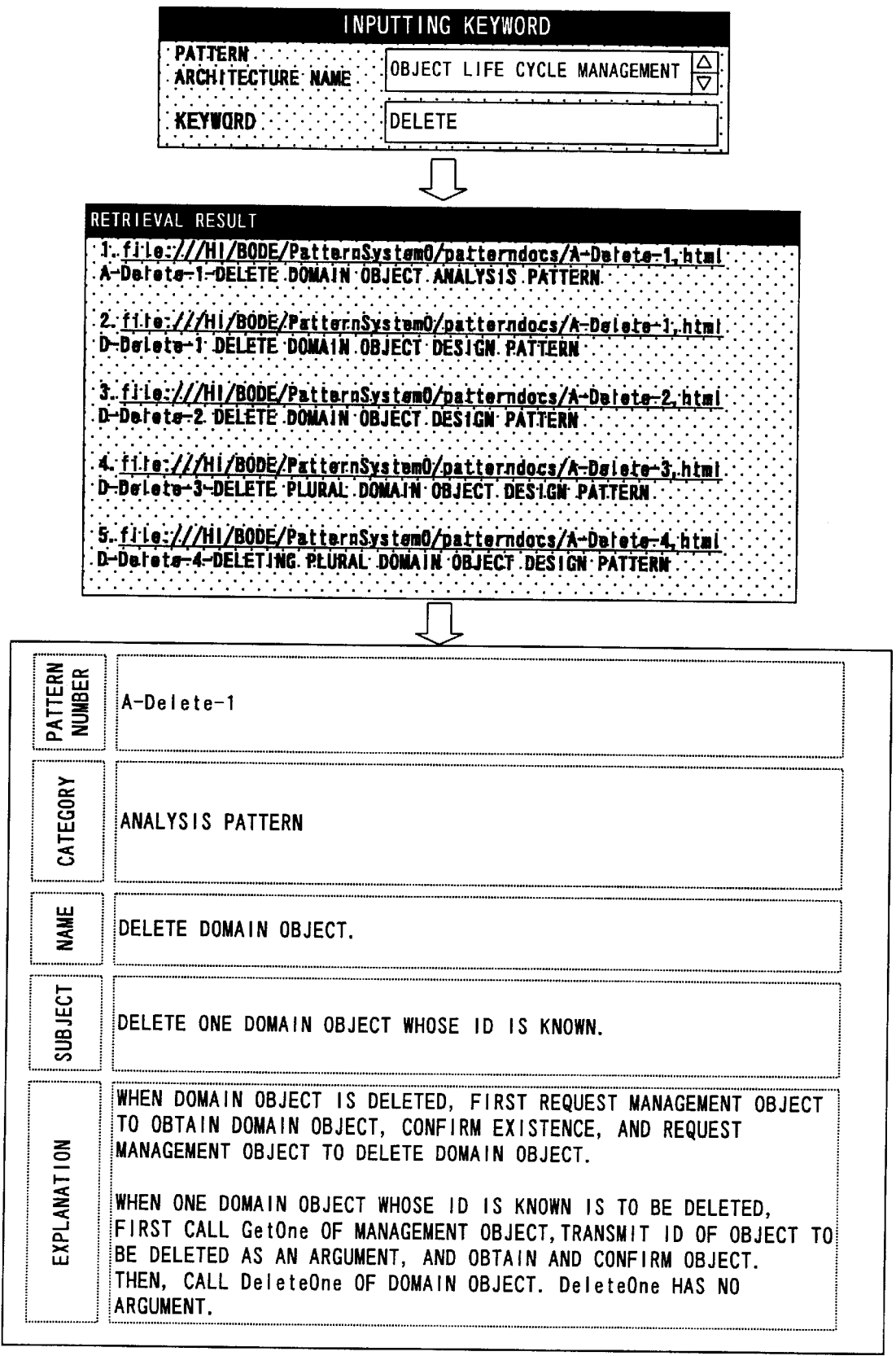
FIG. 37 shows an example of a pattern information retrieving operation performed using a keyword.

According to an embodiment of the present invention, a keyword is assigned to each of the pattern information 16 stored in the pattern architecture storage unit 11 so that a pattern can be retrieved using the keyword. FIG. 37 shows an example of a pattern retrieving operation using a keyword. In FIG. 37, five patterns are retrieved as a retrieval result using the keyword 'delete', and the information about one of the five patterns is displayed after being specified by the developer as a user.

Figure 38:
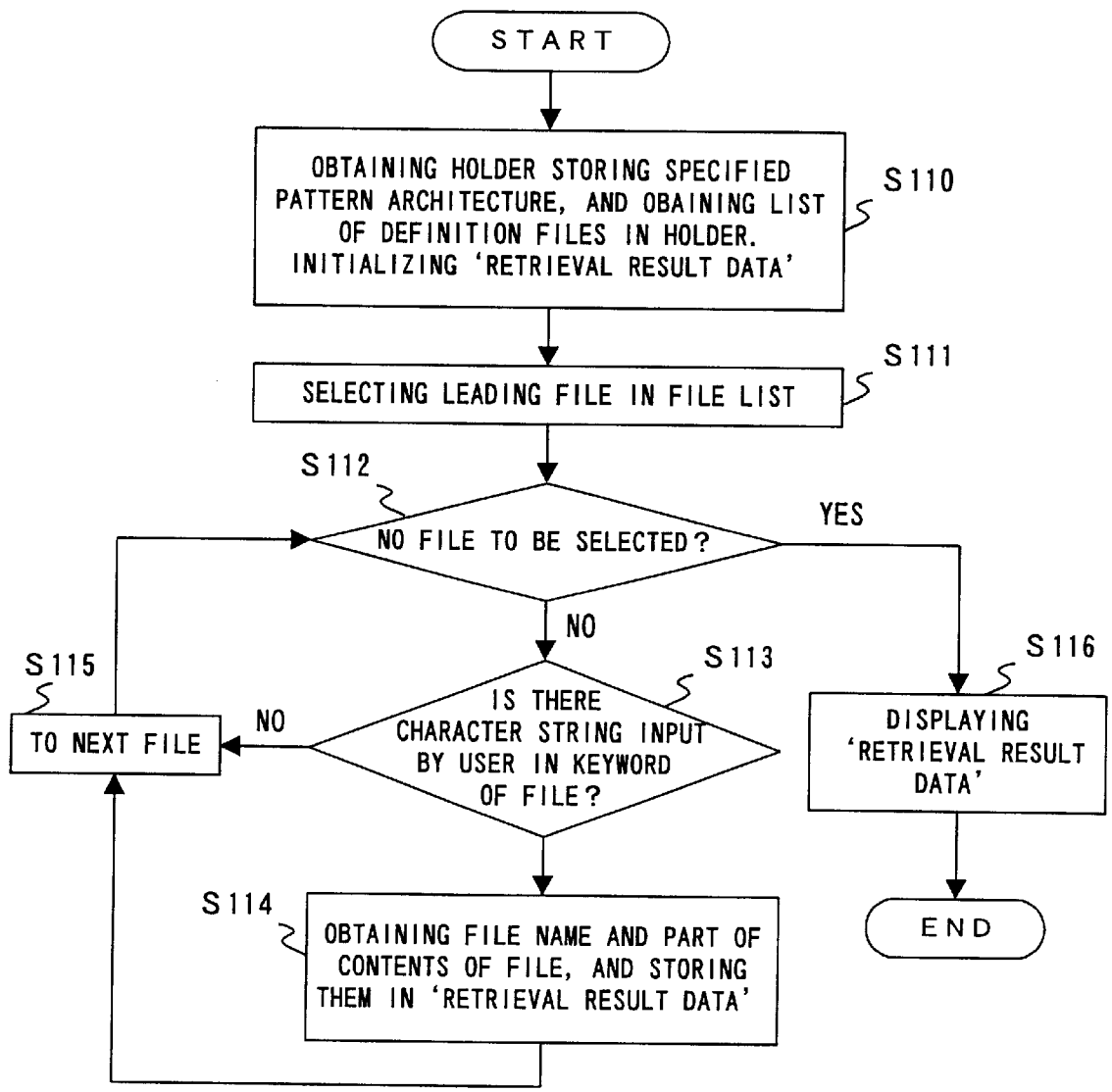
FIG. 38 is a flowchart of the pattern information retrieving process using a keyword.

FIG. 38 is a flowchart of the process of retrieving pattern information using a keyword. This process is performed by, for example, the pattern retrieval unit 22. When the process is started as shown in FIG. 38, a list of files in the folder storing the pattern architecture specified as a retrieval object in step S110 is obtained, and the retrieval result data is initialized. Then, in step S111, the leading file is selected from the list of the file. In step S112, it is determined whether or not there is the selected file. If there is the file, it is determined in step S113 whether or not a character string input by the user is stored as the keyword of the file, that is, pattern information. If yes, then the name of the file and a part of the contents of the file are stored in the retrieval result data in step S114. In step S115, the next file is selected, and the processes in and after step S112 are repeated.

When it is determined in step S113 that there are no character strings input by the user as a keyword, the next file is selected in step S115, and the processes in and after step S112 are repeated. If it is determined in step S112 that there are no files to be selected, then the retrieval result data is displayed in step S116, thereby terminating the process.

FIG. 39 shows an example of a pattern information definition format used when a keyword is assigned to pattern information. As compared with FIG. 13, the input column of a keyword is added to the template format in FIG. 39.

Figure 40:
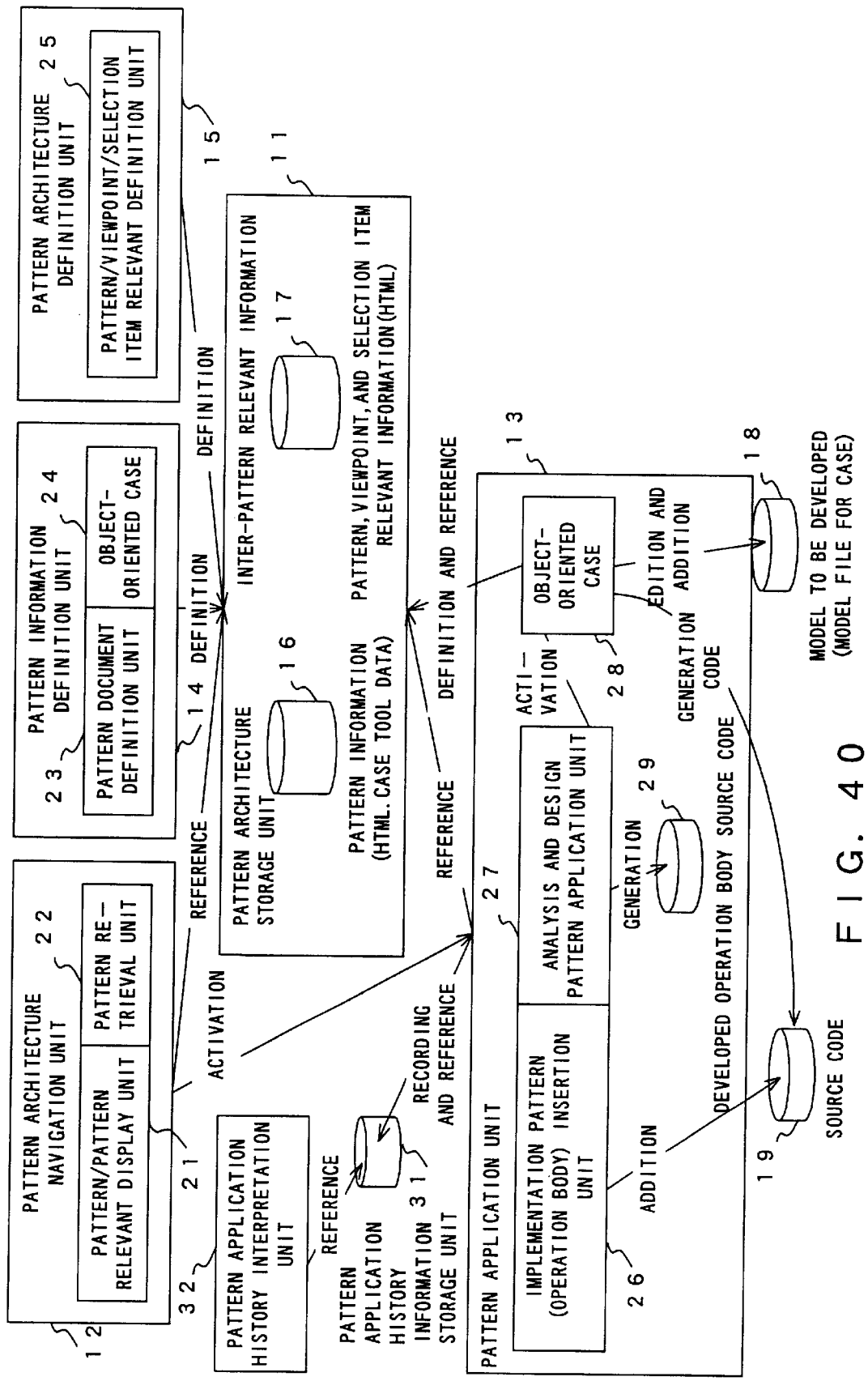
FIG. 40 is a block diagram showing the configuration of the second embodiment of the object-oriented software development support apparatus according to the present invention.

FIG. 40 is a block diagram of the configuration of the second embodiment of the software development support apparatus according to the present invention. As compared with the first embodiment shown in FIG. 3, the configuration further includes: a pattern application history information storage unit 31 for storing the application history of a pattern applied by the pattern application unit 13 by storing and referring to the pattern; and a pattern application history interpretation unit 32 for referring to the history information stored in the storage unit and obtaining, for example, the reusability, for example, the application frequency, of each pattern and a pattern architecture.

FIG. 41 shows an example of pattern application history information stored in the pattern application history information storage unit 31. In FIG. 41, the pattern application history information contains the information from the name of a user to the name of a target class relating to the person, the time, and the file involved, and the information about an attribute list identified by a target class name and a usage.

FIG. 42 is a flowchart of the process of the pattern application unit 13 performed using the application history information stored in the pattern application history information storage unit 31. When the process is started as shown in FIG. 42, the time and user information are obtained from the system in step S120, a history file is generated, and the time and the user information are output to the history file. If a history input file corresponding to application history information is specified when a pattern is applied and pattern application history information has already been stored, then the contents are read, the contents data for each development target, that is, the data to be input from the user corresponding to the above described variable $$Target$$, are requested, and the process is performed in step S122 by the pattern application unit 13 as described above by referring to FIG. 19. However, in the window in which the user is requested to input data in this process, the internal data well known according to the contents of the above described history input file is displayed without waiting for the user input.

In step S123, the names of the user-input file of the model to be developed and the pattern model file are output to the history file. In step S124, the contents of the 'development target', that is, the contents of the internal data read in step S121, are output to the history file for each target, thereby terminating the process.

Figure 43:
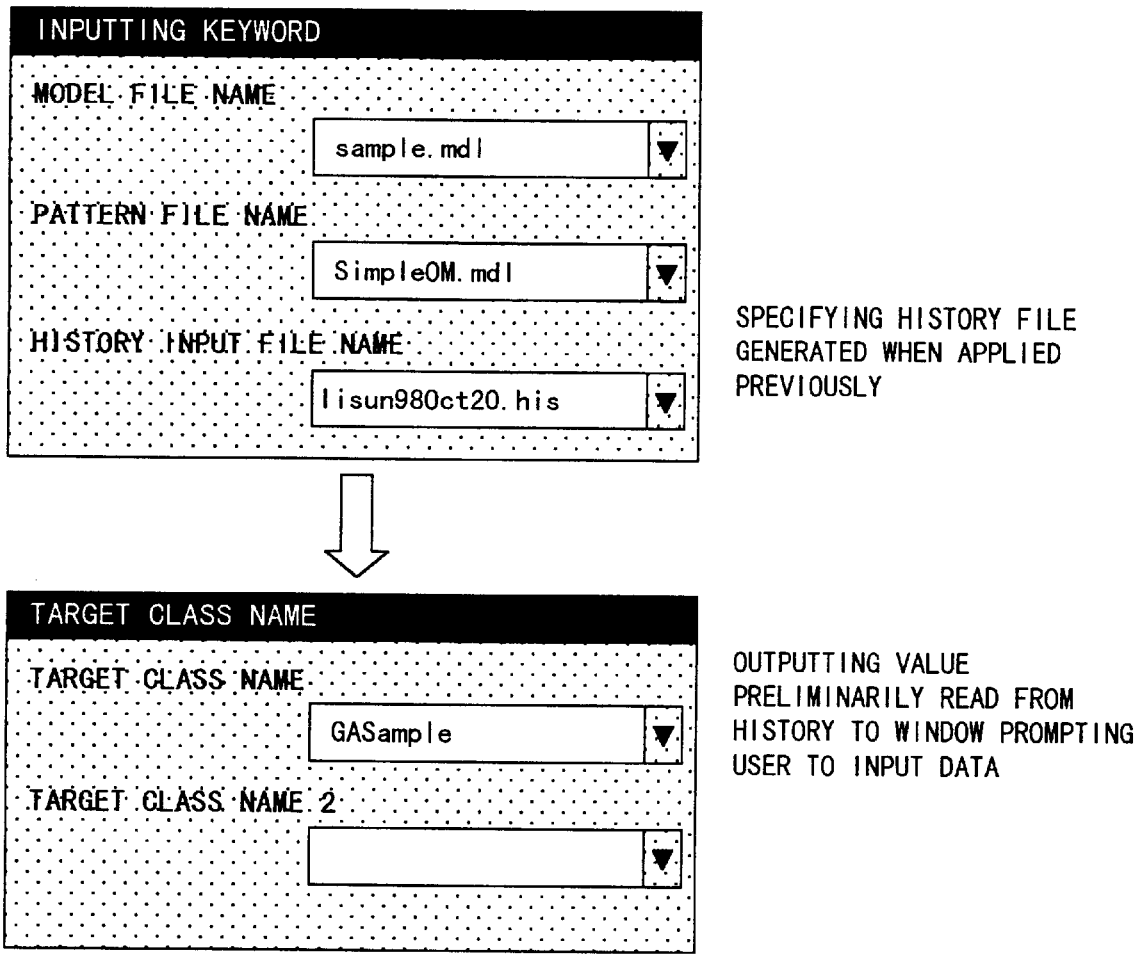
FIG. 43 shows an example of a user input screen displayed in the process of the pattern application unit shown in FIG. 42.

FIG. 43 shows an example of the display of the internal data on the user input screen in the process shown in FIG. 42. In FIG. 43, the history file generated when the pattern is previously applied is specified as a history input file, and the target class name read from the history input file is preliminarily displayed on the window requesting a user input.

FIG. 44 is a flowchart of the process performed by the pattern application history interpretation unit 32 shown in FIG. 40. When the process is started as shown in FIG. 44, the holder storing the history file is input by the user in step S131. In step S132, the names of all history files in the holder are listed. In step S133, the leading file in the list is selected, and it is determined in step S134 whether or not there is a file to be selected.

When there is a file to be selected, the name of a pattern model file is obtained from the file selected in step S135, and it is determined in step S136 whether or not there is data having the pattern model file name as a key in the aggregation result data. If yes, 1 is added to the data in step S137, the next file in the list is selected in step S138, and the processes in and after step S134 are repeated.

If there is no data having the pattern model file name as a key, then the data of the value of 1 having the pattern model file name as a key is newly entered in the aggregation result data in step S139, and then the processes in and after step S138 are performed. When it is determined in step S134 that there are no files to be selected, the aggregation result data is displayed in step S140, thereby terminating the process.

In the descriptions above, an arbitrary pattern is defined, and the function of automatically detailing a model to be developed and a source code according to the pattern is mainly explained when describing in detail the operation of the object-oriented software development support apparatus. The definition of an automation pattern, and the application of the defined pattern are briefly described by referring to an example of a practical pattern.

In the descriptions below, as a practical example, the definition and the application of a pattern mainly to add a class, an attribute of the class, a method (operation), and a link (relation) are described according to the data of the object already defined in the model to be developed. Using such patterns, data about an element to be added can be easily specified, and a pattern applying operation can be efficiently performed.

Figure 45:
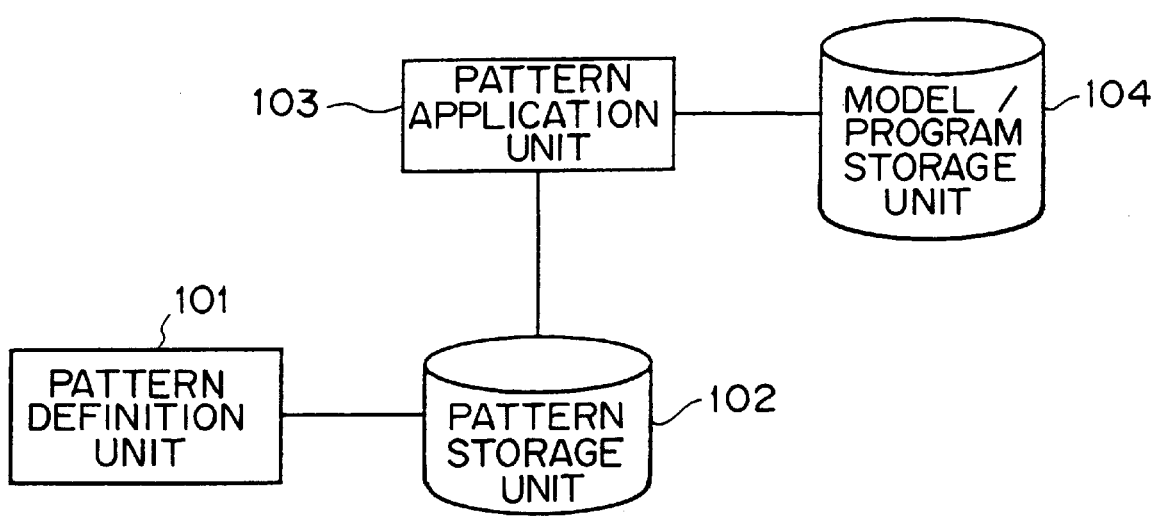
FIG. 45 shows the definition of a pattern for adding data of a new object based on the data of an already defined object, and is a block diagram of the basic system configuration of the object-oriented software development support apparatus to which the pattern is to be applied.

FIG. 45 is a basic block diagram of the configuration of the system of the object-oriented software development support apparatus for use in explaining the definition and application of the pattern. In FIG. 45, for example, the software development support apparatus shown in FIG. 3 comprises: a pattern definition unit 101 corresponding to the pattern information definition unit 14; a pattern storage unit 102 corresponding to the pattern architecture storage unit 11; a pattern application unit 103 corresponding to the pattern application unit 13; and a model/program storage unit 104 storing a model 18 to be developed, a program as the source code 19, etc.

As described above, in this example, based on each element of an object-oriented model defined in the model 18 to be developed, for example, a class, an attribute, a method, a link, etc., a pattern for use in prescribing another element to be added to a model to be developed is defined. A necessary element for the model to be developed can be added by applying the pattern.

For example, the developer defines a pattern for adding such an element through the pattern definition unit 101, and the result is stored in the pattern storage unit 102. The pattern application unit 103 reads, for example, a model to be developed specified by the developer from the model/program storage unit 104, and applies a pattern stored in the pattern storage unit 102 to the model to be developed so that an element of an object-oriented model is added to the model to be developed or changed, and then the model to be developed is stored again in the model/program storage unit 104.

Figure 46:
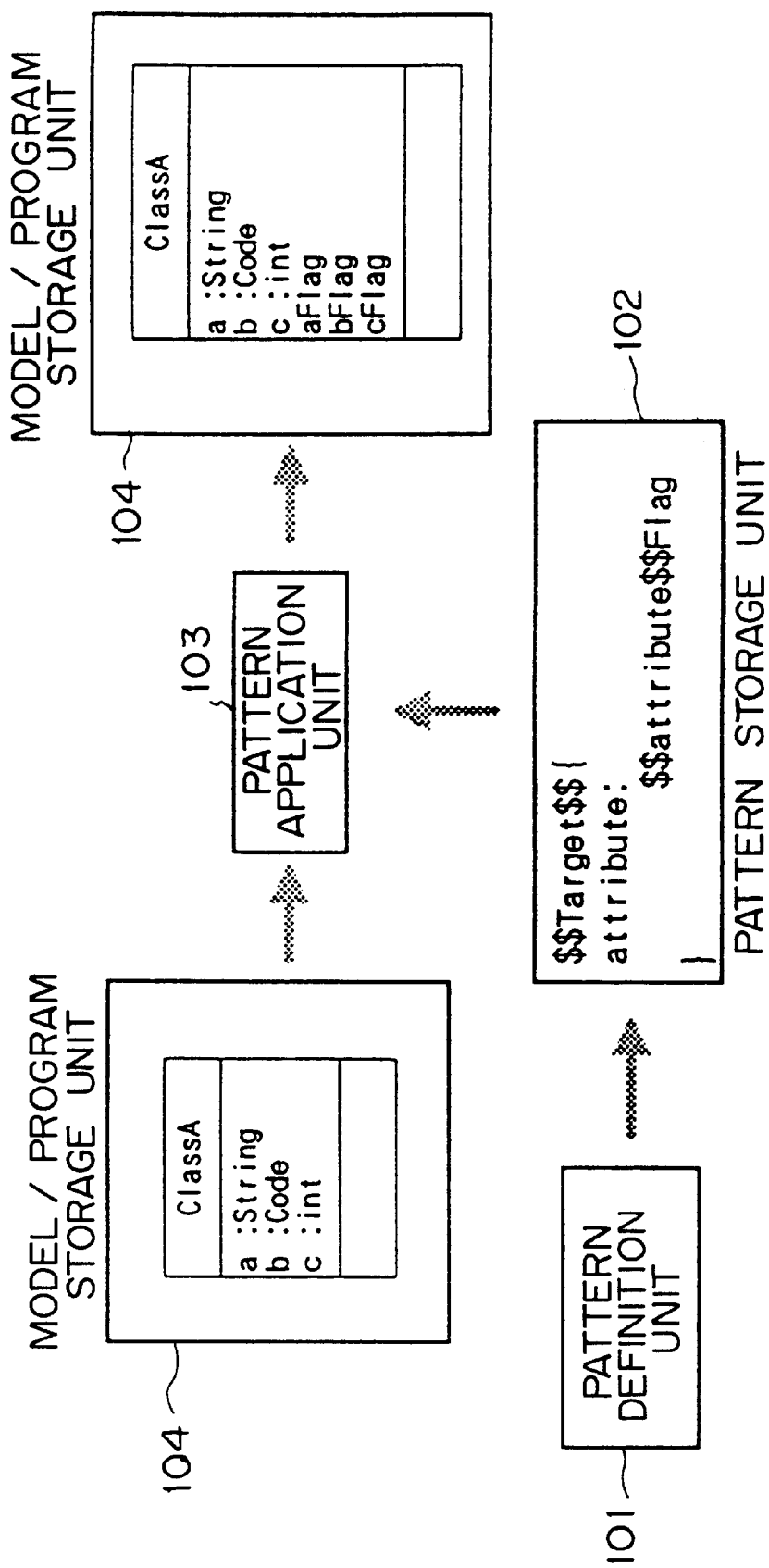
FIG. 46 shows an example of applying a pattern for adding a new attribute based on the data having an already defined attribute.

FIG. 46 shows the definition and the application of a pattern for adding a new attribute based on the data of an already defined attribute. In FIG. 46, the leading portion of the pattern $$Target$$ stored in the pattern storage unit 102 specifies that the pattern should be applied to ClassA as described later. The pattern application unit 103 finds the keyword of attribute in the pattern, and recognizes that the pattern is used to add a new attribute to ClassA. Then, $$attribute$$ is replaced with the attribute name of ClassA already defined in the model/program storage unit 104, that is, a, b, c in this example, thereby generating a character string, and an attribute having the name, that is, aFlag, bFlag, and cFlag are newly added here to ClassA.

Figure 47:
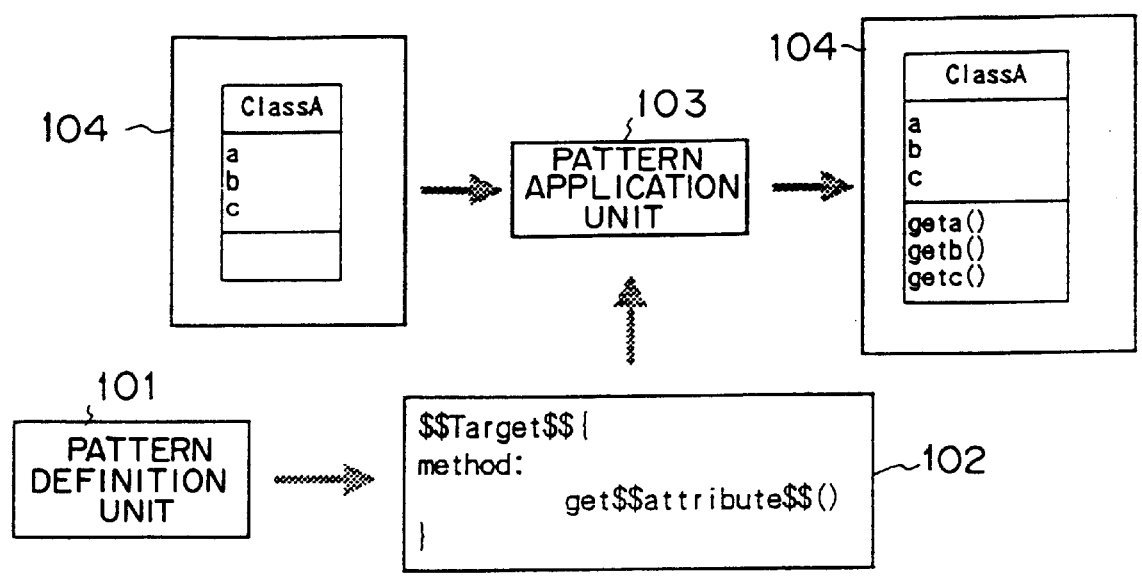
FIG. 47 shows an example of applying a pattern for adding a new method based on the data having an already defined attribute.

FIG. 47 shows the pattern and its application for adding a new method based on the data of an attribute of the class already defined in the model/program storage unit 104. In FIG. 47, the pattern application unit 103 finds the keyword of the method in the pattern, and recognizes that the pattern is used to add a method. Then, $$attribute$$ is replaced with an attribute name already defined and stored in the model/program storage unit 104, that is, a, b, c in this example, to generate a character string, and a method having the name, that is, geta( ), getb( ), and getc( ) are added.

Figure 48:
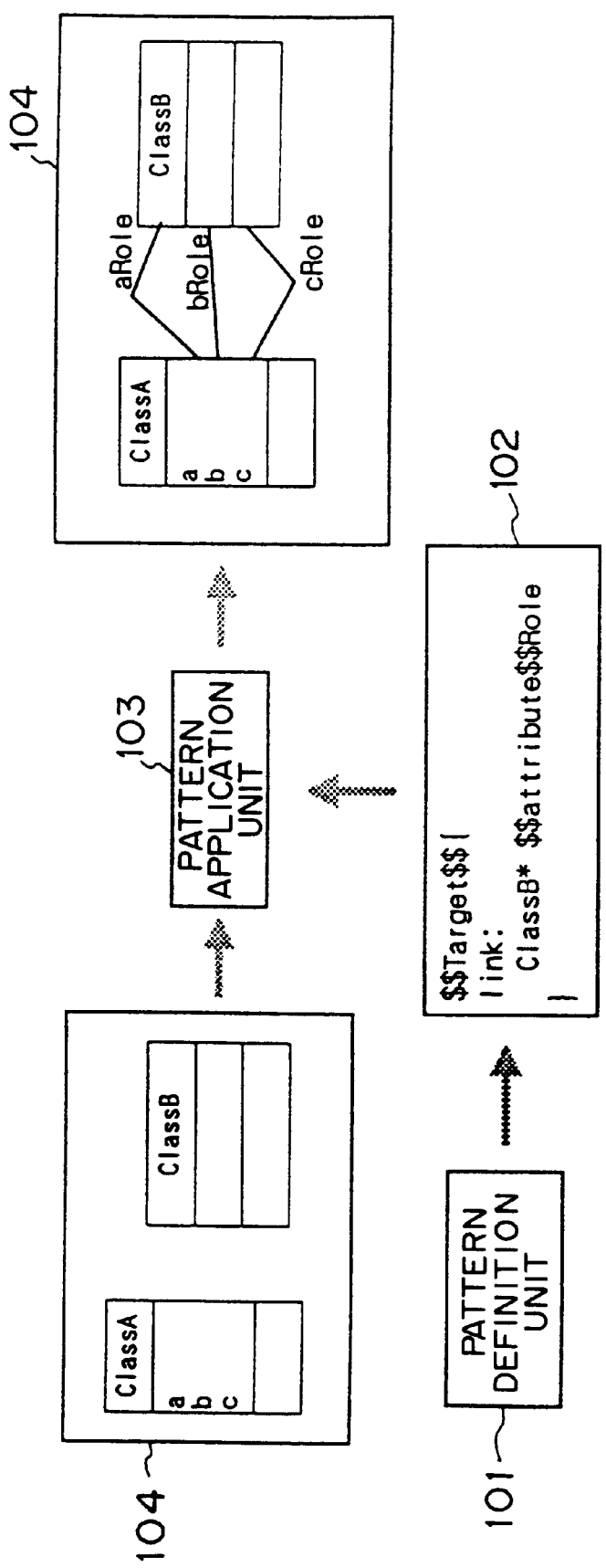
FIG. 48 shows an example of applying a pattern for adding a link based on the data having an already defined attribute.

FIG. 48 shows an example of the application of a pattern for adding a link based on the data of an attribute of the class. In FIG. 48, the pattern application unit 103 finds a keyword of the link in the pattern, and recognizes that the pattern is used to add a link. Then, from the character string in and after the link, $$attribute$$ is replaced with the attribute names of class A already defined in the model/program storage unit 104, that is, a, b, c in this example, and the link having the names, that is, aRole, bRole, and cRole are added as a new link in ClassB. In this example, it is assumed that aRole is the role name of ClassB viewed from ClassA.

Figure 49:
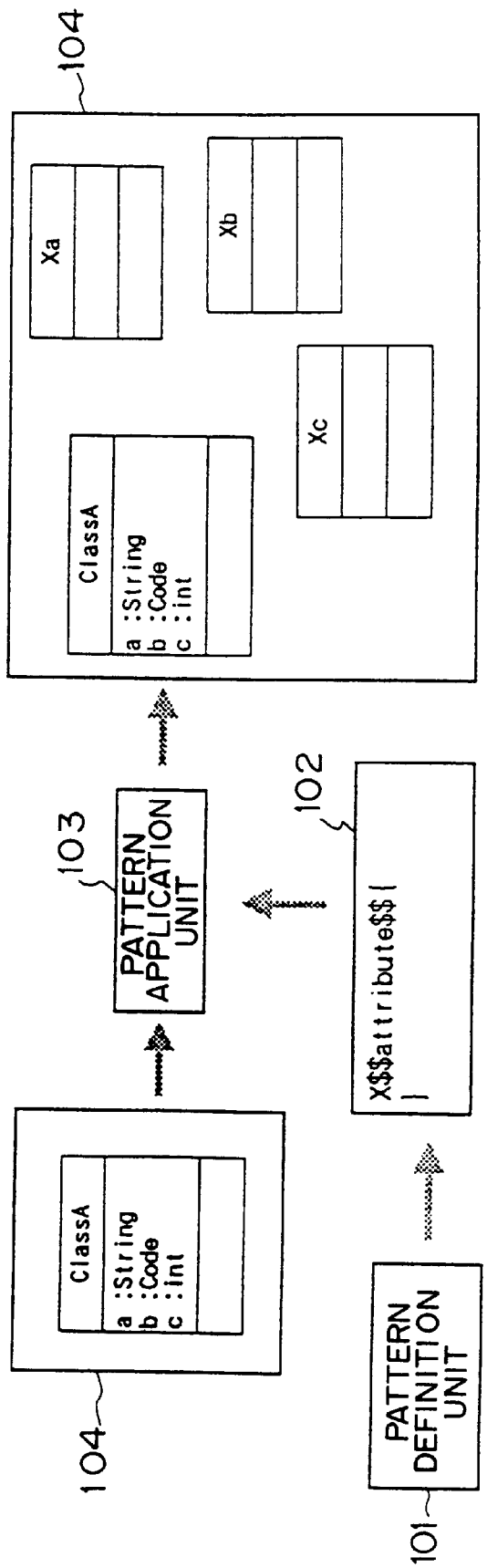
FIG. 49 shows an example of applying a pattern for adding a class based on the data having an already defined attribute.

FIG. 49 shows an example of a pattern and its application for adding a class based on the data of an already defined attribute. The pattern application unit 103 finds the definition of a class name in the pattern, that is, the character string replacement conversion at the position of $$Target$$ in the pattern shown in FIG. 48, that is, $$attribute$$, thereby recognizing that the pattern is used to add a class. Then, the character string replacement conversion is replaced with the attribute names already defined in ClassA, that is, a, b, c to generate a character string, and the class having the name, that is, Xa, Xb, and Xc are newly added.

Figure 50:
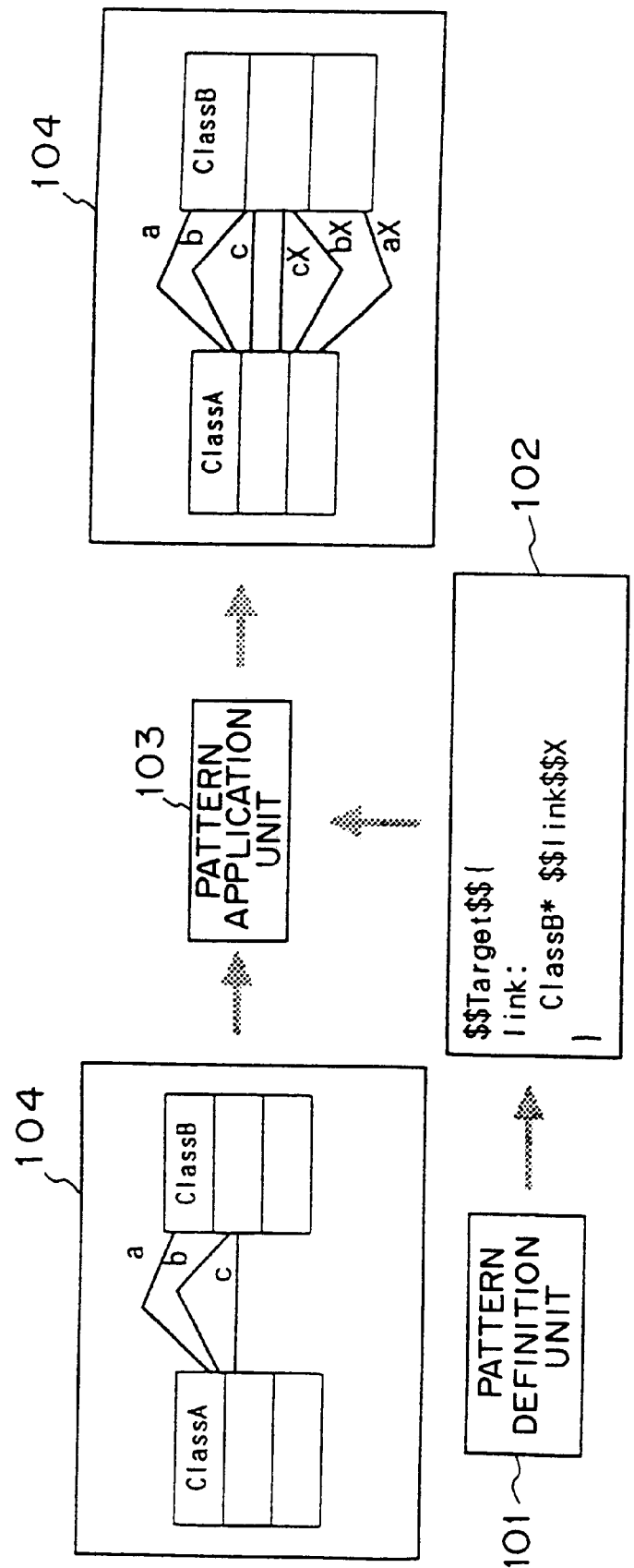
FIG. 50 shows an example of applying a pattern for adding a link based on the data of an already defined link.

FIGS. 50 through 53 are example of applying a pattern for adding a new element based on the data of a link of a class already defined in, for example, the model to be developed. In FIG. 50, as compared with FIG. 48, the portion of $$link$$ has already been replaced with the names of a link defined between ClassA and ClassB, that is, a, b, c, thereby adding new links aX, bX, cX.

Figure 51:
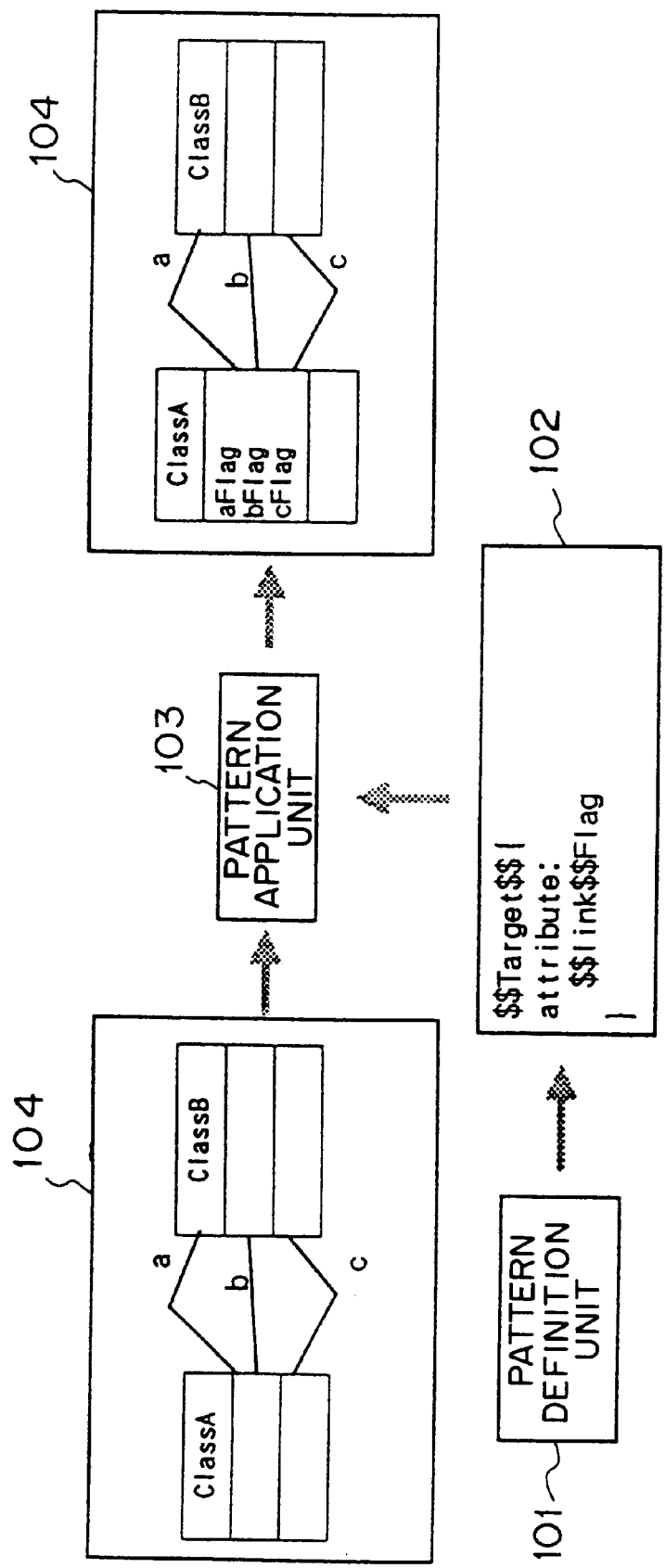
FIG. 51 shows an example of applying a pattern for adding an attribute based on the data of an already defined link.

In FIG. 51, as compared with FIG. 46, the portion of $$link$$ is replaced with a, b, and c of the already defined link, and aFlag, bFlag, and cFlag are added to classA as new attributes.

Figure 52:
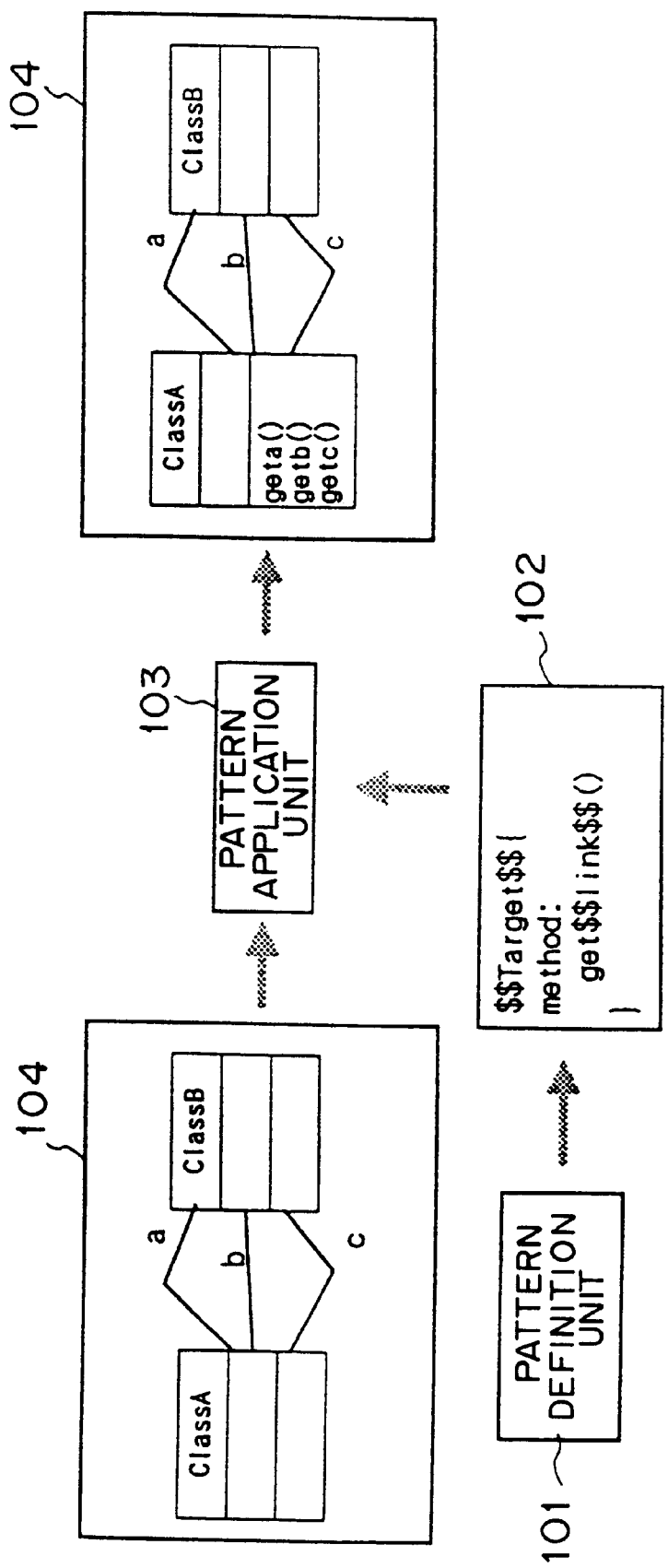
FIG. 52 shows an example of applying a pattern for adding a method based on the data of an already defined link.

In FIG. 52, as compared with FIG. 47, the portion of $$link$$ is replaced with a, b, and c of the already defined link, and a new method, that is, geta ( ), getb( ), and getc( ) are added to ClassA.

Figure 53:
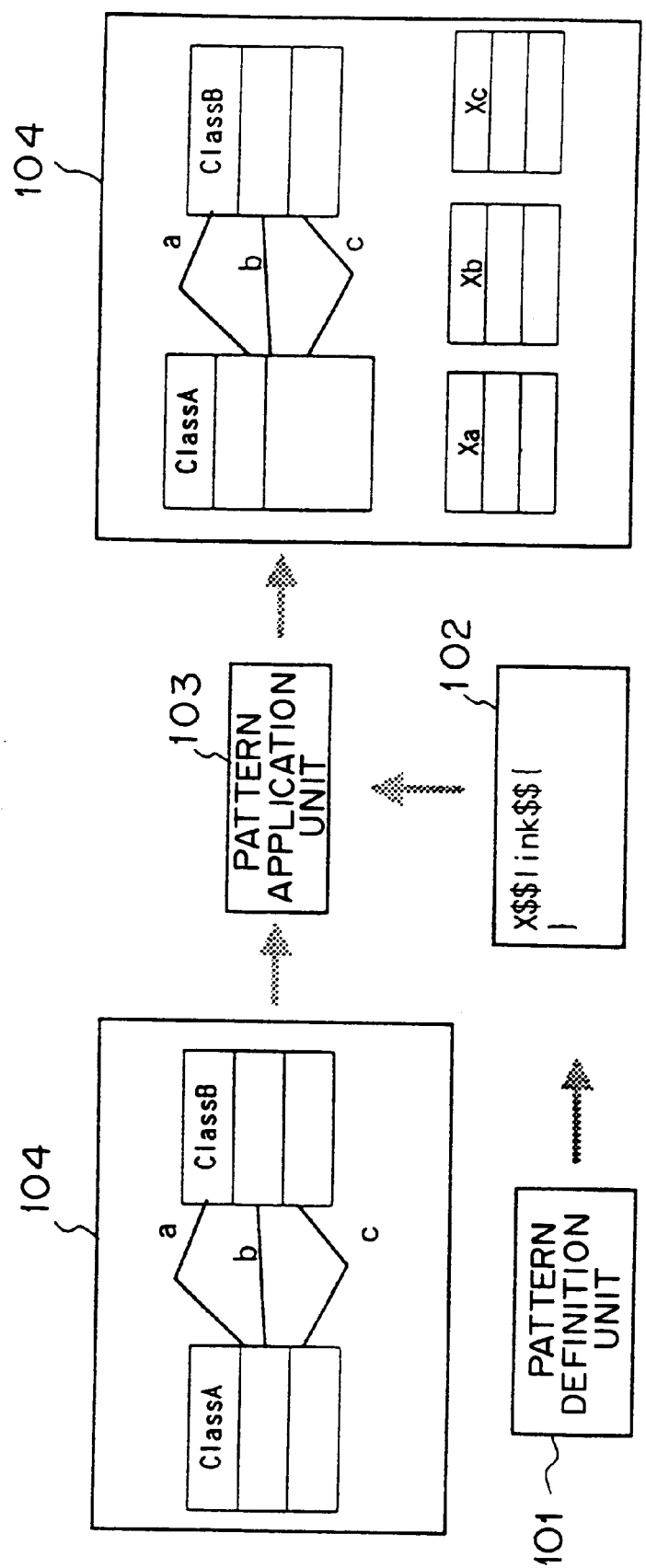
FIG. 53 shows an example of applying a pattern for adding a class based on the data of an already defined link.

In FIG. 53, as compared with FIG. 49, the portion of $$link$$ is replaced with a, b, and c as the names of the already defined link, thereby adding new classes Xa, Xb, and Xc.

Figure 54:
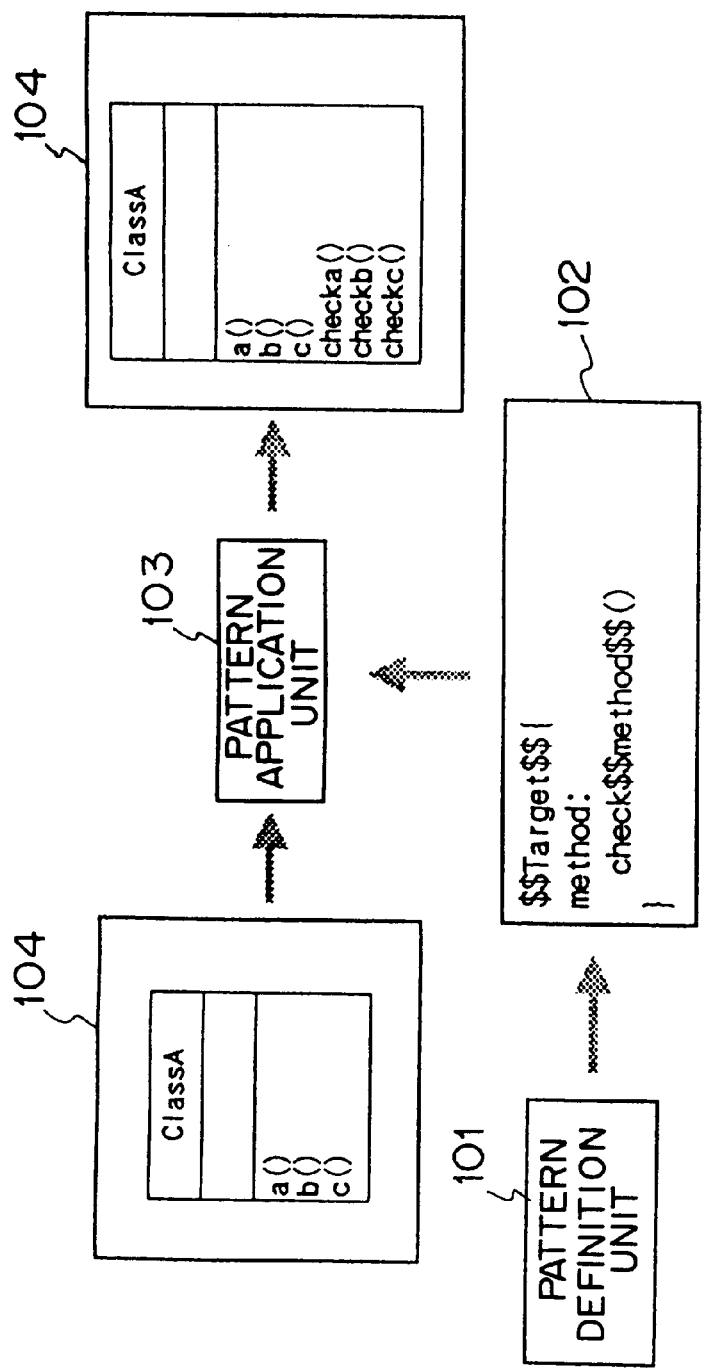
FIG. 54 shows an example of applying a pattern for adding a method based on the data of an already defined method.

FIGS. 54 through 57 show examples of a pattern and its application with which an element of an object is to be added based on the data of an already defined method. In FIG. 54, as compared with FIG. 47, the portion of $$method$$ is replaced with the names a, b, and c of the method of the already defined ClassA, and chacka( ), checkb( ), and checkc( ) are added as new methods to ClassA.

Figure 55:
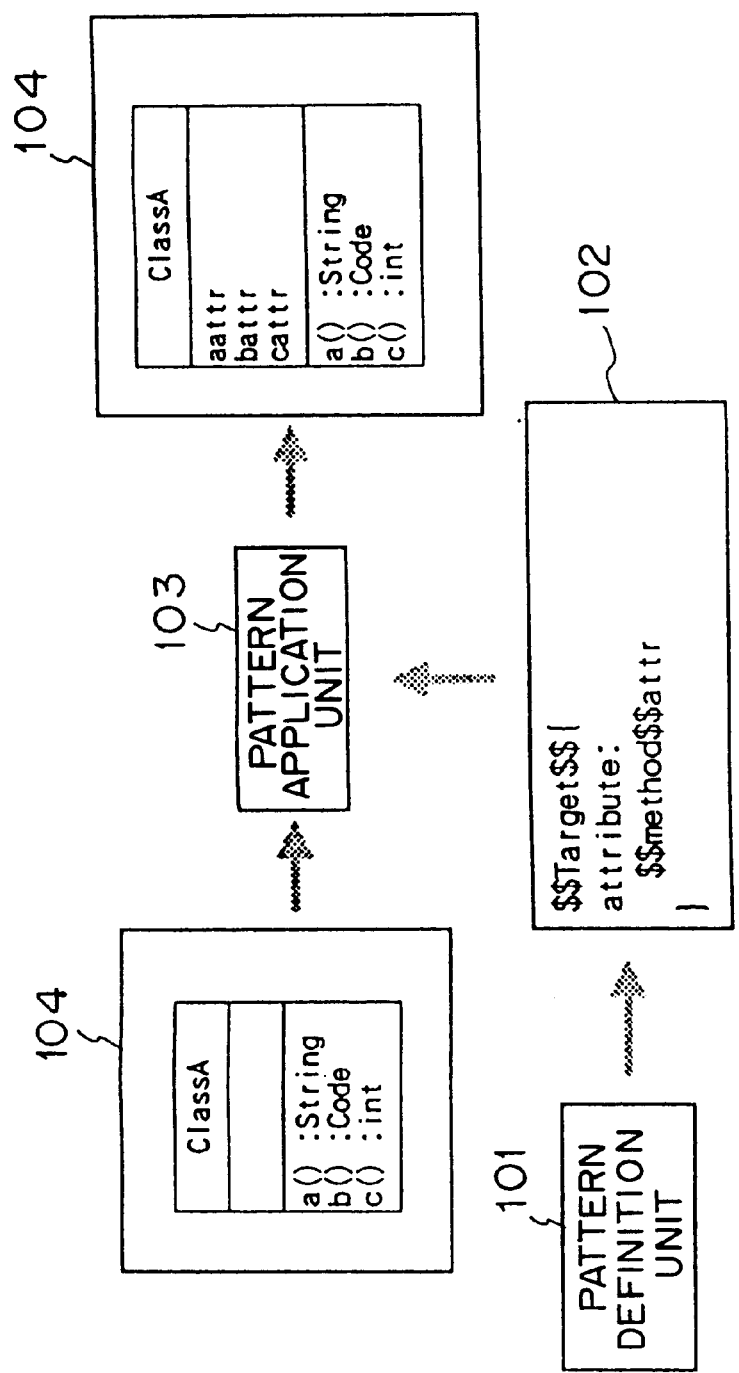
FIG. 55 shows an example of applying a pattern for adding an attribute based on the data of an already defined method.

In FIG. 55, as compared with FIG. 46, the portion of $$method$$ is replaced with the name a, b, and c of the method already defined in ClassA, and new attributes aattr, battr, and cattr are added to ClassA.

In FIG. 56, as compared with FIG. 48, the portion of $$method$$ is replaced with the names a, b, and c of the method already defined in ClassA, and three links aRole, bRole, and cRole are added as new links between ClassA and ClassB.

Figure 57:
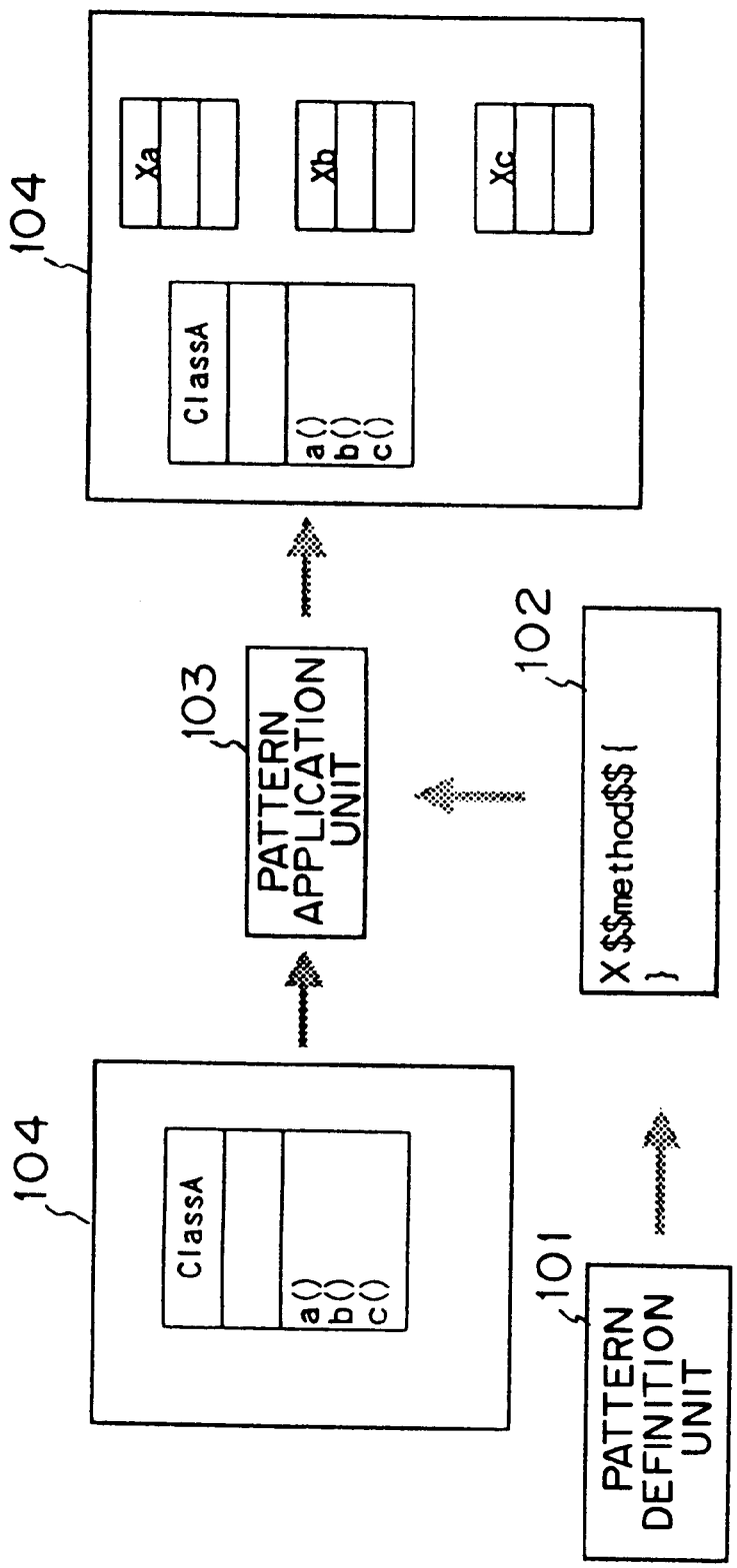
FIG. 57 shows an example of applying a pattern for adding a class based on the data of an already defined method.

In FIG. 57, as compared with FIG. 49, the portion $$method$$ is replaced with the names a, b, and c of the method already defined in ClassA, and Xa, Xb, and Xc are added as new classes.

Figure 58:
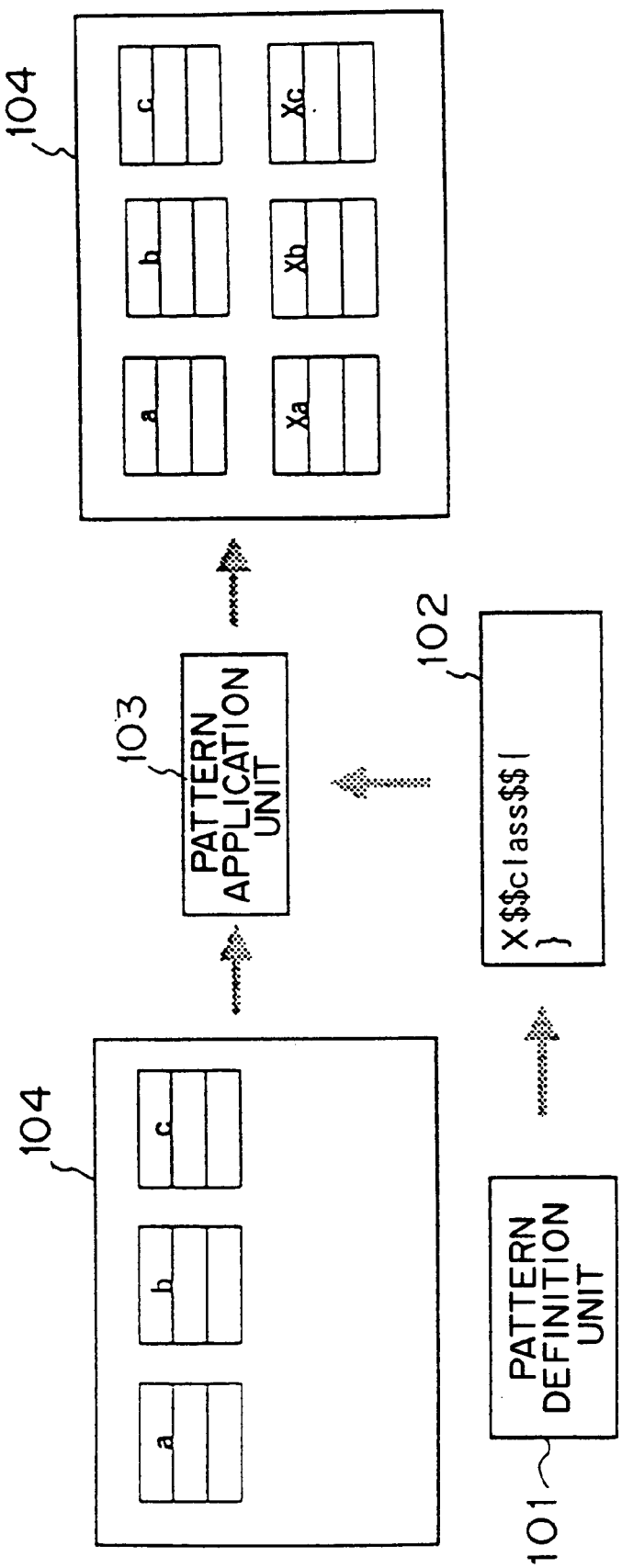
FIG. 58 shows an example of applying a pattern for adding a class based on the data of an already defined class.

FIGS. 58 through 61 show examples of a pattern and its application for adding a new element of an object based on the data of an already defined class. In FIG. 58, as compared with FIG. 49, the portion of $$Class$$ is replaced with the already defined class names a, b, and c, and Xa, Xb, and Xc are added as new classes.

Figure 59:
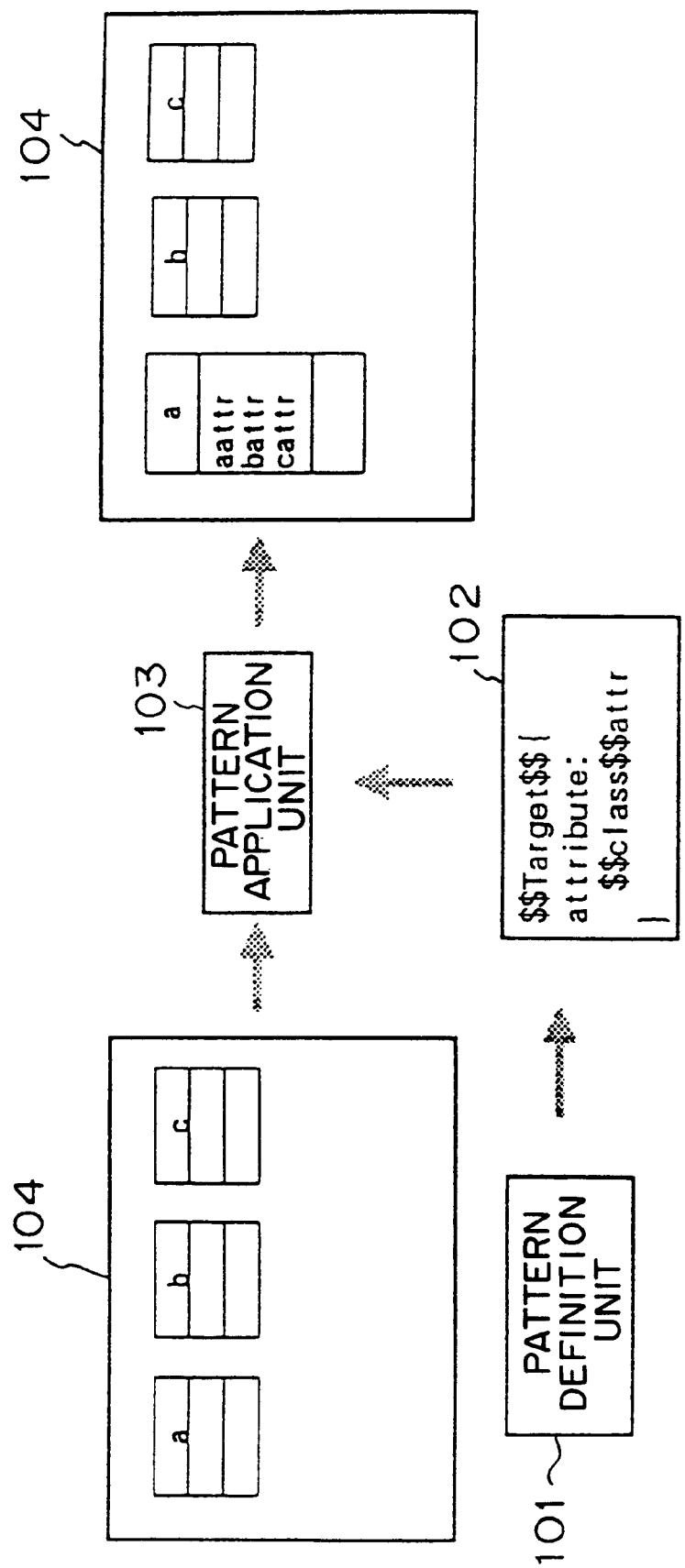
FIG. 59 shows an example of applying a pattern for adding an attribute based on the data of an already defined class.
Figure 60:
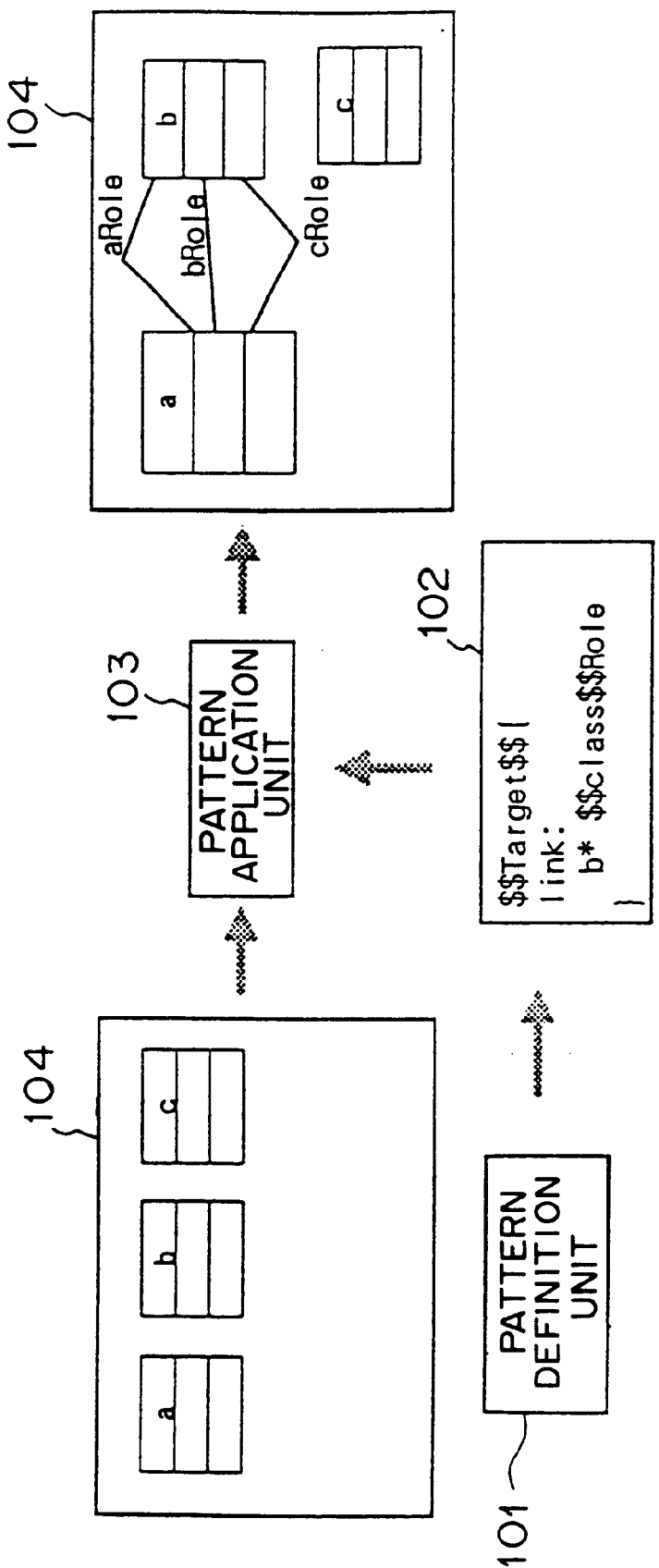
FIG. 60 shows an example of applying a pattern for adding a link based on the data of an already defined class.

In FIG. 59, as compared with FIG. 46, the portion of $$Class$$ is replaced with the class names a, b, and c, and aattr, battr, and cattr are added to the class a as new attributes. The addition of the new attributes to the class a is specified for the portion of $$Target$$.

Figure 66:
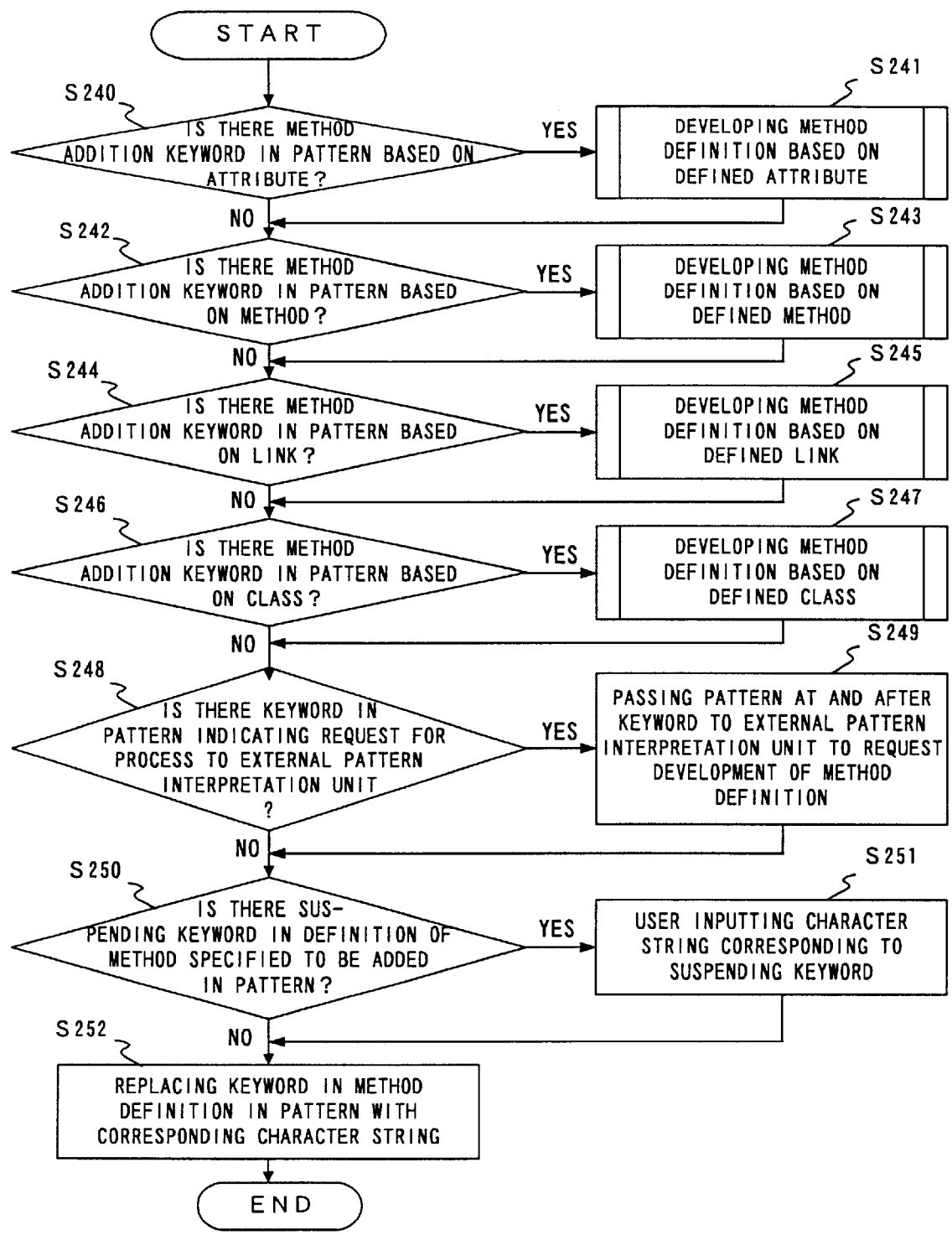
FIG. 66 is a detailed flowchart of the process of developing all method definitions (operation definitions) of an added class.

In FIG. 66, as compared with FIG. 48, the portion of ##Class$$ is replaced with the already defined class names a, b, and c, and new links aRole, bRole, and cRole are added between the classes a and b.

Figure 61:
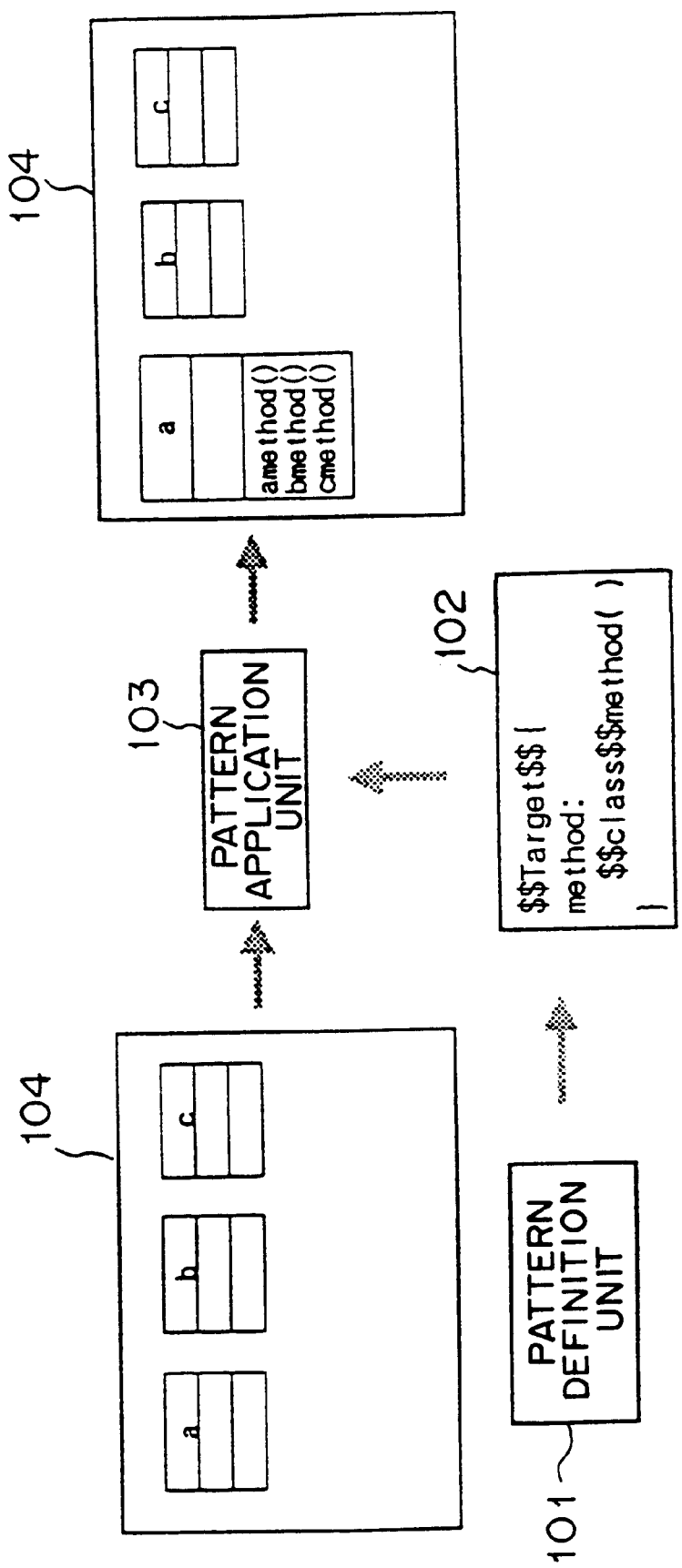
FIG. 61 shows an example of applying a pattern for adding a method based on the data of an already defined class.

In FIG. 61, as compared with FIG. 47, the portion of $$Class$$ is replaced with the already defined class named a, b, and c, and new attributes amethod ( ), bmethod( ), and cmethod( ).

Described above are comparatively simple patterns about the definition and application of a pattern for adding a new element to a model to be developed based on the element of an already defined object in the model to be developed. Before describing furthermore in detail about various practical examples, a flowchart of the process of applying such a pattern is first described below.

Figure 63:
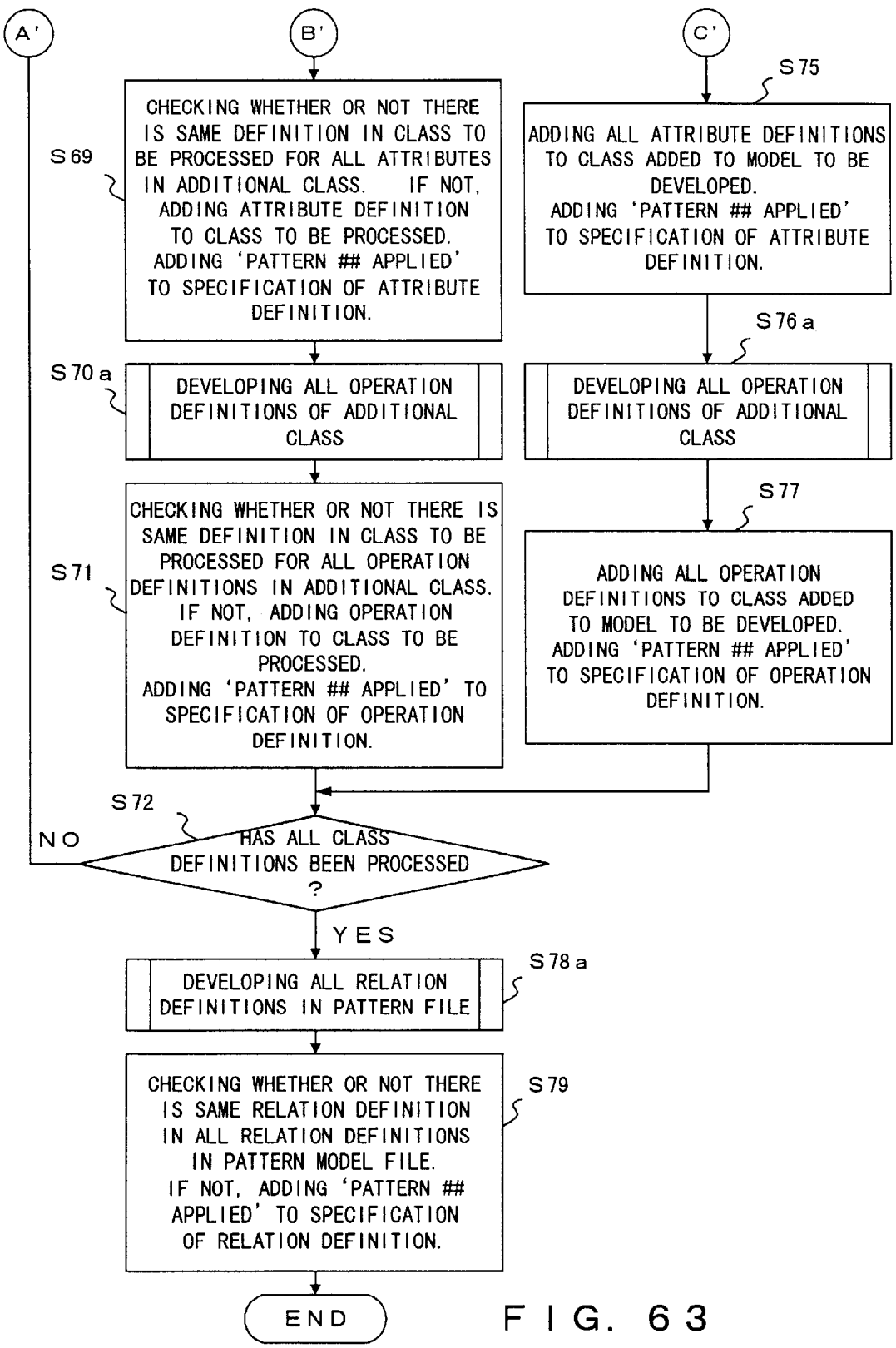
FIG. 63 continues from FIG. 62.

FIGS. 62 and 63 show a flowchart of the entire process of applying a pattern by the pattern application unit 103 shown in FIG. 45. The process shown in FIGS. 62 and 63 is almost the same as the process shown in FIGS. 19 and 20 corresponding to the above described first embodiment. Different points are: step S65 shown in FIG. 17 is divided into steps S65a and S65b, after all class definitions are developed in step S65a, an implementation pattern application result file for adding a class obtained by developing the definitions is prepared, and then the processes in and after step S66 are performed; and the processes in steps S68 and S74 in which all attribute definitions of an added class are developed, the processes in steps S70 and S76 in which all operation definitions of an added class are developed, and the process in step S78 in which all relation definitions in the pattern file are developed are different from those shown in FIGS. 21 through 23. These steps are S68a, S74a, S70a, S76a, and S78a in FIGS. 62 and 63. In addition, for example, the above described process of specifying ClassA as shown in FIG. 46 is performed by a user entering the target name in step S62.

FIG. 64 is a detailed flowchart of the process in which all class definitions are developed in step S65a shown in FIGS. 62 and 63. When the process is started as shown in FIG. 64, first in step S200, it is determined whether or not there is a keyword of adding a new class based on the attribute already defined in a model to be developed. If yes, after the definition of a new class is developed in step S201 based on the data of the already defined attribute, that is, the attribute, for example, defined in the model to be developed, control is passed to the process in step S202. If there is no keyword for addition, then control is immediately passed to the process in step S202. The process in step S201 is described later by referring to FIG. 68.

It is determined in step S202 whether or not there is a keyword for addition of a new class based on an already defined method. If yes, in step S203 as in step S201, the definition of a new class is developed based on an already defined method, and then the process in step S204 is performed. If there are no keywords for addition of a new class, then control is immediately passed to the process in step S204.

In steps S204 and S205, for example, as in steps S200 and S201, a process of adding a class based on an already defined link. In steps S206 and S207, a process of adding a class based on an already defined class.

In step S208, it is determined whether or not there is a keyword indicating a request for a process to an external pattern interpretation unit. The external pattern interpretation unit holds the unique pattern interpretation rule defined by, for example, a developer as described later. If there is a portion in a pattern requesting the external pattern interpretation unit for interpretation, then the pattern application unit 103 requests the external pattern interpretation unit to interpret the portion. That is, in step S209, the portion of the pattern at and after the keyword is passed to the external pattern interpretation unit. After the request to develop a class definition has been issued and the result has been returned to the pattern application unit, and there are no keywords requesting such processes, then control is immediately passed to the process in step S210.

In step S210, it is determined whether or not there is a suspending keyword in the definition of a class specified to be added in a pattern, that is, a keyword requesting, for example, a developer to input the contents of the character string corresponding to the keyword. If there is such a keyword, then after a character string corresponding to the suspending keyword is input by a developer, the suspending keyword in the attribute definitions in a pattern, and an already input keyword are replaced with a corresponding character string, thereby terminating the process. If it is determined in step S210 that there is not a suspending keyword, then, in step S212, a keyword, whose contents are input, not yet replaced, for example, the above described $$Target$$, is replaced with a corresponding character string, thereby terminating the process.

Figure 65:
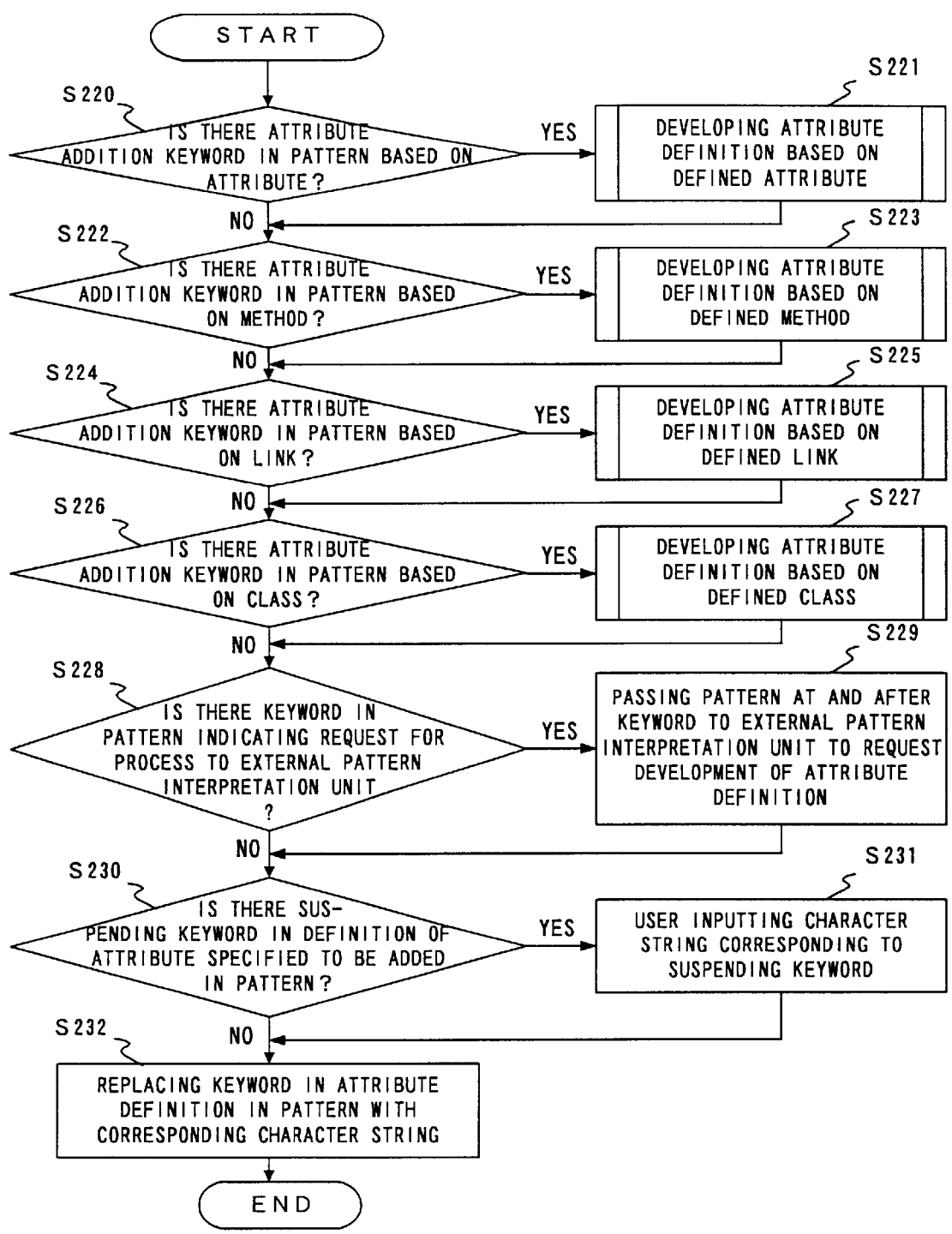
FIG. 65 is a detailed flowchart of the process of developing all attribute definitions of an added class.

FIGS. 65 through 67 are detailed flowcharts of the definition developing process of a new attribute, method, and link based on the data of the elements of the object defined in, for example, a model to be developed. FIG. 65 shows steps S68a and S74a shown in FIGS. 62 and 63. FIG. 66 shows steps S70a and S76a. FIG. 67 shows step S78a.

The processes shown in FIGS. 65 through 67 are practically the same as those shown in FIG. 64. For example, in FIG. 65, a process of adding an attribute based on the attribute, method, link, and class already defined in a model to be developed is performed in steps S220 through S227. In steps S228 and S229, a process of requesting the external pattern interpretation unit to for a process is performed. In steps S230 through S232, a process corresponding to a suspending keyword in the definition of an attribute to be added and a character string replacing process corresponding to an already input keyword are performed.

Figure 68:
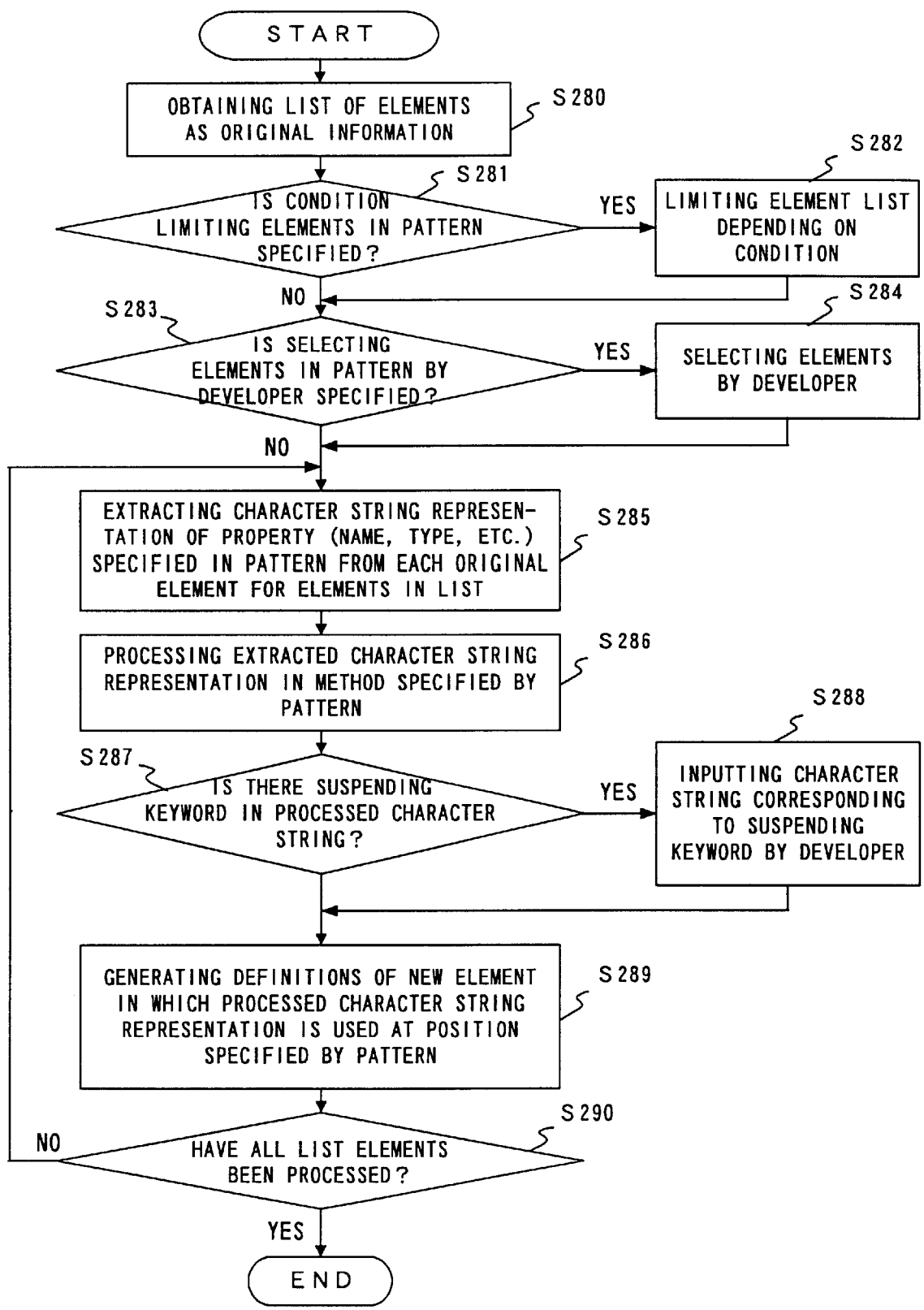
FIG. 68 is a detailed flowchart of the process of developing the definition an element to be newly added.

FIG. 68 is a flowchart of the process of developing the definition of an element to be newly added based on, for example, the element defined in a model to be developed. For example, FIG. 64 shows the processes in steps S201, S203, S205, and S207. For example, in step S201, an already defined element is an attribute of an object, and a process of developing the definition of a class to be newly added is performed.

When the process is started in FIG. 68, the original information, that is, a list of already defined elements is obtained in step S280. In step S281, it is determined whether or not a condition for limiting elements has been specified. If it has been specified, then control is passed to the process in step S283 after the list of the elements has been limited depending on the condition in step S282. If it has not been specified, then control is immediately passed to the process in step S283.

In step S283, it is determined whether or not it is specified that an element should be selected by the developer as described later, that is, the developer should be requested to select an element. If it is specified, then the process in step S285 is performed after the element is selected by the developer. If it is not specified, the process in step S285 is immediately performed.

In step S285, the data specified in a pattern, for example, a character string representation such as a name, a type, etc. is extracted from the data of an original element for the element in the list. In step S286, the character string representation extracted in step S286 is processed in the method specified in the pattern as described later using, for example, a leading uppercase. In step S287, it is determined whether or not there is a suspending keyword in the processed character string as in step S210 shown in FIG. 64. If there is such a keyword, then after the developer inputs a character string corresponding to the suspending keyword in step S288, and the suspending keyword is replaced with the character string, the process in step S289 is performed. If there are no such suspending keywords, then the process in step S289 is immediately performed.

In step S289, the processed character string representation is used at a position specified in the pattern, and a new element is defined. In step S290, it is determined whether or not the process has been performed for all elements in the list. If not, the processes in and after step S285 are performed. If the process has been performed for all elements, then the process terminates.

Thus, an example of applying a comparatively simple pattern and a flowchart of a pattern applying process have been explained. Described below is an example of a furthermore applied pattern.

Figure 69:
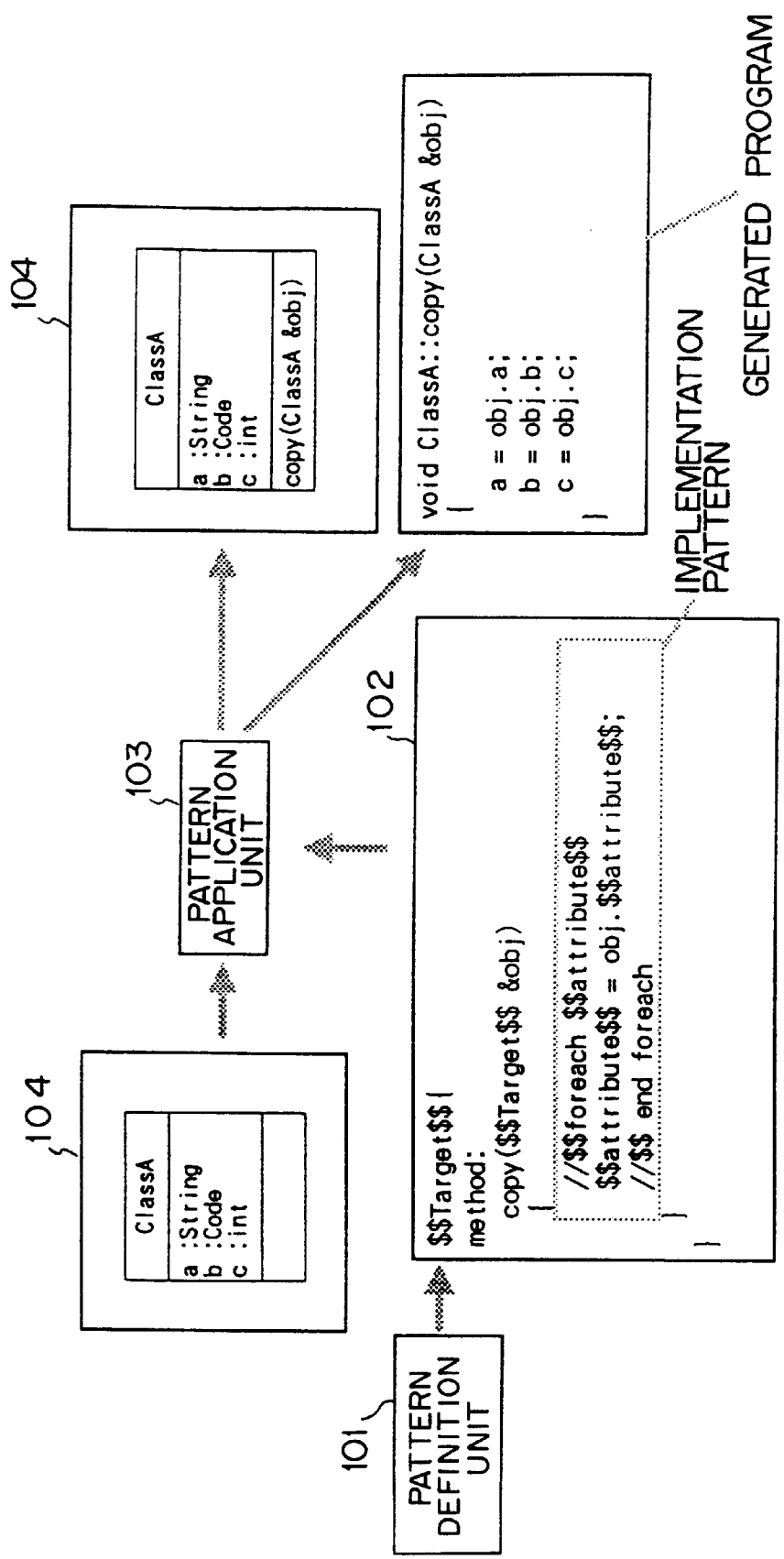
FIG. 69 shows an example of applying a pattern in which a portion corresponding to an analysis and design pattern and a portion corresponding to an implementation pattern.

FIG. 69 shows an example in which a portion corresponding to an analysis and design pattern and a portion corresponding to an implementation pattern are defined as a pattern, the pattern is applied to add a method to a model to be developed, and a new program is generated corresponding to the implementation pattern. The implementation pattern is encompassed by a bracket in the tag 'method'.

In FIG. 69, a new method 'copy (ClassA&obj)' is generated, and a program corresponding to an implementation pattern is generated. The portion '//$$foreach keyword... //$$endforeach' in the implementation pattern is an instruction for generating a program by repeating the inserted code for the number of elements represented by the keyword. In this example, $$attribute$$ is specified as a keyword, and a code corresponding to the attributes a, b, and c of ClassA is generated. $$attribute$$ in the code in the second line of the implementation pattern is replaced with the name of the attribute to be repeated.

Figure 70:
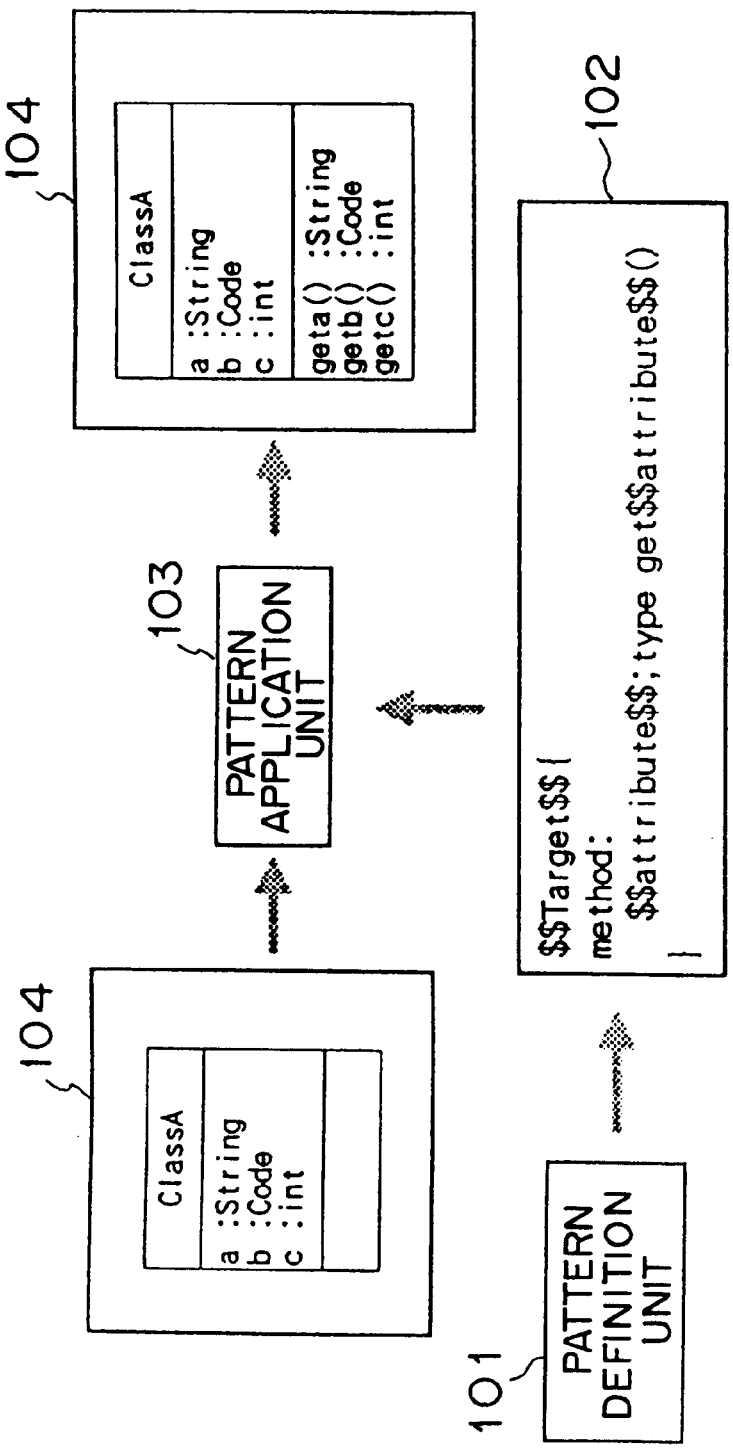
FIG. 70 shows an example of applying a pattern in which the type of a return value of a method to be added is specified to correspond to the type of an already defined attribute.
Figure 71:
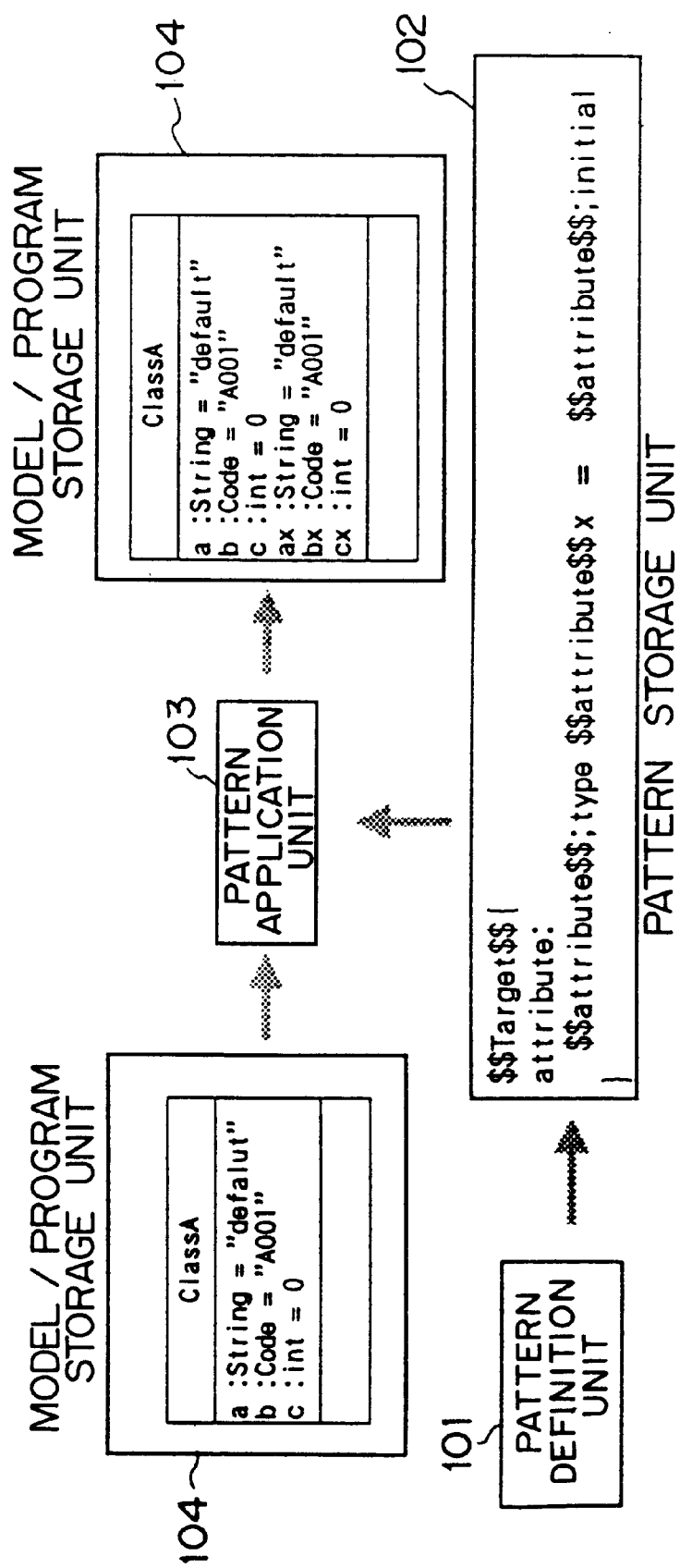
FIG. 71 shows an example of applying a pattern in which the type of an added attribute is specified to correspond to the type of an already defined attribute and its initial value.
Figure 72:
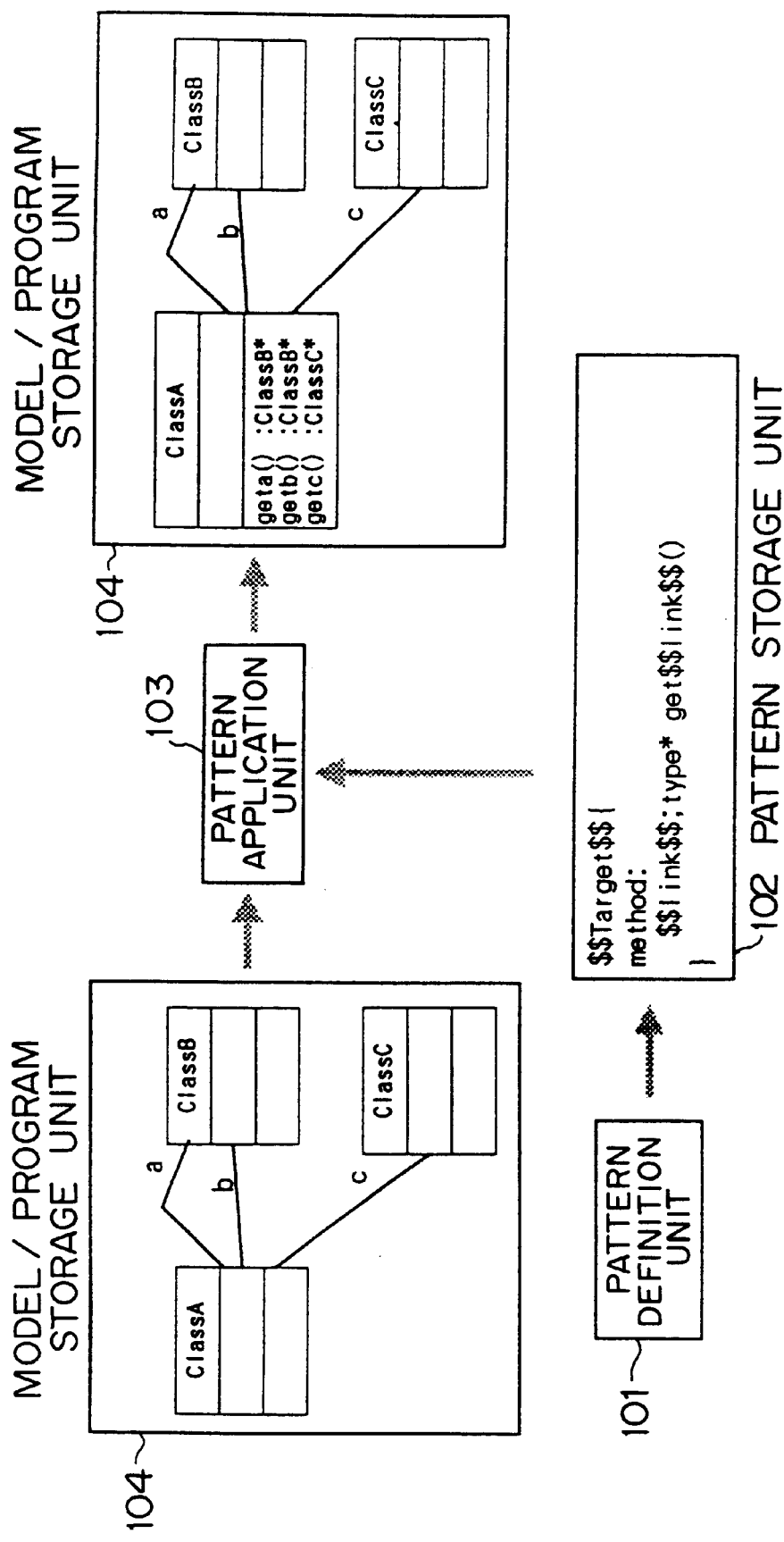
FIG. 72 shows an example of applying a pattern in which a return value of a method to be added is specified to correspond to the name of a linked-to class of an already defined link.

FIGS. 70 through 72 show an example of applying a pattern as an example of a furthermore applied pattern in which, for example, the data of elements of an object to be newly added to a model to be developed, for example, a name, a type, an initial value, visibility, etc. already defined in the model to be developed is specified. In this example, the visibility refers to a range of an accessible class, and the details are described later.

FIG. 70 shows an example of adding a method in which a new method is added as shown in FIG. 47 corresponding to the last half of the line after the line of the tagged 'method', the first half $$attribute$$;type is replaced with the types of the already defined attributes a, b, and c, and the result is used as the type of a return value of the method.

FIG. 71 shows an example of adding an attribute in which attributes ax, bx, and cx obtained by replacing $$attribute$$ with a, b, and c, and the type and the initial value of the original attribute are used.

In FIG. 72, a new method is added to ClassA, but the name of the linked-to class is used as a return value of a newly added method by $$link$$;type* in the first half of the line preceded by the line containing 'method' as a tag in a pattern.

FIGS. 73 through 76 show an example of applying a pattern in which it is specified in the pattern as described in step S286 shown in FIG. 68 to use a character string of the data for a newly added element after processing the character string in a predetermined method. The specified method can be followed by using uppercases, by using an uppercase for only the first character (capitalization), by deleting one previous word, etc.

Figure 73:
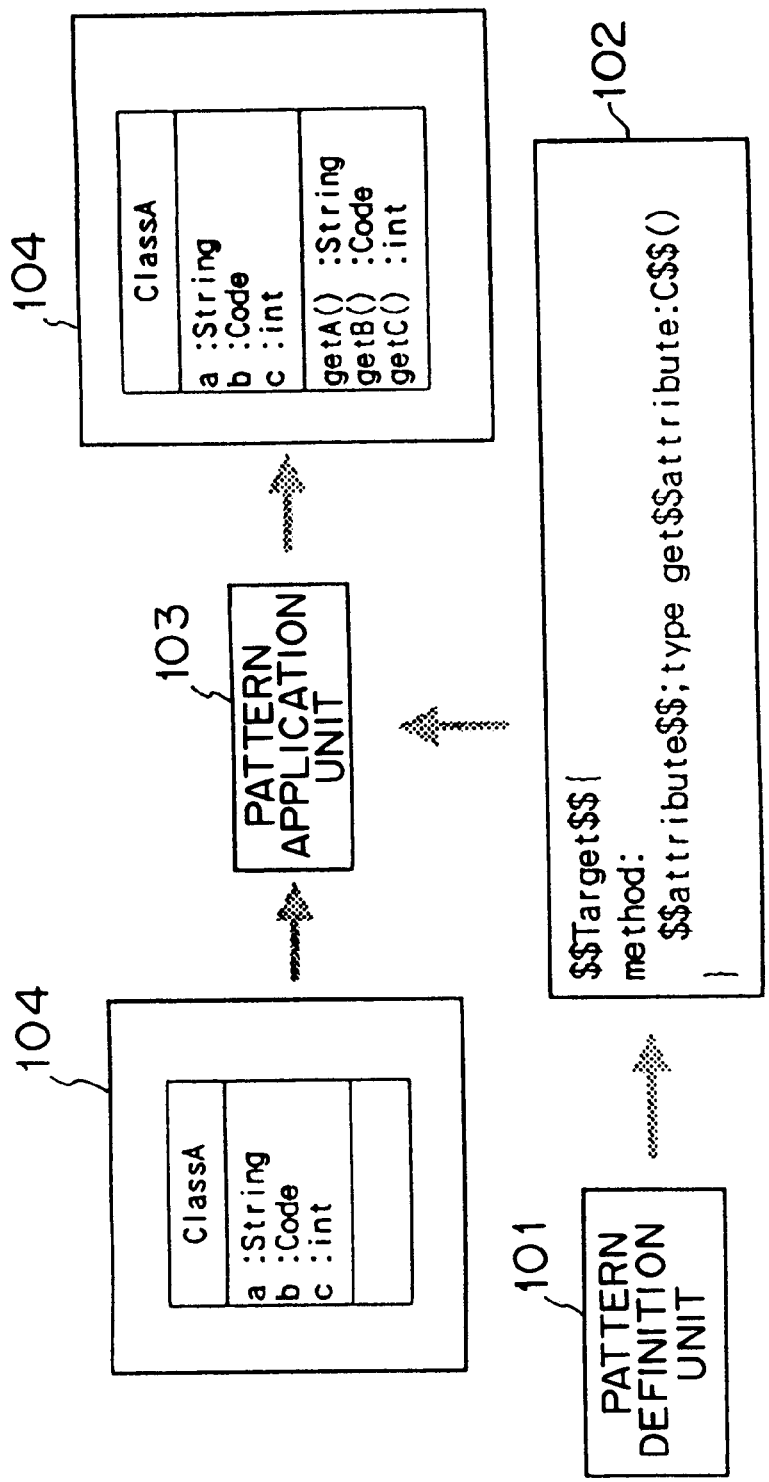
FIG. 73 shows an example of applying a pattern in which a capitalizing process is specified for the character string of the data for an element to be added.

FIG. 73 shows an example of adding a method as shown in FIG. 70. However, since 'C' in get$$attribute:C$$( ) indicates capitalization, a of the attribute name is expressed by an uppercase in, for example, getA( ) of the newly added method.

Figure 74:
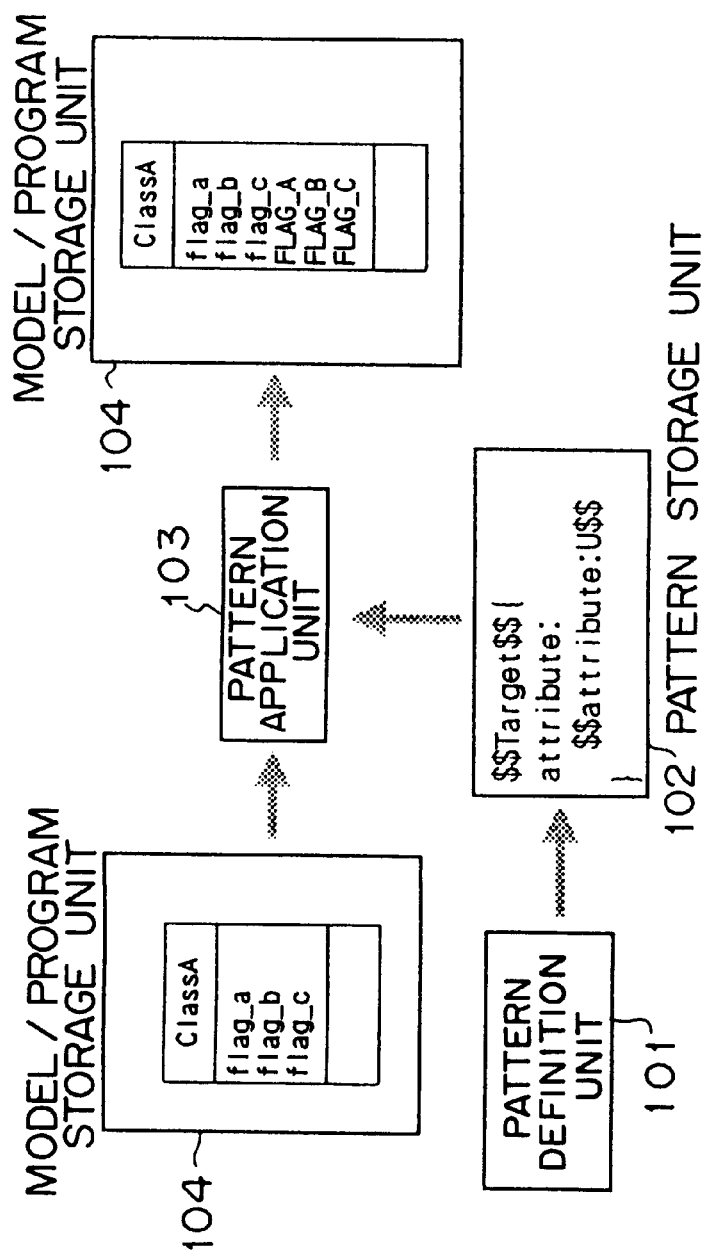
FIG. 74 shows an example of applying a pattern in which a character string having an attribute to be newly added is specified to be represented by uppercase.

FIG. 74 shows an example of adding an attribute. However, since 'U' in the pattern specifies uppercases, the three attributes already defined in ClassA are expressed by uppercases and then added.

Figure 75:
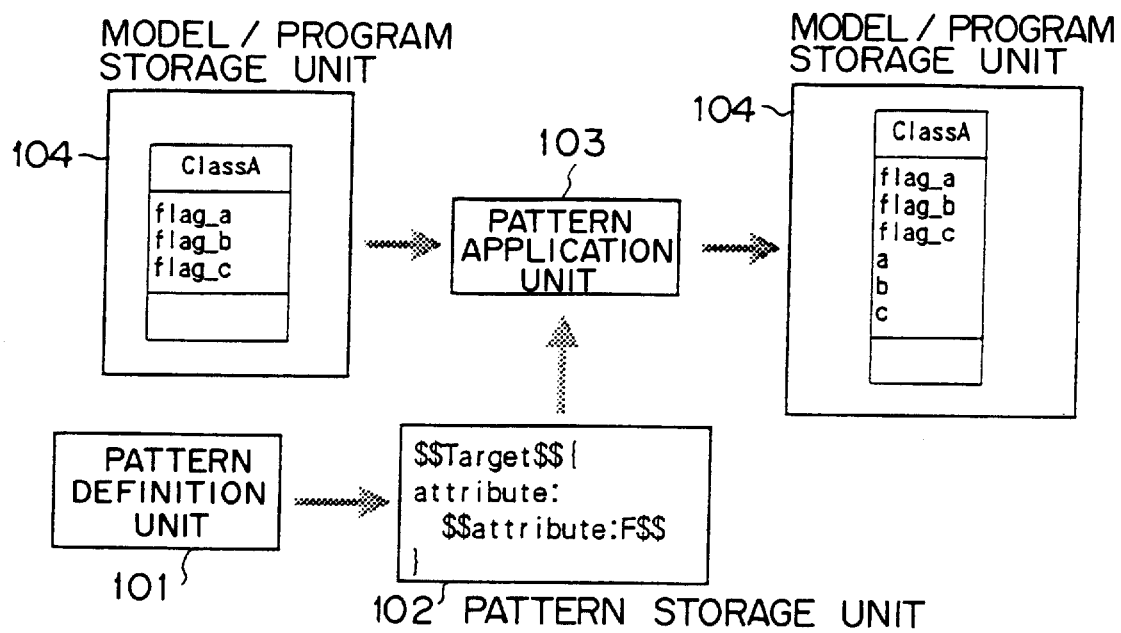
FIG. 75 shows an example of applying a pattern in which the word immediately before a character string having a newly added attribute is specified to be deleted.

In FIG. 75, an attribute is newly added as in FIG. 74. However, since 'F' in the pattern indicates deleting one previous word, the first one word of each of the already defined attributes, that is, 'flag_' is deleted.

Figure 76:
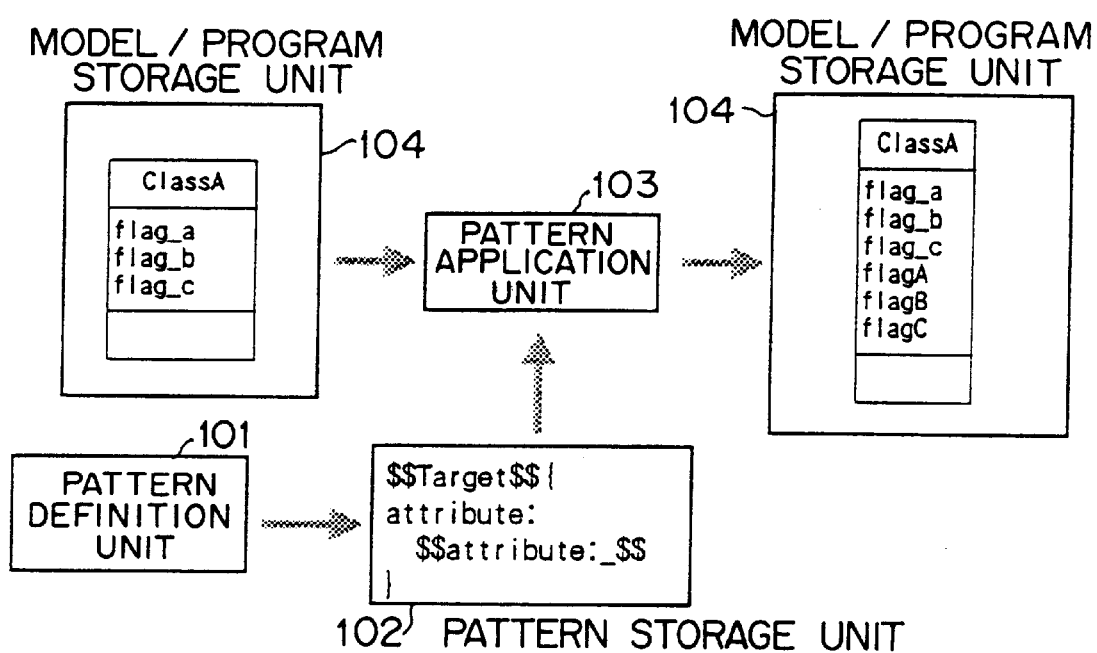
FIG. 76 shows an example of applying a pattern in which the character '_' in the character string having an attribute to be added is specified to be deleted, and the character immediately after the character '_' is specified to be represented by uppercase.

In FIG. 76, an attribute is similarly added.

However, since '_' in the pattern indicates the deletion of '_', and specifying the character immediately after the symbol to be expressed by an uppercase, for example, an attribute such as flagA, etc. are added.

Figure 77:
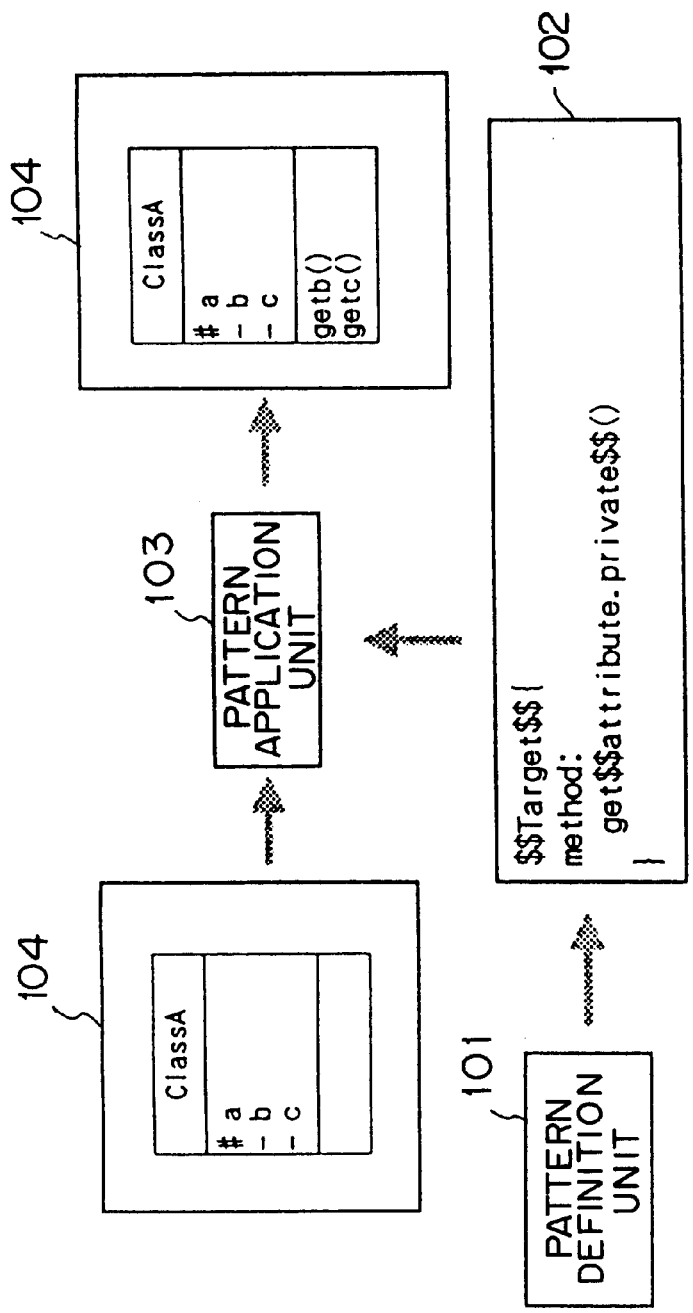
FIG. 77 shows an example of applying a pattern in which a method is added corresponding to the visibility of an already defined attribute.
Figure 78:
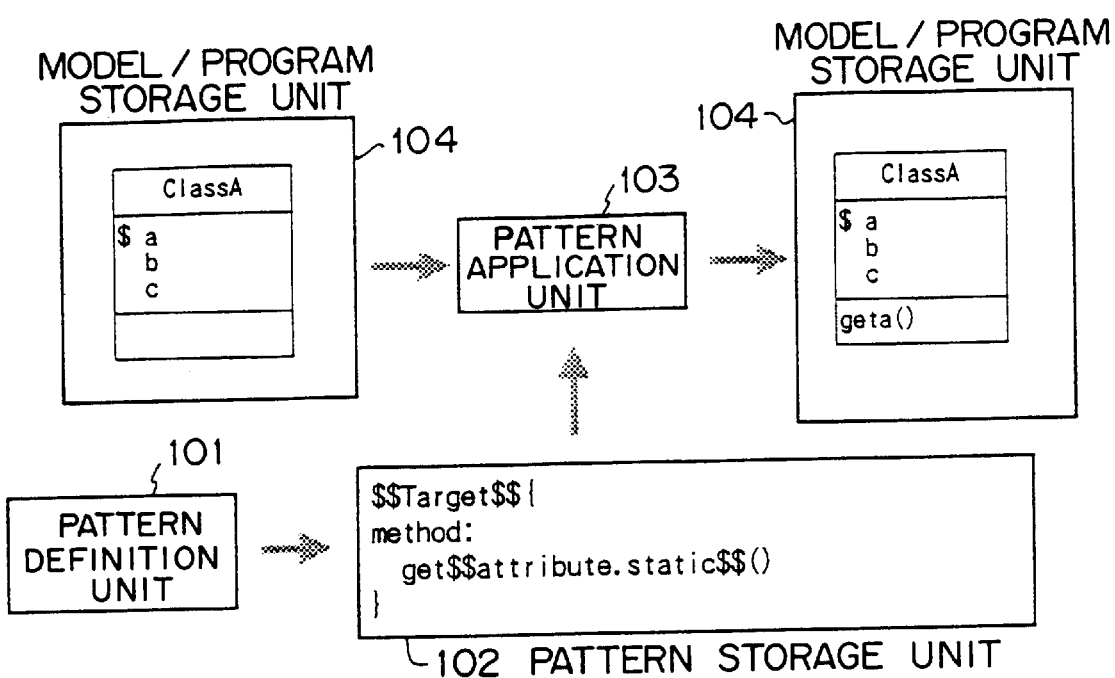
FIG. 78 shows an example of applying a pattern in which a method is added corresponding to an already defined attribute under the only condition of a static variable.
Figure 79:
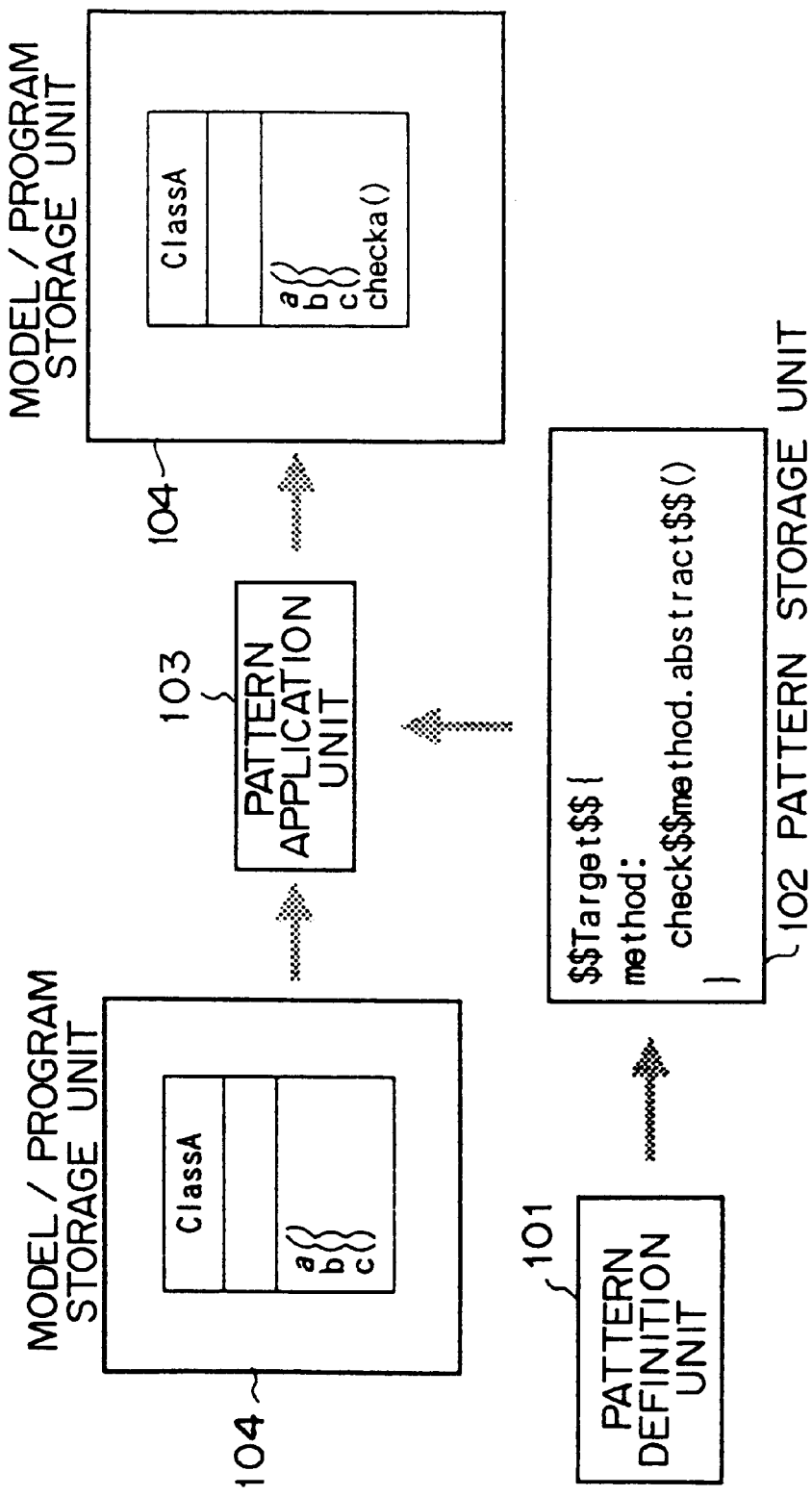
FIG. 79 shows an example of applying a pattern in which a method is added corresponding to an already defined method under the only condition of an abstract method.

FIGS. 77 through 79 show an example of applying a pattern in which a condition of, for example, only instance variables, only static variables, only private method, etc. is specified among the elements of an already defined object in the model to be developed, and any item satisfying the condition should be automatically selected as shown in steps S281 and S282 shown in FIG. 68.

FIG. 77 shows an example of adding a method. Since it is specified by 'private' in the pattern that only a private attribute should be selected, a method is added only corresponding to b and c assigned '—' indicating 'private' (only the class is accessible)as a leading character indicating visibility, that is, an accessible class among the already defined attributes. In addition '#' assigned to a indicates the protection with which only the class and the subclass are accessible, and '+' not shown in the attached drawings indicates that all classes are accessible.

In FIG. 78, a method is added. However, since 'static' in the pattern has the condition of a static variable only, a method can be added only to a having a leading $ indicating a static variable among the already defined attributes a, b, and c.

A method is added also as shown in FIG. 79. However, since 'abstract' in the pattern specifies that only an abstract method expressed in italics should be selected. Therefore, a method can be added using only a ( ) expressed in italics among the already defined methods.

Figure 80:
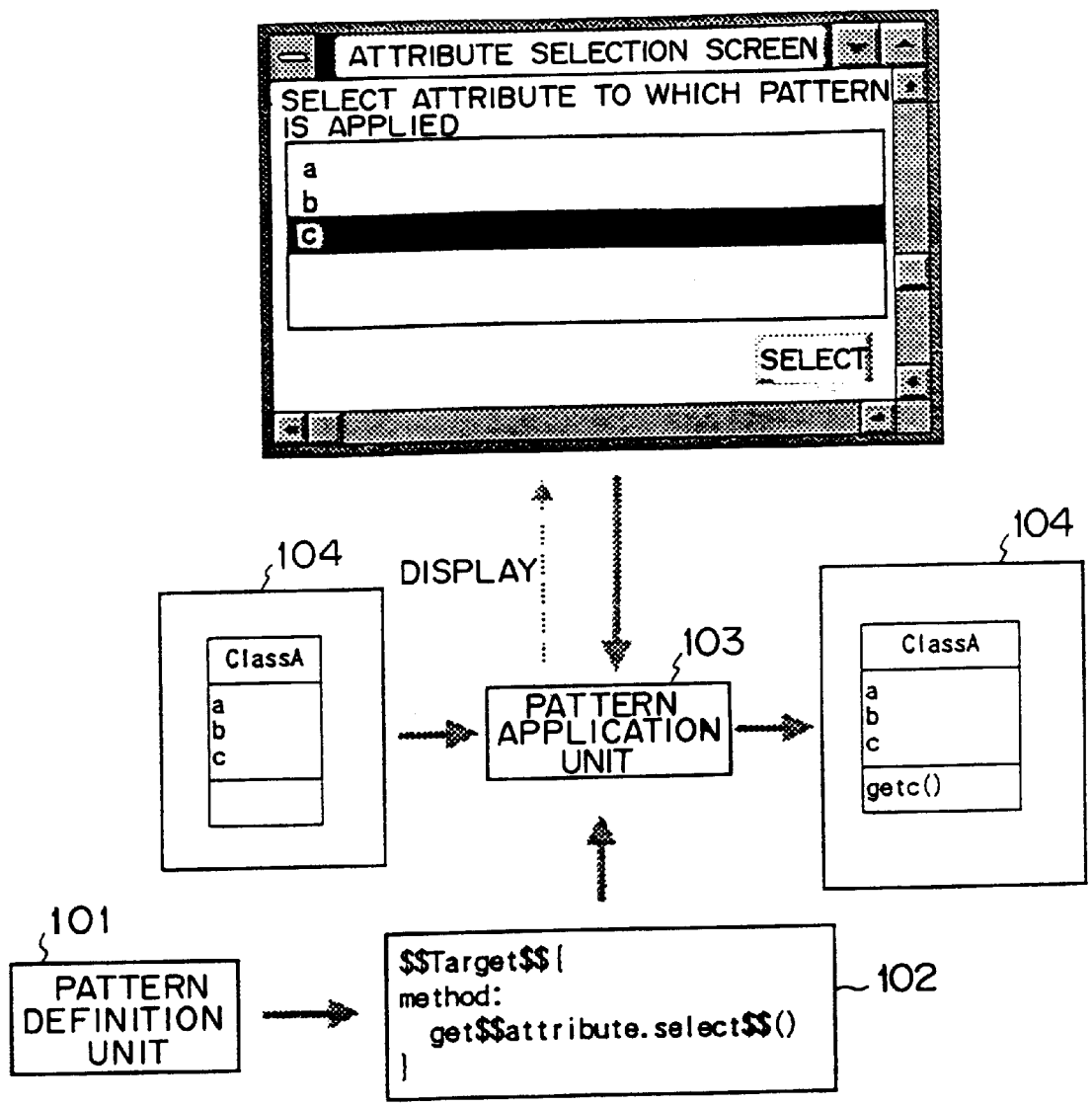
FIG. 80 shows an example of applying a pattern in which a developer or a user is instructed to select an already defined element when the pattern is applied.

FIG. 80 shows an example of applying a pattern in which it is specified that a developer or a user selects, when the pattern is applied, an element which has already been defined in a model to be developed, and based on which a new element is to be added as described in steps S283 and S284 shown in FIG. 68. In FIG. 80, it is specified that, for example, a user is requested to select an element by 'select' in the pattern, and, in response to the specification, the pattern application unit 103 presents the user with an attribute selection screen, and the user selects, for example, 'c' as an attribute name, thereby adding a method.

Figure 81:
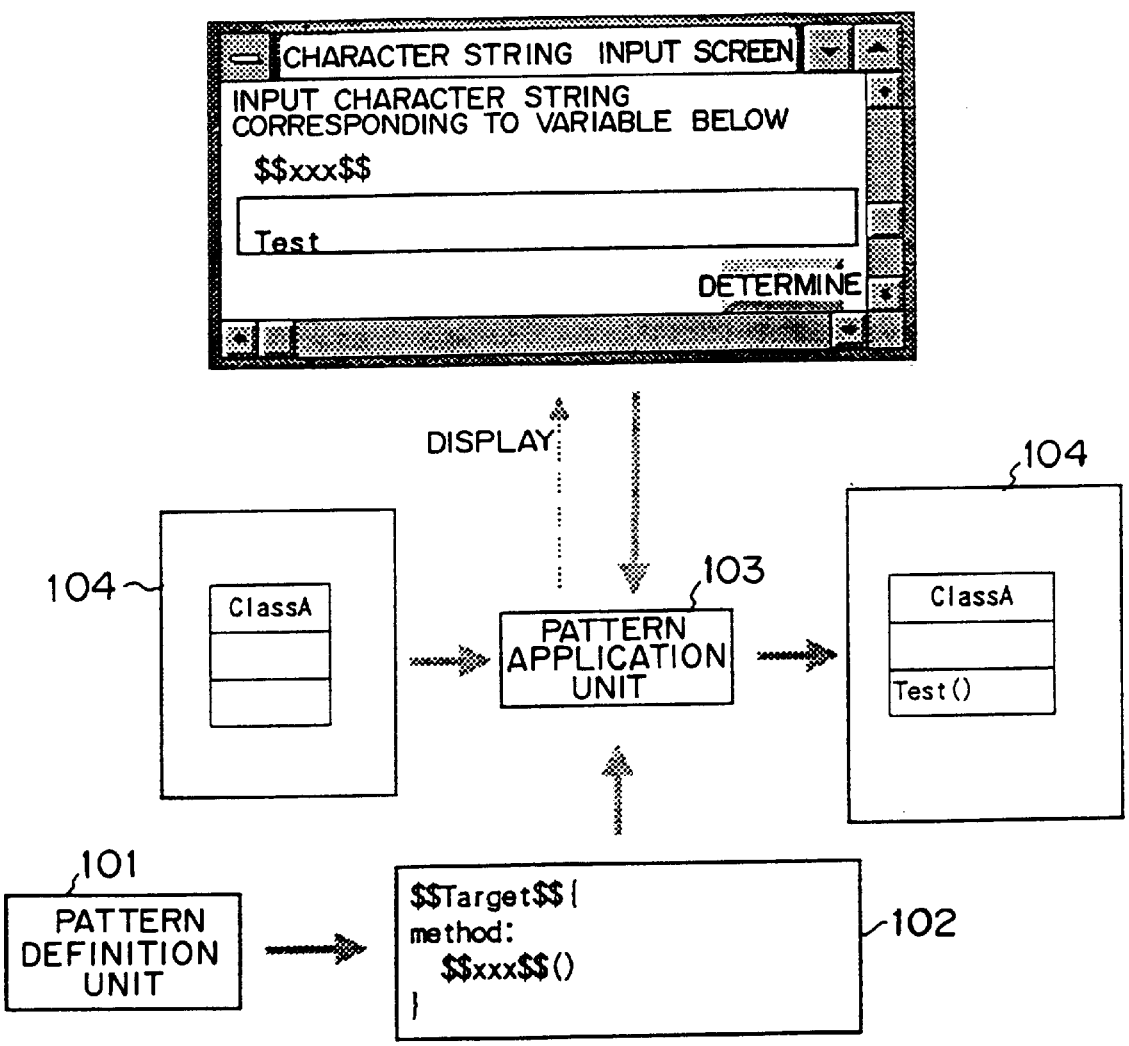
FIG. 81 shows an example of applying a pattern in which a developer or a user is instructed to input a character string while applying the pattern.
Figure 82:
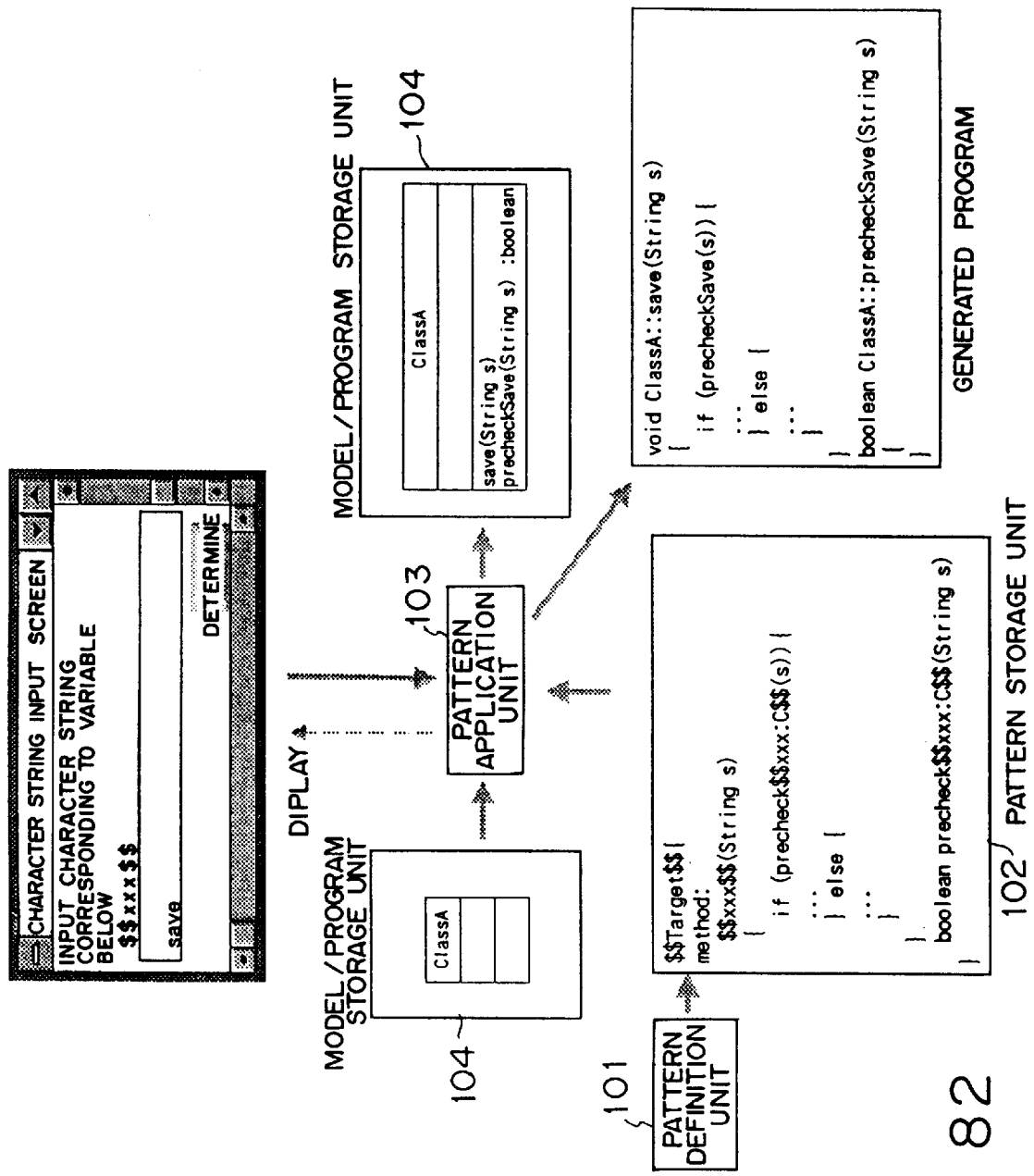
FIG. 82 shows an example of applying a pattern in which a portion corresponding to an analysis and design pattern and a portion corresponding to an implementation pattern are contained, and in which a user is requested to input a character string when applying the pattern.

FIGS. 81 and 82 shows an example of applying a pattern in which a developer or a user is requested to optionally input a character string during the application of the pattern. In FIG. 81, for example, a user is requested to input the name of a method to be added, and a new method is added using the name 'Test' input by the user.

In FIG. 82, as in FIG. 69, the pattern contains a portion corresponding to an analysis and design pattern, and a portion corresponding to an implementation pattern, thereby adding a method and generating a program. At this time, the pattern application unit 103 prompts the user to input a character string corresponding to $$XXX$$, and a method is added and a program is generated using the user-input 'save'. The user-input character string is used for both added method and generated program. Using the internal descriptions of the program, there is the second added method. Furthermore, 'C' indicating capitalizing is also used in the pattern.

Figure 83:
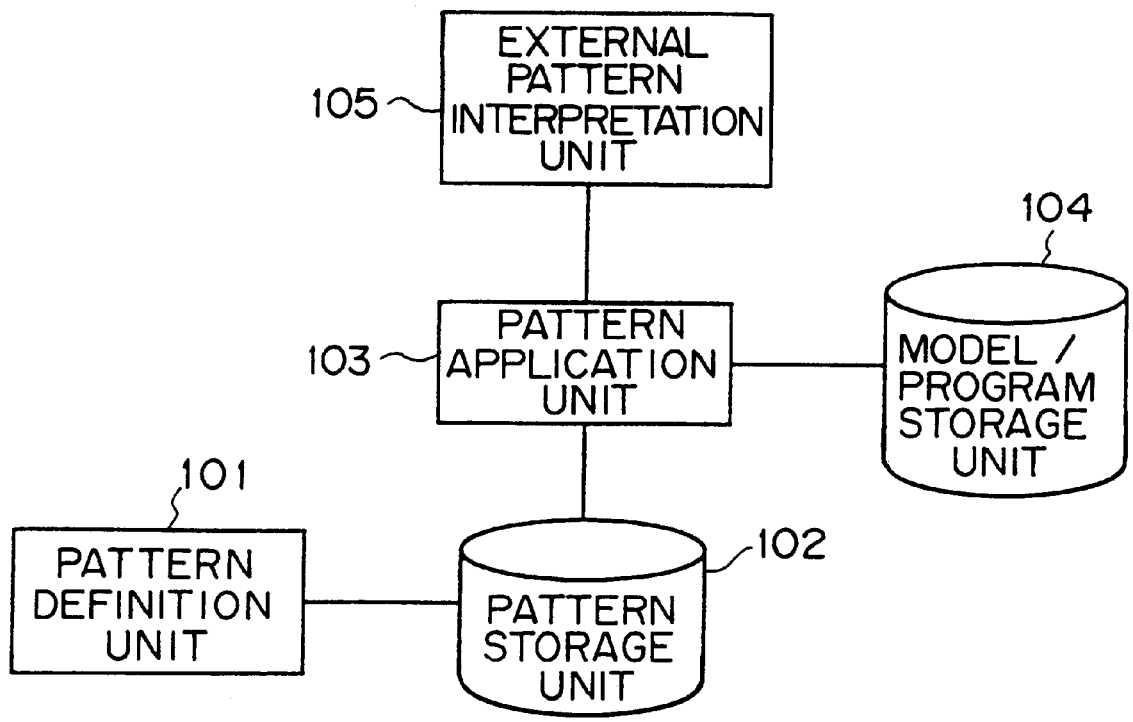
FIG. 83 is a block diagram of a basic configuration of the object-oriented software development support apparatus containing an external pattern interpretation unit.

As the last example of applying a pattern, described below is an example of applying a pattern in which a portion according to a development rule uniquely regulated by, for example, a developer is defined in the pattern. The development rule is, as described in steps S208 and S209 shown in FIG. 64, stored in the external pattern interpretation unit generated by, for example, a developer, and is used when interpreting a pattern. FIG. 83 is a block diagram of the basic configuration of the object-oriented software development support apparatus in the above described case. As compared with the configuration shown in FIG. 45, an external pattern interpretation unit 105 is connected to the pattern application unit 103.

FIG. 84 shows an example of applying a pattern containing a process performed by the external pattern interpretation unit 105. In FIG. 84, a character string from 'user-define' to the next tag in the pattern to which a method is to be added is provided from the pattern application unit 103, and an attribute is added corresponding to the interpret rule stored in the external pattern interpretation unit.

Figure 85:
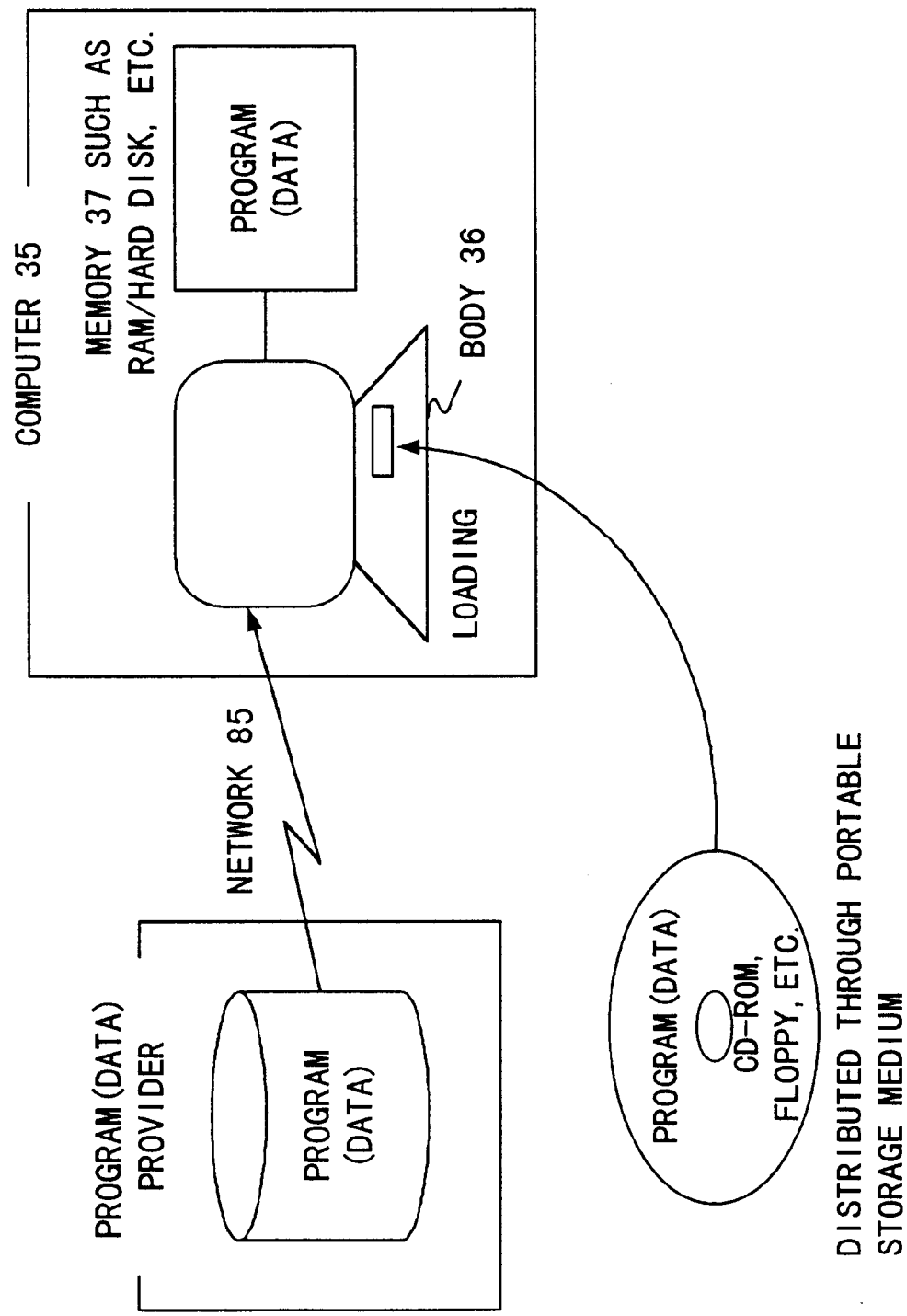
FIG. 85 shows the process of loading a program in the object-oriented software development support apparatus according to the present invention.

Finally, the loading of a program in the object-oriented software development support apparatus according to the present invention is described below by referring to FIG. 85. The software development support apparatus can be realized by a common computer system. Such a computer 35 basically comprises a body 36 and memory 37. A program for use in performing a process according to the present invention can be loaded from a portable storage medium 39 to the body 36, and from a program provider through a network 38.

A program in the object-oriented software development support apparatus according to the present invention, for example, a program shown in the flowcharts in, for example, FIGS. 5, 8, 9, 14 and 15, 19 through 23, 62 through 68, etc. is stores in, for example, the memory 37. The program is executed by the body 36. The memory 37 can be a hard disk, etc.

In addition, a program for use in defining a pattern in the software development support apparatus is stored in the portable storage medium 39, and the program is loaded on the body 36, thereby defining a pattern. The portable storage medium 39 can be an optical disk, a magneto-optic disk, etc. Furthermore, a program for use in defining a pattern is transmitted from a program provider to the computer 35 through the network 38, and a pattern definition can be realized by loading the program.

The embodiments of the present invention have been described above by referring to C++ as an object-oriented software language. However, the software language can be any other languages without limiting to C++. In addition, other embodiments can be realized within the scope of the claims of the present invention.

According to the present invention, as described above in detail, a manager of a development project defines and provides the architecture of necessary patterns such as an analysis pattern, a design pattern, an implementation pattern, etc. so that a developer of each division can appropriately and efficiently use the patterns, thereby improving the software development efficiency. By sequentially applying patterns correlated as a pattern architecture, the quality of analysis information, design information, and source code can be levelled. In addition, inconsistency can be avoided between analysis information and design information, and design information and source code, thereby successfully tracing information. Furthermore, by applying a pattern as a comparatively simple pattern in which data of an object already defined in a model to be developed can be used, many parts of software development can be automated, thereby improving the efficiency in an object-oriented software development.

What is claimed is:

1. An object-oriented software development support apparatus for supporting object-oriented software designing, comprising:
a pattern architecture storage unit storing pattern information about a plurality of patterns, including analysis patterns, design patterns and implementation patterns formed of samples of source code corresponding to operation definitions of a class in the analysis and design patterns, available when object-oriented software is developed, and inter-pattern relevant information for association between interrelated patterns; and
a pattern application unit applying the designs and analysis patterns whose application has been externally approved and which are stored in said pattern architecture storage unit, to a model to be developed, and automatically generating source code, based on an implementation pattern interrelated with the design and analysis patterns and corresponding to a portion to which at least one of each of analysis and design patterns have been applied in the model to be developed.

2. The apparatus according to claim 1, wherein
said pattern architecture storage unit stores a viewpoint on software development and a selection item corresponding to the viewpoint as the inter-pattern relevant information; and
said pattern application unit automatically selects a pattern at an external instruction about the viewpoint and the selection item, and applies the selected pattern to a model to be developed.

3. The object-oriented software development support apparatus according to claim 1, wherein
said pattern architecture storage unit furthermore stores a retrieval key to a plural pieces of pattern information; and
said pattern application unit applies a pattern externally specified among patterns retrieved using an externally input retrieval key to a model to be developed.

4. The object-oriented software development support apparatus according to claim 1, further comprising
a pattern information definition unit defining the pattern information according to pattern definition information externally input in a format of a pattern template.

5. The apparatus according to claim 4, wherein said pattern information definition unit further defines a retrieval key for the pattern information when the pattern information is defined.

6. The apparatus according to claim 1, further comprising
a pattern architecture definition unit defining inter-pattern relevant information for association between patterns having an antecedent/consequent relationship according to externally input information.

7. The apparatus according to claim 6, wherein
said pattern architecture definition unit defines a viewpoint on software development and a selection item corresponding to the viewpoint as the inter-pattern relevant information.

8. The apparatus according to claim 1, further comprising:
a pattern architecture display unit displaying a pattern architecture corresponding to plural pieces of pattern information and inter-pattern relevant information stored in said pattern architecture storage unit in a single collective format; and
a pattern information display unit displaying pattern information stored in said pattern architecture storage unit in a template format corresponding to the pattern information.

9. The apparatus according to claim 1, further comprising
a pattern architecture navigation unit interpreting a pattern architecture corresponding to plural pieces of pattern information and inter-pattern relevant information stored in said pattern architecture storage unit, and externally presenting a pattern applicable to the model to be developed, wherein
said pattern application unit applies a pattern whose application has been externally approved among the presented patterns to a model to be developed.

10. The apparatus according to claim 1, further comprising a pattern information definition unit defining the pattern information about the implementation pattern according to implementation pattern definition information externally input in a format of a pattern template.

11. The apparatus according to claim 1, further comprising a pattern architecture definition unit defining the inter-pattern relevant information between the analysis and design patterns and the implementation pattern according to externally input information.

12. The apparatus according to claim 1, further comprising:
a pattern architecture display unit displaying a pattern architecture corresponding to plural pieces of pattern information and inter-pattern relevant information stored in said pattern architecture storage unit in a single collective format; and
an implementation pattern information display unit displaying the pattern information about at least one implementation pattern stored in said pattern architecture storage unit in an implementation pattern template format.

13. The apparatus according to claim 1, further comprising:
a pattern application history information storage unit holding application history information for a pattern applied by said pattern application unit to a model to be developed; and
a pattern application history interpretation unit interpreting application history information stored in said pattern application history information storage unit, and obtaining reusability of each pattern and a pattern architecture corresponding to plural pieces of pattern information and inter-pattern relevant information.

14. The apparatus according to claim 1, further comprising
a pattern application history information storage unit holding application history information for a pattern applied by said pattern application unit to a model to be developed, wherein
said pattern application unit interprets application history information stored in said pattern application history information storage unit, and improves efficiency of a pattern applying process by preliminarily setting data to be externally input when a pattern is applied.

15. An object-oriented software development support apparatus for supporting object-oriented software designing, comprising:
an external pattern interpretation unit storing a preliminary and uniquely regulated pattern interpretation rule, and interpreting pattern information according to the interpretation rule to produce an interpretation result; the pattern information including analysis patterns, design patterns and implementation patterns formed of samples of source code corresponding to operation definitions of a class in the analysis and design patterns;
a pattern information definition unit defining pattern information, containing a portion specifying that the pattern information should be interpreted according to the pattern interpretation rule and providing defined pattern information in developing object-oriented software according to externally provided pattern definition information;
a pattern storage unit storing the defined pattern information; and
a pattern application unit applying the defined pattern information stored in said pattern storage unit to a model to be developed, detailing the model, and supporting development of software corresponding to the model using the interpretation result from said external pattern interpretation unit when a pattern containing the defined pattern information is applied.

16. The apparatus according to claim 15, wherein said pattern information definition unit defines pattern information for use in adding, based on data of attributes of a class already defined in the model to be developed, new attributes to the model to be developed; and said pattern application unit adds new attributes by applying a pattern containing at least said pattern information to the model to be developed.

17. The apparatus according to claim 15, wherein said pattern information definition unit defines pattern information for use in adding, based on data of attributes of a class already defined in the model to be developed, new methods to the model to be developed; and said pattern application unit adds a new method by applying a pattern containing at least said pattern information to the model to be developed.

18. The apparatus according to claim 15, wherein said pattern information definition unit defines pattern information for use in adding, based on data of attributes of a class already defined in the model to be developed, new links to the model to be developed; and said pattern application unit adds new links by applying a pattern containing at least said pattern information to the model to be developed.

19. The apparatus according to claim 15, wherein said pattern information definition unit defines pattern information for use in adding, based on data of attributes of a class already defined in the model to be developed, new classes to the model to be developed; and said pattern application unit adds new classes by applying a pattern containing at least said pattern information to the model to be developed.

20. The apparatus according to claim 15, wherein said pattern information definition unit defines pattern information for use in adding, based on data of links of a class already defined in the model to be developed, new links to the model to be developed; and said pattern application unit adds new links by applying a pattern containing at least said pattern information to the model to be developed.

21. The apparatus according to claim 15, wherein said pattern information definition unit defines pattern information for use in adding, based on data of links of a class already defined in the model to be developed, new attributes to the model to be developed; and said pattern application unit adds new attributes by applying a pattern containing at least said pattern information to the model to be developed.

22. The apparatus according to claim 15, wherein said pattern information definition unit defines pattern information for use in adding, based on data of links of a class already defined in the model to be developed, new methods to the model to be developed; and said pattern application unit adds new methods by applying a pattern containing at least said pattern information to the model to be developed.

23. The apparatus according to claim 15, wherein said pattern information definition unit defines pattern information for use in adding, based on data of links of a class already defined in the model to be developed, new classes to the model to be developed; and said pattern application unit adds new classes by applying a pattern containing at least said pattern information to the model to be developed.

24. The apparatus according to claim 15, wherein said pattern information definition unit defines pattern information for use in adding, based on data of methods of a class already defined in the model to be developed, new methods to the model to be developed; and said pattern application unit adds new methods by applying a pattern containing at least said pattern information to the model to be developed.

25. The apparatus according to claim 15, wherein said pattern information definition unit defines pattern information for use in adding, based on data of methods of a class already defined in the model to be developed, new attributes to the model to be developed; and said pattern application unit adds new attributes by applying a pattern containing at least said pattern information to the model to be developed.

26. The apparatus according to claim 15, wherein said pattern information definition unit defines pattern information for use in adding, based on data of methods of a class already defined in the model to be developed, new links to the model to be developed; and said pattern application unit adds new links by applying a pattern containing at least said pattern information to the model to be developed.

27. The apparatus according to claim 15, wherein said pattern information definition unit defines pattern information for use in adding, based on data of methods of a class already defined in the model to be developed, new classes to the model to be developed; and said pattern application unit adds new classes by applying a pattern containing at least said pattern information to the model to be developed.

28. The apparatus according to claim 15, wherein said pattern information definition unit defines pattern information for use in adding, based on data of classes already defined in the model to be developed, new classes to the model to be developed; and said pattern application unit adds new classes by applying a pattern containing at least said pattern information to the model to be developed.

29. The apparatus according to claim 15, wherein said pattern information definition unit defines pattern information for use in adding, based on data of classes already defined in the model to be developed, new attributes to the model to be developed; and said pattern application unit adds new attributes by applying a pattern containing at least said pattern information to the model to be developed.

30. The apparatus according to claim 15, wherein said pattern information definition unit defines pattern information for use in adding, based on data of classes already defined in the model to be developed, new links to the model to be developed; and said pattern application unit adds new links by applying a pattern containing at least said pattern information to the model to be developed.

31. The apparatus according to claim 15, wherein said pattern information definition unit defines pattern information for use in adding, based on data of classes already defined in the model to be developed, new methods to the model to be developed; and said pattern application unit adds new methods by applying a pattern containing at least said pattern information to the model to be developed.

32. The apparatus according to claim 15, wherein said pattern information definition unit defines the pattern information using data about classes, or attributes, methods, or links of the classes already defined in the model to be developed as data relating to attributes, methods, links, or classes to be newly added in the model to be developed.

33. The apparatus according to claim 32, wherein said pattern information definition unit defines the pattern information by representing using a specified processing method a character string for data about attributes, methods, links, or classes to be newly added in the model to be developed.

34. The apparatus according to claim 15, wherein said pattern information definition unit defines pattern information for use in adding new attributes, links, methods, or classes in the model to be developed based on data satisfying a specified condition among classes, or an attribute, a method, or a link of the class already defined in the model.

35. The apparatus according to claim 15, wherein:

said pattern information definition unit defines the pattern information including data indicating that some of classes, or attributes, methods, or links of the classes defined in the model to be developed should be externally specified; and said pattern application unit obtains an external instruction to specify the classes, or attributes, methods, or links of the classes, and applies to the model to be developed a pattern containing the pattern information depending on a result of the instruction.

36. The apparatus according to claim 15, wherein said pattern information definition unit defines a pattern for use in adding, to the model to be developed and based on data of the object, new data about an object defined in the model to be developed.

37. An object-oriented software development support apparatus for supporting object-oriented software designing, comprising:

a pattern information definition unit defining pattern information in developing object-oriented software according to externally provided pattern definition information, the pattern information containing a portion specifying that a character string externally input while a pattern is applied should be incorporated into a model to be developed, and providing defined pattern information for the pattern; the pattern information including analysis patterns, design patterns and implementation patterns formed of samples of source code corresponding to operation definitions of a class in the analysis and design patterns;

pattern storage unit storing the defined pattern information; and a pattern application unit applying the defined pattern information stored in said pattern storage unit to the model to be developed, detailing the model, and supporting development of software corresponding to the model by incorporating an externally input character string into the model to be developed when the pattern containing the defined pattern information is applied.

38. An object-oriented software development supporting method for support in designing object-oriented software, comprising:

storing pattern information about a plurality of patterns, including analysis patterns, design patterns, and implementation patterns formed of samples of source code corresponding to operation definitions of a class in the analysis and design patterns, available when object-oriented software is developed, and inter-pattern relevant information for association between interrelated patterns; and applying stored design and analysis patterns whose application has been externally approved to a model to be developed and automatically generating source code, based on an implementation pattern interrelated with the stored design and analysis patterns, corresponding to a portion to which at least one of each of analysis and design patterns have been applied in the model to be developed.

39. A computer-readable storage medium storing a program used to direct a computer to perform a method comprising:

storing pattern information about a plurality of patterns, including analysis patterns, design patterns, and implementation patterns formed of samples of source code corresponding to operation definitions of a class in the analysis and design patterns, available when object-oriented software is developed, and inter-pattern relevant information for association between interrelated patterns; and applying stored design and analysis patterns whose application has been externally approved to a model to be developed automatically generating source code, based on an implementation pattern interrelated with the stored design and analysis patterns, corresponding to a portion to which at least one of each of analysis and design patterns have been applied in the model to be developed.

40. An object-oriented software development supporting method for support in designing object-oriented software, comprising:

storing a preliminary and uniquely regulated pattern interpretation rule;

interpreting pattern information according to the interpretation rule to produce an interpretation result; the pattern information including analysis patterns, design patterns and implementation patterns formed of samples of source code corresponding to operation definitions of a class in the analysis and design patterns;

defining pattern information containing a portion specifying that the pattern information should be interpreted according to the pattern interpretation rule to produce defined pattern information;

applying the defined pattern information to a model to be developed;

detailing the model; and supporting development of software corresponding to the model using the interpretation result, when a pattern containing the defined pattern information is applied.

41. A computer-readable storage medium storing a program used to direct a computer to perform a method comprising:

storing a preliminary and uniquely regulated pattern interpretation rule;

interpreting pattern information according to the interpretation rule to produce an interpretation result;

defining pattern information containing a portion specifying that the pattern information should be interpreted according to the pattern interpretation rule to produce defined pattern information; the pattern information including analysis patterns, design patterns and implementation patterns formed of samples of source code corresponding to operation definitions of a class in the analysis and design patterns;

applying the defined pattern information to a model to be developed;

detailing the model; and supporting development of software corresponding to the model using the interpretation result, when a pattern containing the defined pattern information is applied.

* * * * *